United States Patent
Spernow et al.

(10) Patent No.: US 10,546,129 B2
(45) Date of Patent: *Jan. 28, 2020

(54) METHOD TO SCAN A FORENSIC IMAGE OF A COMPUTER SYSTEM WITH MULTIPLE MALICIOUS CODE DETECTION ENGINES SIMULTANEOUSLY FROM A MASTER CONTROL POINT

(71) Applicant: Forensic Scan, LLC

(72) Inventors: William R. Spernow, Suwanee, GA (US); Daniel Garrie, Seattle, WA (US)

(73) Assignee: Forensic Scan, LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,146

(22) Filed: May 23, 2018

(65) Prior Publication Data

US 2018/0373873 A1    Dec. 27, 2018

Related U.S. Application Data

(63) Continuation of application No. 14/845,643, filed on Sep. 4, 2015, now Pat. No. 9,990,497, and a continuation of application No. 14/072,367, filed on Nov. 5, 2013, now abandoned.

(51) Int. Cl.
*G06F 21/00* (2013.01)
*G06F 21/56* (2013.01)
*G06F 21/55* (2013.01)

(52) U.S. Cl.
CPC .......... *G06F 21/566* (2013.01); *G06F 21/552* (2013.01); *G06F 21/562* (2013.01); *G06F 21/568* (2013.01); *G06F 2221/034* (2013.01)

(58) Field of Classification Search
CPC ................. G06F 21/562; G06F 21/566; G06F 2221/034; G06F 21/552; G06F 21/568
See application file for complete search history.

(56) References Cited

U.S. PATENT DOCUMENTS

| 7,043,757 B2 | 5/2006 | Hoefelmeyer et al. |
| 7,065,790 B1 | 6/2006 | Gryaznov |
| 8,776,219 B2 | 7/2014 | Bisso et al. |
| 8,904,525 B1 | 12/2014 | Hodgman et al. |

(Continued)

OTHER PUBLICATIONS

"A Virtual Machine Introspection Based Architecture for Intrusion Detection" Garfinkel et al.

(Continued)

*Primary Examiner* — Tri M Tran
(74) *Attorney, Agent, or Firm* — Sofer & Haroun, LLP

(57) ABSTRACT

A multi-engine malicious code scanning method for scanning data sets from a storage device is provided. The method includes, among other steps obtaining at least one data set from a storage device and generating a single forensic image of the data set and also applying a recover data application to the data set to generate a single recovered data set. A scanning is initiated of the single forensic image and the single recovered data set using the selected plurality of malware engines, where each of the malware engines, installed on the indepenent operating systems of the virtual operating system may be run concurrently on the single forensic image and the single recovered data set. A report is generated combining each of the malware engines reporting the results of the scans.

12 Claims, 21 Drawing Sheets

(56) References Cited

U.S. PATENT DOCUMENTS

2009/0044024 A1   2/2009  Oberheide et al.
2009/0150998 A1   6/2009  Adelstein et al.
2012/0054857 A1   3/2012  Bisso et al.
2014/0304818 A1  10/2014  Li

OTHER PUBLICATIONS

"Managing Security of Virtual Machine Images in a Cloud Environment" Wei et al.
"Temporal Search: Detecting Hidden Malware Timebombs with Virtual Machines" Crandall et al.

METHOD TO SCAN A FORENSIC IMAGE OF A COMPUTER SYSTEM WITH MULTIPLE MALICIOUS CODE DETECTION ENGINES SIMULTANEOUSLY FROM A MASTER CONTROL POINT

PRIORITY CLAIM

This application is a continuatiuon of U.S. patent application Ser. No. 14/845,643, filed on Sep. 4, 2015 (now issued as U.S. Pat. No. 9,990,497), which in turn is a continuation of U.S. patent application Ser. No. 14/072,367, filed on Nov. 5, 2013 (now abandoned) which in turn claims the benefit of priority from U.S. Provisional Patent Application No. 61/796,263, filed on Nov. 6, 2012, the entirety of which are incorporated by reference.

BACKGROUND

Field of the Invention

The present invention relates to a method used to detect the presence of malicious code infections on a computer system. More particularly, the present invention is in the technical field of computer security that includes computer forensics. More particularly, the present invention addresses the limitations of existing malicious code scanning technology.

Description of the Related Art

When a computer device is infected by a malicious code infection the user will often notice degradation of system performance as the infection can create unwanted and time consuming system activity, excessive memory usage, and bandwidth consuming network traffic. These factors can also cause instability problems leading to application or system-wide crashes. The user of an infected device may incorrectly assume that poor performance is a result of software flaws or hardware problems, taking inappropriate remedial action, when the actual cause is a malicious code infection of which they are unaware.

Existing prior art of commercialcomputer security vendors use many different forms of software to detect and attempt to remove instances of malicious code. This software can make use of various methods to detect malicious code infections including scanning files on the computer as well as allowing suspicious files to execute in a "sand-box" environment to determine their scope and purpose. Integrity checking and heuristic analysis are also other proven scanning techniques. Malicious code scanning generally involves examining files for a fingerprint or "signature" that is characteristic of an executable program known to contain malicious code.

Detecting the presence of malicious code infections is challenging as the authors of malicious code design their software code to be difficult to detect, often employing obfuscation techniques that deliberately hides the presence of malicious code infections on a computer system. For example, the application or program containing the malicious code may not be displayed in reports designed to inform the user/administrator of processes currently running on the compromised computer.

When files on a computer system are scanned for malicious code infections several operations are performed in specific sequence. Preliminary actions are simple and quick verifications that can be used to rule out the possibility that the file contains malicious code. Examples of operations performed early in the scanning process include comparing checksums, file header information, number of file sections and other file properties that typically differ between clean and infected files. By performing these functions in a prescribed sequence where the next step takes longer than the previous step, the entire scanning process becomes quicker as easier aspects of malicious code identification are tested first. In all cases, the last step in all commercial and open source scanning solution is an attempt to remove the malicious code infections without causing additional harm to the compromised computer or its data. The present invention does not support this last step as the forensic image being analyzed for malicious code is a "read-only" file.

While existing commercial and open source malware vendors all serve the same purpose, the identification and removal of malicious code, their success rates vary significantly. The digital signatures used to identify instances of malicious code infections are closely guarded intellectual property. As a result, the effectiveness of any malware detection product is directly linked to the number of malicious code signatures it is aware of, typically a function of its independent research. Digital signatures are not shared among competitors. As a result, it is possible to scan a computer for malicious code using vendor product "X" and find nothing indicating an infection. In comparison, vendor "Y's" product would find the infection due to its advanced knowledge of emerging instances of malicious code and their digital signatures. Recent research has established that most commercial malware products only identify, on average, 90% of known malicious code infections.

To be effective, commercial malware products need to take control of the file system of the computer it is installed on. This control aspect enables it to prevent an infected file from infecting other files, spreading the malware to other files on the same computer, or in the worst case scenario, infecting other computer systems. But this need to be in control of the file system comes at a cost. Using prior art arrangements, only one commercial malware product can be installed on a computer system at a time. Trying to install multiple malware detection products on a single computer system typically results in a deadly embrace, where both products fight for absolute control of the file system. This deadly embrace results in a malfunctioning computer as each malware detection product sees the other as an adversary launching a malicious attack designed to take control of the file system. This "one only" installation limitation puts the user at another disadvantage in that the malware detection product currently installed may have limited knowledge of "new emerging viruses" and as a result is likely to report that a computer system is "clean," when in fact it is infected with a malicious code infection.

OBJECTS AND SUMMARY

The present arrangement is directed to a method and system whereby a forensic image of a hard drive or the live acquisition of RAM/Flash memory resulting in a forensic image of the memory from a single computer system can be simultaneously scanned with multiple commercial and open source malicious code detection engines such that all detection engines can be controlled from a master control point dashboard module. As noted above, prior to the present invention technical limitations imposed by the current design of anti-virus software and malware scanning engines prevented multiple instances of malicious code detection software from simultaneously being installed on the same computer and run concurrently. This technical limitation is resolved by the present invention such that an unlimited number of malicious code detection engines (e.g. at least 32) can be brought to bear simultaneously on the same hard drive forensic image or the live acquisition of RAM/Flash memory so that both valid and deleted files and fragments can be scanned with multiple detection resources. The method of the present invention drastically increases the effectiveness of scanning for infections by factors as the scans are performed using the combined knowledge of all malicious code detection vendors and their global researchers.

In this application, the term "malicious code" refers to any software specifically designed to infiltrate or damage a computer system without the owner's informed consent. Malicious code can include but is not limited to the following: viruses, worms, trojan horses, rootkits, adware, spyware and any other malicious and unwanted software. Any computer device, such as a server, network device, desktop, laptop, personal data assistant (PDA), tablet or smart phone, are a limited set of examples of what can be at risk from a malicious code infection. While "malicious code" and "anti-virus" tend to be used interchangeable in current security based publications, anti-virus is a subset of malicious code infections.

The term "forensic image" refers to a bit-by-bit, sector-by-sector duplicate image of a digital storage. These storage devices can be an internal hard drive or external storage device accessible either locally or remotely or the live acquisition of RAM/Flash memory. There are many different industry standards that describe the structure and content of a forensic image. The most popular is the "E01—Encase Evidence File" forensic image structure created by Guidance Software™. The common thread associated with all forensic images is the creation of an "exact duplicate" of all valid, deleted and unused storage space of a storage device in a manner that prevents the image from being modified, at any level, after creation. A forensic image therefore is a snapshot in time of the state of a digital storage device such that its entire accessible storage capacity is duplicated in the form of a transportable file, or series of related file segments, that can be reviewed and analyzed at later points in time but not modified or altered in any way without invalidating the entire forensic image. Forensic images are validated thru the use of hash digests. When a forensic image is initially created the process can also be tasked with creating a single hash digest value/number that mathematically is a unique representation of the entire accessible contents of the storage device being duplicated. Future regenerations of this hash digest value will be identical to the original value calculated as long as the content of the current forensic image has not been altered or changed in any way down to the bit level.

The present invention is a method for analyzing both valid and deleted files contained within the duplicate forensic image of a computer system for the existence of all known forms of malicious code using multiple malware engines simultaneously and whose scanning actions and discoveries made are coordinated by a software based master control point dashboard.

An example of the benefit of the invention includes the following task and results. In this scenario, the task would pivot on the need to examine, as soon as possible, a potentially compromised computer system to determine if it has been infected with any known malicious code. Because hackers routinely deleted files in an effort to cover their tracks this task must include the scanning of both valid and deleted files. Examining live running computer systems for malicious code infections incurs certain risks, one of which is that the hacker has shielded his/her malicious code from discovery within the running operating system environment. This invention eliminates this factor and many other "live" scanning problems by first creating a bit-by-bit duplicate forensic image of the compromised computer so that all malware scanning is performed against a static "read-only" forensic image. The forensic image is then mounted as a physical/logical drive under one of many different operating systems so that it could be pre-processed by either commercial or open source forensic analysis software.

The pre-processing of a forensic image includes recovery of deleted files as well as the extraction of e-mail and files from various forms of compressed or encrypted file archives. Once the pre-processing is complete the forensic image is simultaneous scanned by a least 32 different malware engines. Each different malware scanning engine would be hosted by an individual instance of a virtual operating system that is hosted on a single physical computer/machine. These 32+ virtual machines each have the ability to reach out and access the single duplicate forensic image, scanning its read only content of valid and recovered deleted files simultaneously. The parallel processing offered by the virtual machines dramatically decreases, by factors, the time required by each malware engine to scan the duplicate forensic image of the suspected computer. Not only are time efficiencies increased but the single forensic image is scanned for every known instance of malware by at least 32 different vendors who specialize in keeping track of new malicious code, code that one vendor may know about, but others do not. The gains realized by the simultaneous "many-to-one" approach to malware scanning, along with the inclusion of deleted files in the malware scan, increases the possibility that known viruses, Trojans and malware are discovered, where in the past they might have been missed due to the limitations noted above. The scanning activity within the multiple virtual machines is controlled and coordinated from a software based master control point dashboard. This master control point is a function of custom scripts and applications specifically created to further enhance the benefit of this many-to-one malware engine scanning process.

This present invention may be offered as both a hardware/software appliance and as an installable software application with dongle execution control. The appliance may be a high-end server with multiple 64 bit CPU processors, significant amounts of random access memory (RAM), high-bandwidth high-capacity physical hard drives along with solid state drives, all coupled to high-speed RAID arrays supported by battery backup devices. The hard drives will be provided in removable trays to facilitate quick removal. For security purposes the appliances are onfigured as stand-alone systems with no network or Internet connectivity initially enabled. The operating system installed may advantageously be an enterprise level operating system capable of supporting all of the hardware resources provided.

At a minimum, the software applications installed and enabled on the appliance include the operating system and software capable of supporting multiple instances of VMware or Hyper-V at the server and workstation level. Each VMware or Hyper-V instance is configured with at least the following software applications: (1) FTK Imager, (2) X-Ways Forensics, (3) Custom scripts and applications unique to the processing environment, and (4) a SQLite database, along with one of the more of 32+ different malware engines utilized by the present invention.

The present invention is a combination of existing processes that are applied in a unique manner such that a new method for the scanning of malicious code on a computer system is established.

As set out below, it is an object of the the above described invention to provide:

USE OF FORENSIC IMAGES: The malicious code scanning process in the present arrangement is not launched directly against the files on a computer system suspected of being compromised, as current malware vendors do, but rather against a duplicate forensic image of the local storage device that was created using forensically sound duplication techniques (See e.g. FIG. 03, FIG. 04, FIG. 05 & FIG. 07, described in more detail below). Launching a malicious code scanning process against a duplicate forensic image of a computer system, given that duplicate forensic images can be designated as "read-only" sources of data permits the exact same image to be scanned an unlimited number of times by different commercial and open-source malware vendor solutions without changing the content of the forensic image being scanned. This is at least one distinguishing characteristic of the present invention.

ABILITY TO SCAN DELETED FILES: The existence of a duplicate forensic image of the computer system suspected of being compromised permits additional forensic analysis in the form of deleted file recovery—a distinguishing characteristic of the present invention (See e.g. FIG. 08 & FIG. 15 described in more detail below). Current malware vendor solutions do not recover deleted files for scanning purposes. This limitation ignores the possibility that hackers, in compromising a computer system, have attempted to cover their tracks by deleting incriminating files. Identifying these deleted files as part of a known hacker attack increase the odds that the proper corrective action steps can be taken sooner than later.

CUSTOM DESIGNED CONSOLE: The coordination and execution of any new patentable method requires that a host of activities be configured, scheduled, coordinated, executed and monitored. To accomplish this goal the present invention utilizes a custom designed user interface designated as the "Master Control Point Dashboard" console (See e.g. FIG. 06 described in more detail below). This console allows the user, typically one with administrator privileges, to perform the following six major selectable tasks as detailed below from a single interface display console:

| | |
|---|---|
| TARGET MEDIA: | To mount forensic images or devices for scanning. (See e.g. FIG. 7 described in more detail below) |
| RECOVER DELETED: | To configure and initiate deleted file recovery. (See e.g. FIG. 8 described in more detail below) |
| MALWARE ENGINE: | To select and configure malware engines. (See e.g. FIG. 9 described in more detail below) |
| SCAN CONTROL: | To configure/start/stop the scanning process. (See e.g. FIG. 10 described in more detail below) |
| MONITOR PROCESS: | For real time feedback on malware discovered. (See e.g. FIG. 11 described in more detail below) |
| CREATE REPORTS: | For analysis options and detailed results. (See e.g. FIG. 12 described in more detail below) |

The configuration and design of this user interface display is unique in that the selectable functions presented embody the core elements of the present invention. In totality, no other malware vendor or open source solution offers this combination of malware specific scanning and reporting options in a single user interface. As a result, this custom designed user interface is a distinguishing characteristic of the present invention.

SIMULTANEOUS SCANNING: Another distinguishing characteristic of the present invention is its ability to scan a single duplicate forensic image with multiple commercial and open source malware engines simultaneously (See e.g. FIG. 09, FIG. 10, FIG. 13 & FIG. 16 described in more detail below). Current vendor solutions typically only permit one malware scanning engine to be installed on a single computer system. Installing multiple malware engines on the same computer system is actively discouraged by both the prior art commercial and open-source vendors due to technical conflicts. The present invention is a solution to this limitation as it uses multiple virtual operating systems (e.g. VMware & Hyper-V, etc. . . . ) to host multiple malware engines on a single physical computer system. Configuring each instance of a virtual environment to have a different malware engine running, such that each malware engine can reach out and access the same duplicate forensic image(s), establishes a unique method that is capable of performing simultaneous scanning at a level not available in today's marketplace.

MULTIPLE IMPLEMENTATION OPTIONS: A core driving force behind this present invention is the ability to scan a forensic image of a computer system suspected of being infected with multiple commercial and open source malware engines simultaneously from a designated "Master Control Point Dashboard" console interface (See e.g. FIG. 06 described in more detail below). This capability has the ability to manifest itself in numerous physical and logical forms that modify the scanning and analysis process platform but maintain the overall goal of the present invention, namely that of using multiple commercial and open source malware engines to scan a computer system simultaneously for known infections. The authors of this present invention will present, as an example, three variations of the present invention (See e.g. FIG. 13 described in more detail below) that focus on a manual scanning approach (See e.g. FIG. 19 described in more detail below) and a network and Cloud based orientated scanning approach (See e.g. FIG. 20 & FIG. 21 described in more detail below). These different approaches are not meant to be examples that describe the limitations of the present invention, but rather are examples for establishing that the core driving force behind this present invention can be embodied as different diverse processes that utilized the same method of simultaneous processing to accomplish identical goals.

NORMALIZE SCANNING RESULTS: Having multiple malware scanning engines producing differently formatted updates and reports poses a significant logistics challenge. For example, malware vendors routinely use their own internally generated identifiers to name and describe malware infections discovered. It is not uncommon for multiple malware vendors to have entirely different naming conventions for the same malicious code. The present invention copes with this situation by creating a normalization engine interface specifically created to take all the data generated by the different scanning engines and normalize it into a single accessible format (See e.g. FIG. 18 described in more detail below) such as the Common Vulnerabilities and Exposure (CVE) guidelines standard. This is another distinguishing characteristic of the present invention as the normalization of the data permits a wide range of consolidation functions to be implemented concerning files scanned, malicious code identified and reports generated.

STATISTICAL IMPACT PROJECTIONS: The ability to gather data concerning a potential malicious code compromise from multiple malware engines presents a unique opportunity to extrapolate findings previously unavailable to security professionals. The present invention capitalizes on the availability of this data to create reports and projections on the impact of the current compromise on the organization's entire technological infrastructure (See e.g. FIG. 13 described in more detail below). The use of unique scripts and programs authored specifically to detect the possibility of zero-day exploits from the normalized data (as well as other relevant data) makes the present invention unique in its focus as it is capable of discovering facts previously unknown. This is another distinguishing characteristic of the present invention.

TRANSPORTIBILITY: Organizations are tasked with protecting the privacy of their client's data under a variety of laws and regulations, as well as internal privacy policies. These governing factors may prevent the organization from allowing data from computer systems suspected of being compromised from leaving their physical facility or control. To compensate for this restriction, the present invention can be embodied on a single physical computer system that is configured to be shipped as two ATA racks to the client's location via common carriers (See e.g. FIG. 01 & FIG. 02 described in more detail below). This portability is another distinguishing characteristic of the present invention.

BRIEF DESCRIPTION OF THE DRAWINGS

The foregoing aspects and many of the attendant advantages of this invention will become evident to the reviewer as the included drawings become better understood with respect to the details provided, wherein.

DETAILED DESCRIPTION OF PREFERRED EMBODIMENTS

The present invention is a system, process and method that allows duplicate bit-by-bit forensic images of a computer system's hard drive or the live acquisition of RAM/Flash memory to be scanned with multiple malware engines simultaneously from a master control point dashboard. Moreover, the present invention is configured to be a portable solution such that it can be shipped, via common carriers, to client locations whose privacy policies prevent sensitive data from being taken off-site. More specifically, the present invention provides a process whereby the files and data on computer system storage devices, in the form of forensic images, can be scanned simultaneously from a virtual environment with multiple commercial or open source malware detection applications in a time period that is substantially less than if the scanning was performed sequentially. In addition, the present invention has the ability, via authored scripts and executable programs created, to collect relevant data and make statistical projections on the overall impact of the malicious code infections discovered to date on the remainder of the client's technological infrastructure.

Although the present invention will be described in the context of a particular operating system environment, specifically Microsoft's Windows Server 2012 with Hyper-V, Microsoft's Windows 7 Ultimate or Windows 8.1 Pro and VMWare's virtual operating environment, those skilled in the relevant art and others will appreciate that the present invention is also applicable to other operating systems and virtual environments.

The described embodiments of the present invention should be construed as illustrative on its face and not examples of the current limits of technology with respect to the capabilities of the present invention.

Figure 1:
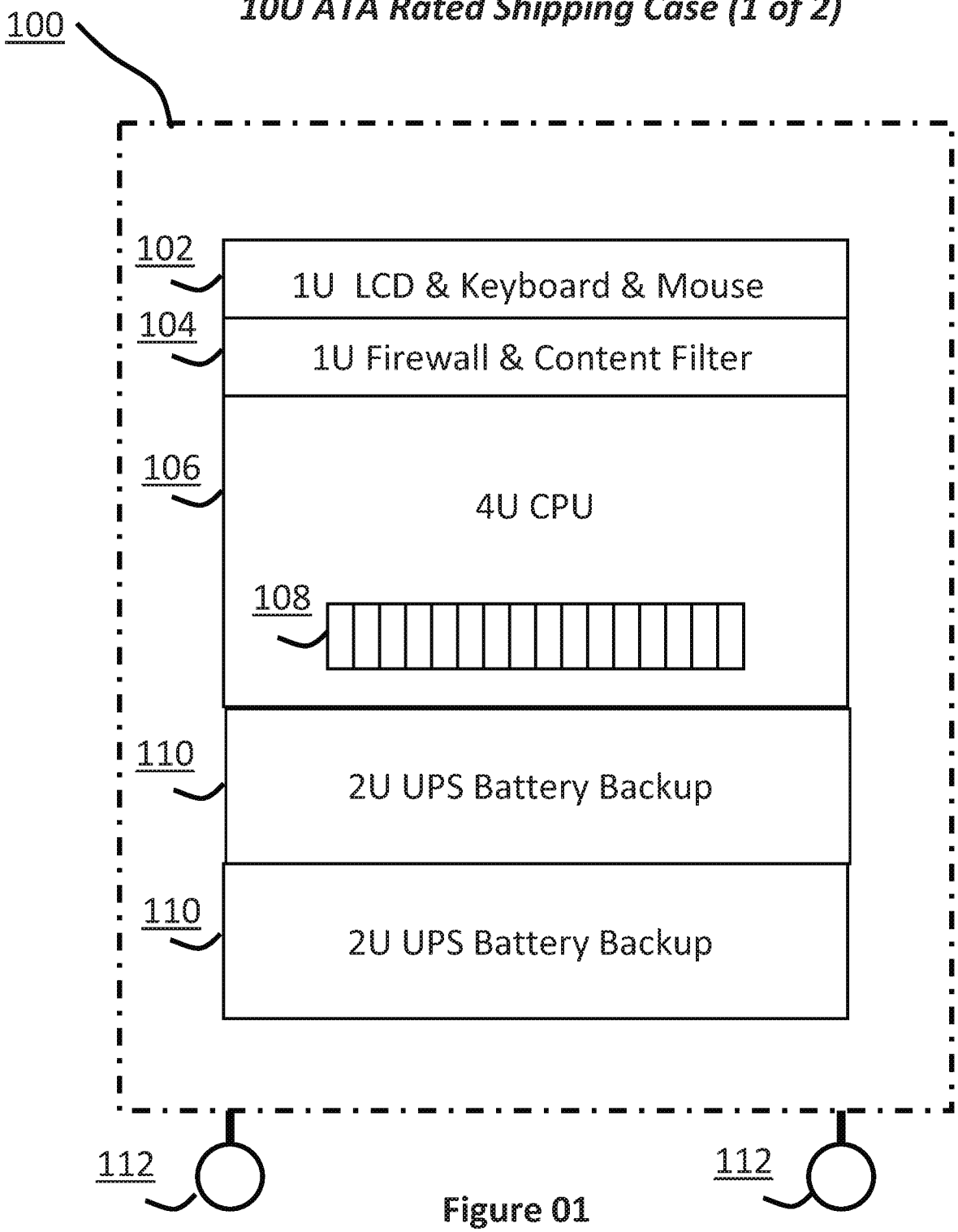
FIG. 01 is a block diagram titled "10U ATA Rated Shipping Case (1 of 2)" that illustrates the hierarchical structure of the hardware components required to embody the present invention. This diagram is of a fully populated 10U ATA rated shipping case that supports one-half of the operational functions of this patent instance.
Figure 2:
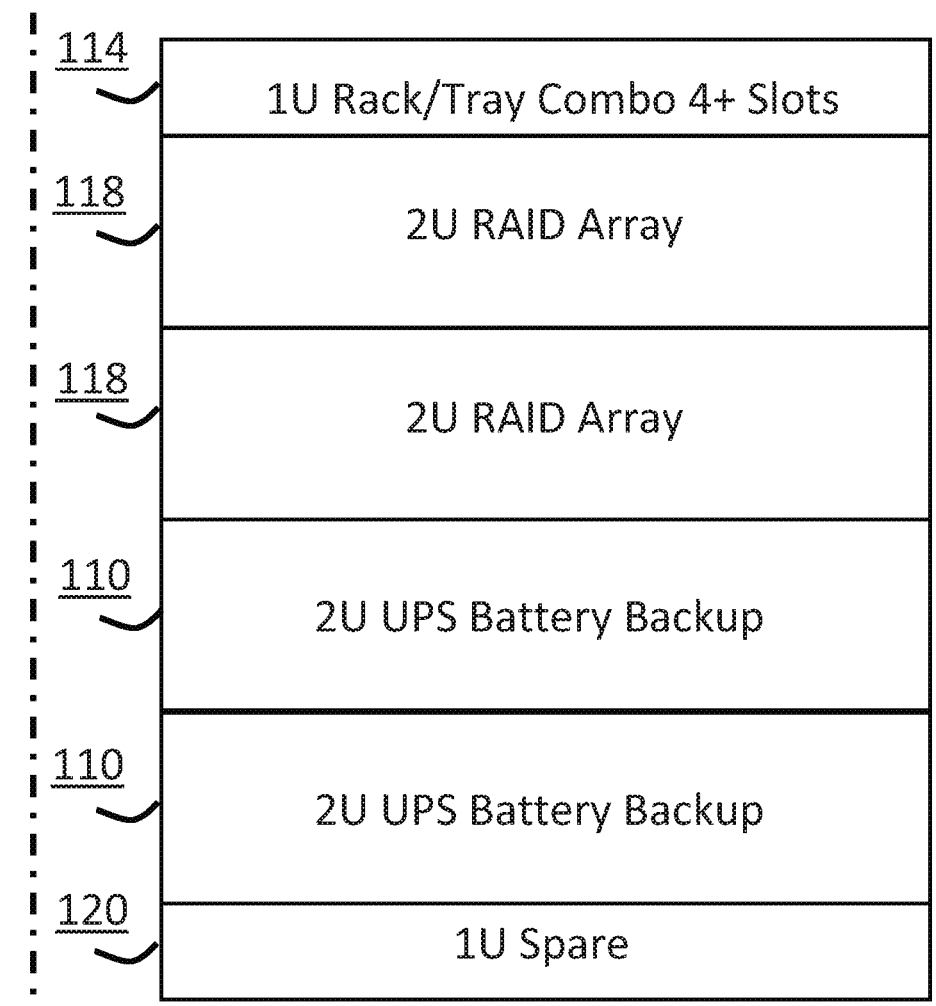
FIG. 02 is a block diagram titled "10U ATA Rated Shipping Case (2 of 2)" that illustrates the hierarchical structure of the hardware components required to embody the present invention. This diagram is of a partially populated 10U ATA rated shipping case that supports one-half of the operational functions of this patent instance.

FIG. 01 and FIG. 02 represent the front views of two component structures 100 that when connected together via wires and cables create a functional computer system that can be transported via common carriers to a client's corporate location anywhere in the world. Both of these figures represent commercially available ATA (Air Transport Association) rated cases specifically designed to hold computer system components in a rack environment. Both cases have 10U of rack space and each are equipped with four casters 112 so that they may be rolled, as required, to their destinations. For ease of illustration and because they are not relevant to an understanding of the present invention, technical details of these commercially available ATA transportable cases are not included in this application.

FIG. 01 is a block diagram of computer components 100, that when attached to other computer components and properly configured are capable of supporting certain features of the present invention. The computer system components detailed in FIG. 1 are: keyboard, monitor and mouse 102; firewall and content filter 104; CPU chassis 106 with single or multiple CPUs and appropriate amounts of RAM and external interfaces; appropriate amounts of hard drive "hot swap" trays and racks 108; and two AC powered battery backup devices 110 configured appropriately to handle the power demands of all the components in this specific transportable rack.

FIG. 02 is a block diagram of computer components 100, that when attached to other computer components and properly configured are capable of supporting certain features of the present invention. The computer system components detailed in FIG. 2 are: a hard drive "hot swap" rack and tray interface 114; a RAID array 118 appropriately configured in size to host the forensic images created for scanning; a RAID array 118 appropriately configured in size to host the virtual operating environment required by this invention; (two AC powered battery backup devices 110 configured appropriately to handle the power demands of all the components in this specific transportable rack, and a spare 1 U rack space 120 for future expansion of additional functions.

Both FIG. 01 and FIG. 02 attempt to convey the anticipated size in rack height units ("U's") of each computer system component required. The present embodiment of this invention describes the rack space required as a total of 20 U's where a single U has a height of 1.75 inches and a depth of either 19 or 23 inches. To accommodate various shipping restrictions with respect to size and weight, the total U's required have been divided in half, resulting in the need for two transportable racks, each with 10U of rack space. Those familiar with the configuration of computer components in a rack and their respective placement within that rack realize that any placement or positioning is an arbitrary assignment that can be changed later, as necessary, to accommodate other factors such as heat and vibration. The specific type of computer equipment as outlined in FIG. 01 and FIG. 02 describe one of many numerous configurations that can result in an operational computer system capable of embodying feature of the present invention. FIGS. 01 and 02 are meant to convey one of these options and as a result are not an example of the limits of this technology.

Figure 3:
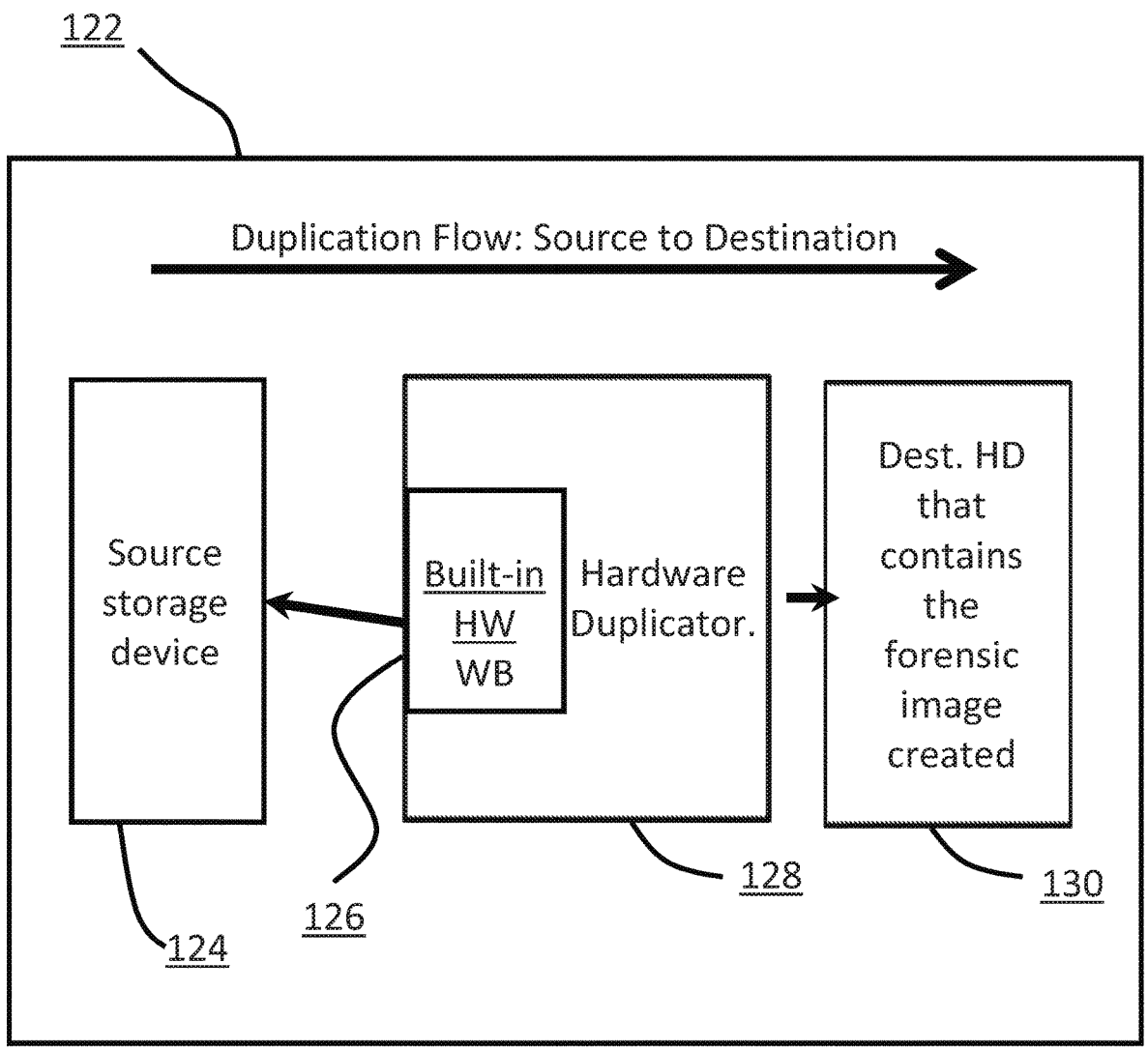
FIG. 03 is a block diagram titled "Internal Hardware Write-Blocker Environment" that schematically illustrates an internal hardware write-blocker environment in which commercial hardware components are used to create a duplicate forensic image of a hard drive that may be from a computer system compromised by malicious code.

FIG. 3 is a block diagram 122 of the functional configuration required to use a commercial duplication device 128 with an internal hardware write-blocker 126 to create a duplicate forensic image 130 of a computer storage device 124. The hardware duplication device 128 described here is a commercial product with a internal write-blocker 126. The combination of a commercial hardware duplication device 128 and a built-in write blocker 126 allows for the "static" duplication of any computer storage device. Static duplication infers that the storage device to be duplicated is removed from its host and attached to the commercial device as the data source 124. The data found on the source device 124 is duplicated, sector-by-sector, to the destination device 130 for the purpose of creating a forensic image. The write-blocker 126 prevents any of the data on this source device from being modified during the duplication process.

By default, forensic images based on the E01 format (EnCase Forensic Image File—file ext) are write-protected and include internal hash digests. Any after-the-fact modifications to the content of an E01 forensic image automatically invalidates the integrity of the image. The embodiment of this present invention requires the availability of forensic images created from computer systems suspected of being compromised with malicious code. Where possible, these should be static images, so that malware scanning can be replicated on the exact same data when required. For ease of illustration and because they are not relevant to an understanding of the present invention, technical details concerning these duplication devices are not included in this application.

The purpose of providing FIG. 03 is to establish that the process and method of the present invention involves the scanning and analysis of read-only forensic images that are exact duplicates of the storage devices on the computer systems suspected of being compromised. The use of a forensic image permits multiple scanning passes, using different malware scanning engines, without ever changing the original content of the items scanned. FIG. 03 establishes the foundation by which the primary input to the present invention is created.

Figure 4:
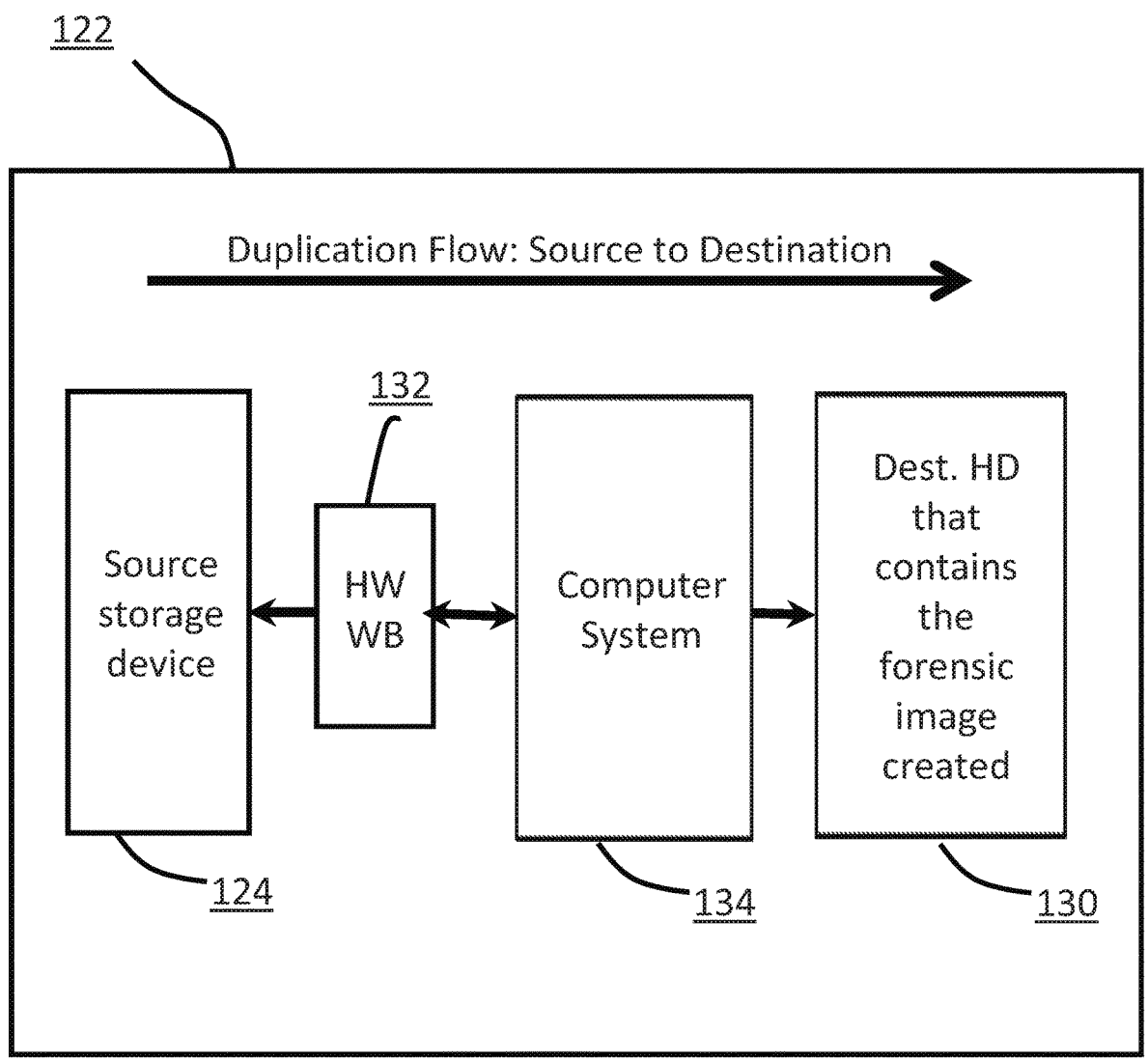
FIG. 04 is a block diagram titled "External Hardware Write-Blocker Environment" that schematically illustrates an external hardware write-blocker environment in which commercial hardware components are used to create a duplicate forensic image of a hard drive that may be from a computer system compromised by malicious code.

FIG. 04 is a block diagram 122 of the functional configuration required to use a commercial external hardware write-blocker 132 to create a duplicate forensic image 130 of a computer storage device 124 using a computer system 134. The overall description of this environment is similar to FIG. 03 except that while this environment is also capable of creating duplicate forensic images, it does so using a typical computer system and commercial write-blocker 132 as opposed to a dedicated commercial hardware duplication device 128.

Figure 5:
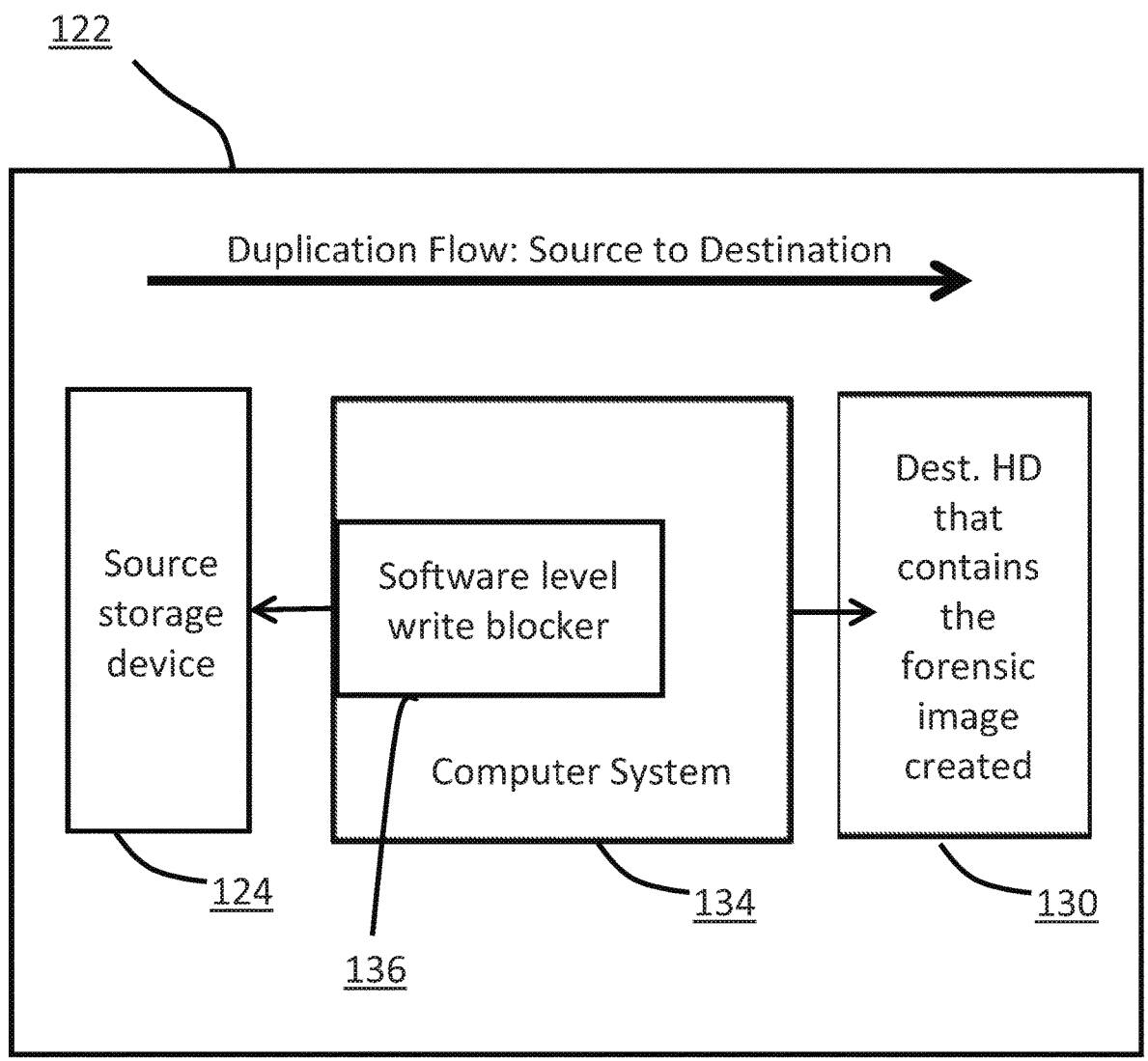
FIG. 05 is a block diagram titled "Internal Software Write-Blocker Environment" that schematically illustrates an internal software write-blocker environment in which commercial software components are used to create a duplicate forensic image of a hard drive that may be from a computer system compromised by malicious code.

FIG. 05 is a block diagram 122 of the functional configuration required to use a commercial or open source software write-blocking tool 136 to create a duplicate forensic image 130 of a computer storage device 124 using a computer system 134. The overall description of this environment is similar to FIG. 03 and FIG. 04 except that while this environment is also capable of creating duplicate forensic images, it does so using software designed to act as a write-blocker 136 at the operating system level, as opposed to a dedicated commercial hardware device.

While at least one of the forensic write-blocking environments described in FIGS. 03 thru 05 is required to create a forensically sound duplicate image, this hardware or software represents a function that "enables" the present invention, it does not embody it. The enabler function served by these three different forensic duplication environments is only applicable "if" the malware scanning for malicious code needs to be performed in a manner that is forensically reproducible. If that is not the case, the duplicate image created can originate from an environment where no write-blocker was required or used. Duplicate images created without the use of some form of a write-blocker are typically described as "live" acquisitions. The inputs to this present invention include a static or live acquisition to be performed on a computer storage device so that a target, in the form of a forensic image, can be identified as an item to be scanned by the present invention's process. For ease of illustration and because they are not relevant to an understanding of the present invention or the inputs required, specific technical details concerning the differences between a static and live duplication process are not included in this application.

The present invention includes two primary inputs. As described in more detail later in the application with respect to FIG. 13, the first is a forensic image 432 of the computer storage device to be scanned for malicious code infections, the second is a forensic image of the deleted items recovered 434, 436 from free and slack space 13. While the present invention is designed to work with two primary inputs 432 436, these design parameters to not prevent the present invention from only using one of the primary inputs should a situation exist where one of the inputs is not available or there are valid reasons why scanning it would not be productive.

Figure 6:
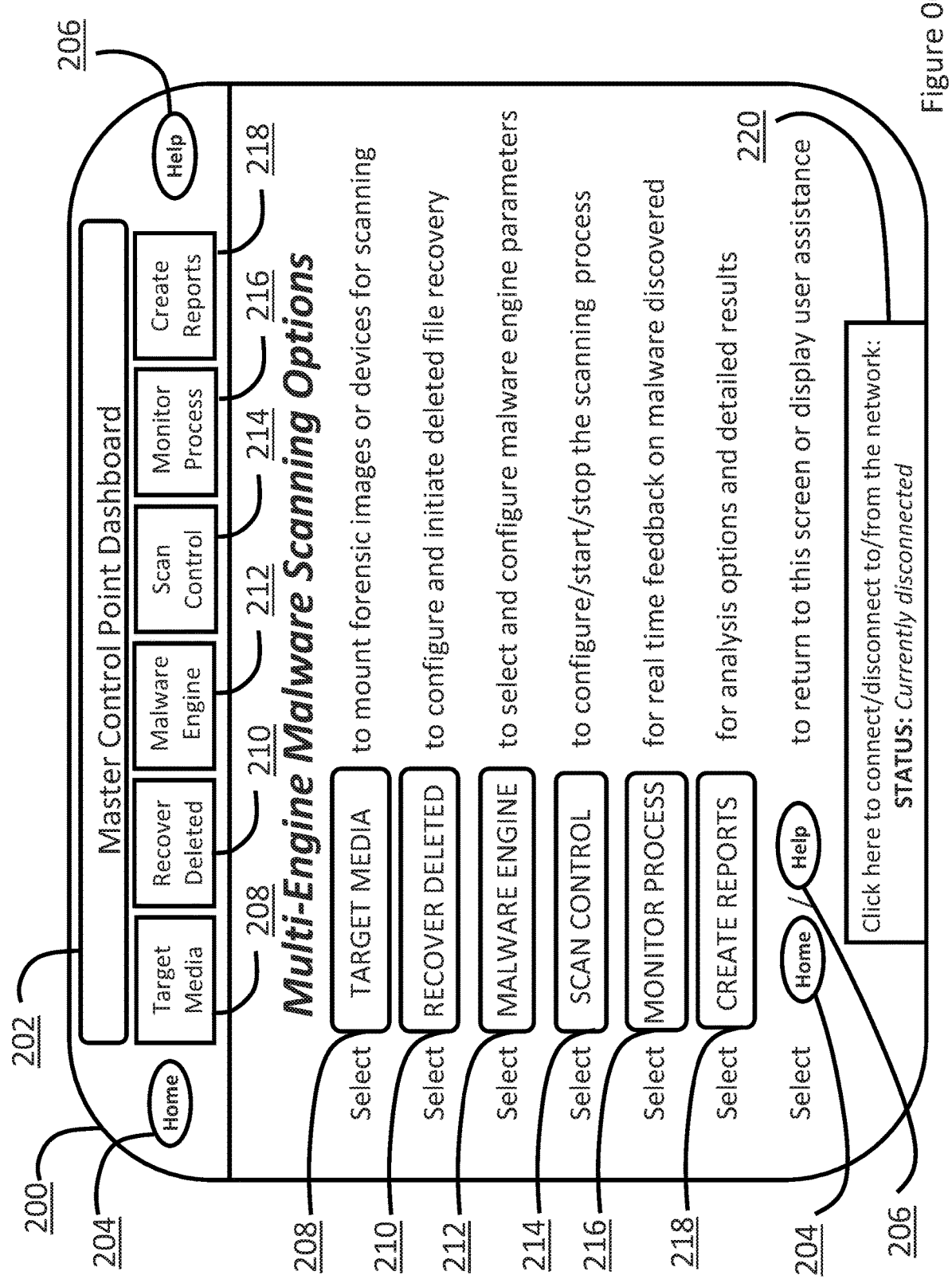
FIG. 06 is a simulated screen display interface to custom designed software applications. It is titled "Master Control Point Dashboard: Multi-Engine Malware Scanning Options." This figure is the home screen that on one page presents an overview of all the operational functions made available by this present invention.

Returning to the initial operation of the present arrangement, FIG. 06 is a block diagram that describes the overall functional aspects of the "Master Control Point Dashboard" console user interface. This console allows the user, typically one with administrator privileges, to perform the following six major selectable tasks from the top of the dashboard as detailed below from a single interface display console:

| | |
|---|---|
| TARGET MEDIA: | To mount forensic images or devices for scanning 208. (See e.g. FIG. 7 described in more detail below) |
| RECOVER DELETED: | To configure and initiate deleted file recovery 210. (See e.g. FIG. 8 described in more detail below) |
| MALWARE ENGINE: | To select and configure malware engines 212. (See e.g. FIG. 9 described in more detail below) |
| SCAN CONTROL: | To configure/start/stop the scanning process 214. (See e.g. FIG. 10 described in more detail below) |
| MONITOR PROCESS: | For real time feedback on malware discovered 216. (See e.g. FIG. 11 described in more detail below) |
| CREATE REPORTS: | For analysis options and detailed results 218. (See e.g. FIG. 12 described in more detail below) |

Each of the above functional areas associated with FIG. 06 are focused on a specific set of tasks that need to be individually managed so that the goal of present invention is realized within the scope of its abilities. FIG. 06, on its face, is an exemplary home page for the present invention in that all options and functions that require user oversight or involvement are accessed from menu options displayed on this custom designed console interface. This console is designed with the purpose of connecting all other major and minor functions associated with the present invention together in a seamless manner so that the use of the present invention is accomplished with a minimum amount of training.

Included in FIG. 06 are three default menu options 204, 206 and 220 that are available for selection on all sub-menus presented by this console interface. These global menu options are: "Home" 204," "Help" 206," and "STATUS 220." Clicking on "Home" button 204, as one would surmise, takes the user to the "Home Page," in this case the user interface display titled as FIG. 06. Clicking on the "HELP" button 206 provides the user with a user's manual concerning the installation, operation and maintenance of the present invention. Lastly, clicking on the "STATUS" bar 220 enables, in a toggle manner, the enabling or disabling of connectivity over local TCP/IP hardware components 100 and software drivers 400 (i.e. from FIGS. 1, 2 and 13).

Lastly, with respect to the totality of FIG. 06, the user interface (as proposed in the block diagram as previously discussed above) has been designed as a common launch point for all other functions and processes required to scan a forensic image for malicious code infections using multiple malware engines simultaneously. A master dashboard such as this provides the ability to achieve the goals of the present invention in an non-haphazard or unformed manner. The operational parameters accessible through these menu options may operate as the 'glue" that holds the various aspects and functions of the present invention together as a viable entity.

With respect to the functional menu options detailed in FIG. 06, it is noted that these menu options are the top layer of a custom designed user accessible infrastructure that is supported by the operational foundation outlined in more detail below for example with respect to FIG. 13. The entire matrix of line item menu options detailed in FIGS. 07 through 12 (61 in total 222 . . . 342) are linked to one or more of these operational concepts as outlined in FIG. 13. When a user selects one of the exemplary sixty one (61) menu options 222 . . . 342 for execution they are launching (in the background) scripts and programs that utilize one or more of the conceptual entities to achieve specific goals and tasks relevant to the usage of the present invention.

Figure 7:
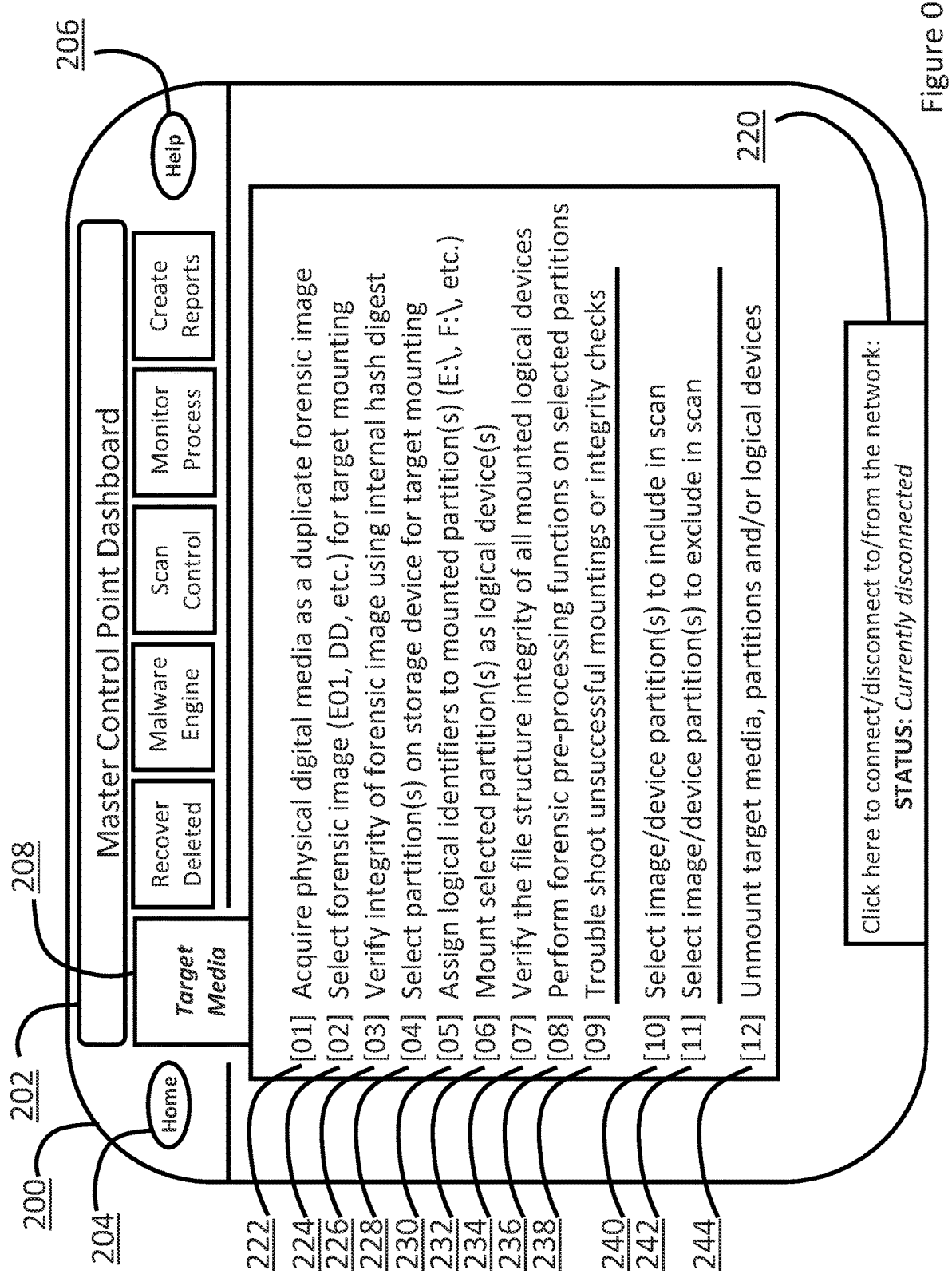
FIG. 07 is a simulated screen display interface to custom designed software application. It is titled "Master Control Point Dashboard: Target Media."

FIG. 07 is a representation of what the user would see when they clicked on either of the menu buttons labeled "Target Media" 208 as shown in FIG. 06. Twelve options are presented in this sub-menu for the specific purpose of creating a duplicate forensic image of a physical digital storage device, verifying its structural and content integrity via hash digests and then mounting the forensic image created as a logical device in a unique virtual environment. Those twelve sub-menu selections are:

[01] Acquire physical digital media as a duplicate forensic image 222

[02] Select forensic image (E01, DD, etc.) for target mounting 224

[03] Verify integrity of forensic image using internal hash digest 226

[04] Select partition(s) on storage device for target mounting 228

[05] Assign logical identifiers to mounted partition(s) (E:\, F:\, etc.) 230

[06] Mount selected partition(s) as logical device(s) 232

[07] Verify the file structure integrity of all logical devices 234

[08] Perform forensic pre-processing functions on selected partitions 236

[09] Trouble shoot unsuccessful mountings or integrity checks 238

[10] Select image/device partition(s) to include in scan 240

[11] Select image/device partition(s) to exclude in scan 242

[12] Unmount target media, partitions and/or logical devices 244

According to one arrangement, a function of the "Target Media" menu options in FIG. 07 and the associated twelve (12) menu options (lines [01] through [12] 222 . . . 244) exist for creating a forensically sound duplicate forensic image of the digital storage device suspected of being infected with malicious code. The forensic image created is intended to be the primary input to the present invention and is referenced throughout this application as the "Forensic Image" 432 presented in the overview of the conceptual components that interact with the "Master Control Point Dashboard" module 402 in FIG. 13. All of the menu options, and their related functions, detailed in FIG. 07 are in the public domain and are not cited as being unique aspects for which the present invention can make a claim.

The twelve menu options identified above and in FIG. 07 are provided for the user as a convenience and for the specific purpose of maintaining continuity with respect to the forensic pre and post processing required of data to be scanned for malicious content. All twelve options represent existing links to applications, scripts and programs available at the time of this application. For example, with reference to these menu options:

"Acquire physical digital media as a duplicate forensic image" 222 see http://marketing.accessdata.com/acton/attachment/4390/f-000d/1/-/-/-/-/file.pdf page 31 "Creating Forensic Images." Note: While FTK Imager by AccessData is a commercial application it is given away for free by AccessData to the general public.

"Verify integrity of forensic image using internal hash digest" 226 see http://en.wikipedia.org/wiki/Md5deep which is a program in the public domain capable of generating and verifying hash digest values of raw forensic images.

"Mount selected partition(s) as logical device(s)" 232 see http://marketing.accessdata.com/acton/attachment/43900/f-000d/1/-/-/-/-/file.pdf page 22 "Image Mounting." Note: While FTK Imager by AccessData is a commercial application it is given away for free by AccessData to the general public.

Because the software that enables these menu options is in the public domain they are not described in any additional detail since they are well known and understood by one with ordinary skill in the art.

Figure 8:
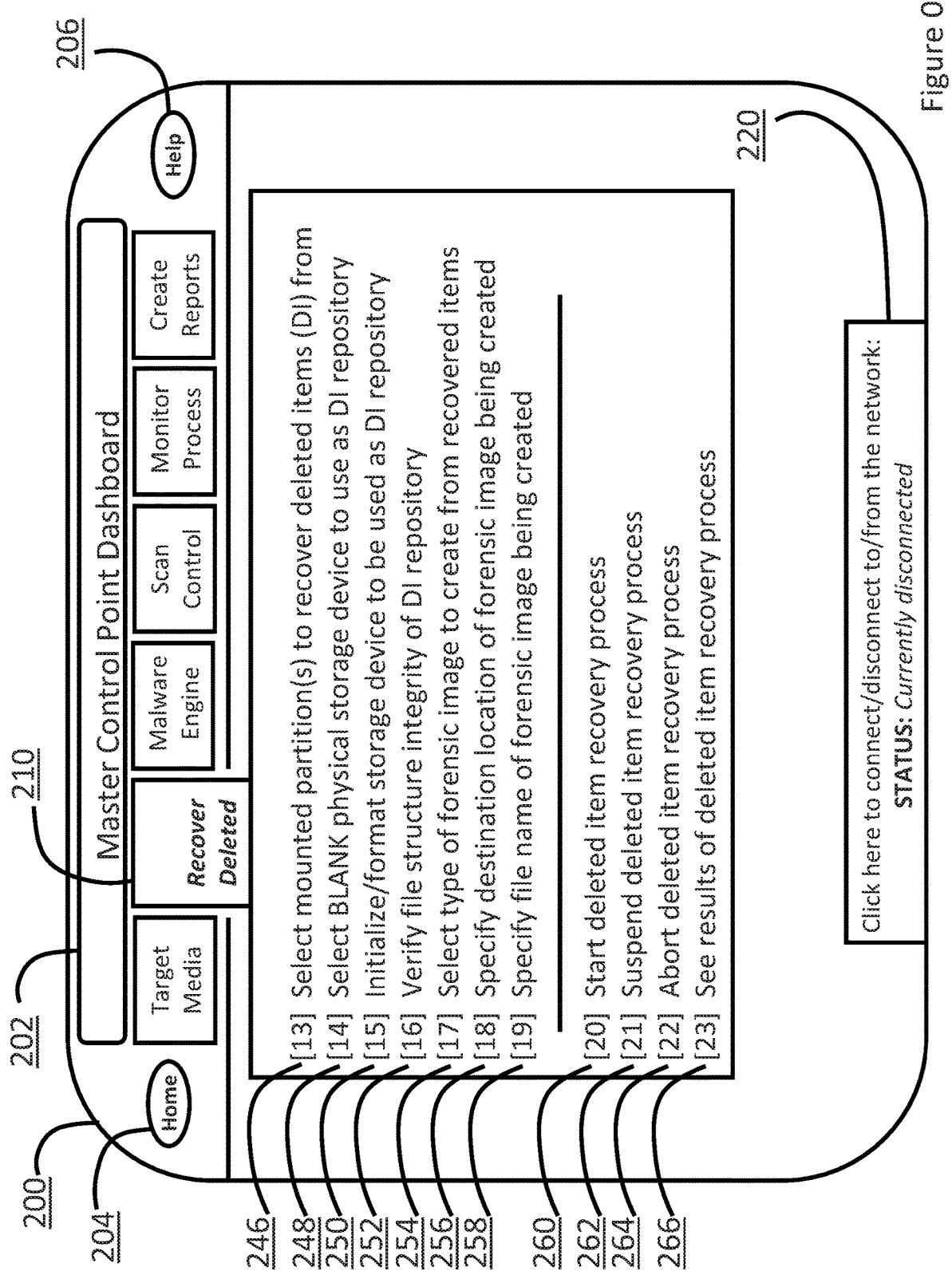
FIG. 08 is a simulated screen display interface to custom designed software application. It is titled "Master Control Point Dashboard: Recover Deleted."

FIG. 08 is a representation of what the user would see when they clicked on either of the menu buttons labeled "Recovered Deleted" 210 as shown in FIG. 06.

[13] Select mounted partition(s) to recover deleted items (DI) from 246

[14] Select BLANK physical storage device to use as DI repository 248

[15] Initialize/format storage device to be used as DI repository 250

[16] Verify file structure integrity of DI repository 252

[17] Select type of forensic image to create from recovered items 254

[18] Specify destination location of forensic image being created 256

[19] Specify file name of forensic image being created 258

[20] Start deleted file recovery process 260

[21] Suspend deleted item recovery process 262

[22] Abort deleted item recovery process 264

[23] See results of deleted item recovery process 266

According to one arrangement, a function of the "Recover Deleted" menu options in FIG. 08 includes the eleven menu options (lines [13] through [23] 246 . . . 266) which are for assisting the user in the process of scanning for and recovering deleted items from the forensic image 432 created thru the use of the menu options in FIG. 07. The interaction of the forensic image 432 is presented in the overview of the conceptual components that interact with the "Master Control Point Dashboard" module 402 in FIG. 13. Note that the "Recover Deleted" 210 process is dependent upon the existence of the forensic image 432 as an examination source, without it there can be no effort at recovering deleted files.

The eleven menu options identified above and in FIG. 08 are provided for the user as a convenience and for the specific purpose of maintaining continuity with respect to the forensic pre and post processing required of data to be scanned for malicious content. All eleven options represent existing links to applications, scripts and programs available at the time of this writing. For example, with reference to these menu options:

"[13] Select mounted partition(s) to recover deleted items (DI) from" 246 see http://www.techpathways.com ProDiscover® Basic Edition.

"[19] Specify file name of forensic image being created" 258 see http://marketing.accessdata.com/acton/attachment/4390/f-000d/1/-/-/-/-/file.pdf page 31 "Creating Forensic Images." Note: While FTK Imager by AccessData is a commercial application it is given away for free by AccessData to the general public.

"[23] See results of deleted item recovery process" 266 see http://www.techpathways.com ProDiscover Basic Edition.

Because the software that enables these menu options is in the public domain they are not described in any additional detail since they are well known and understood by one of ordinary skill in the art.

Figure 9:
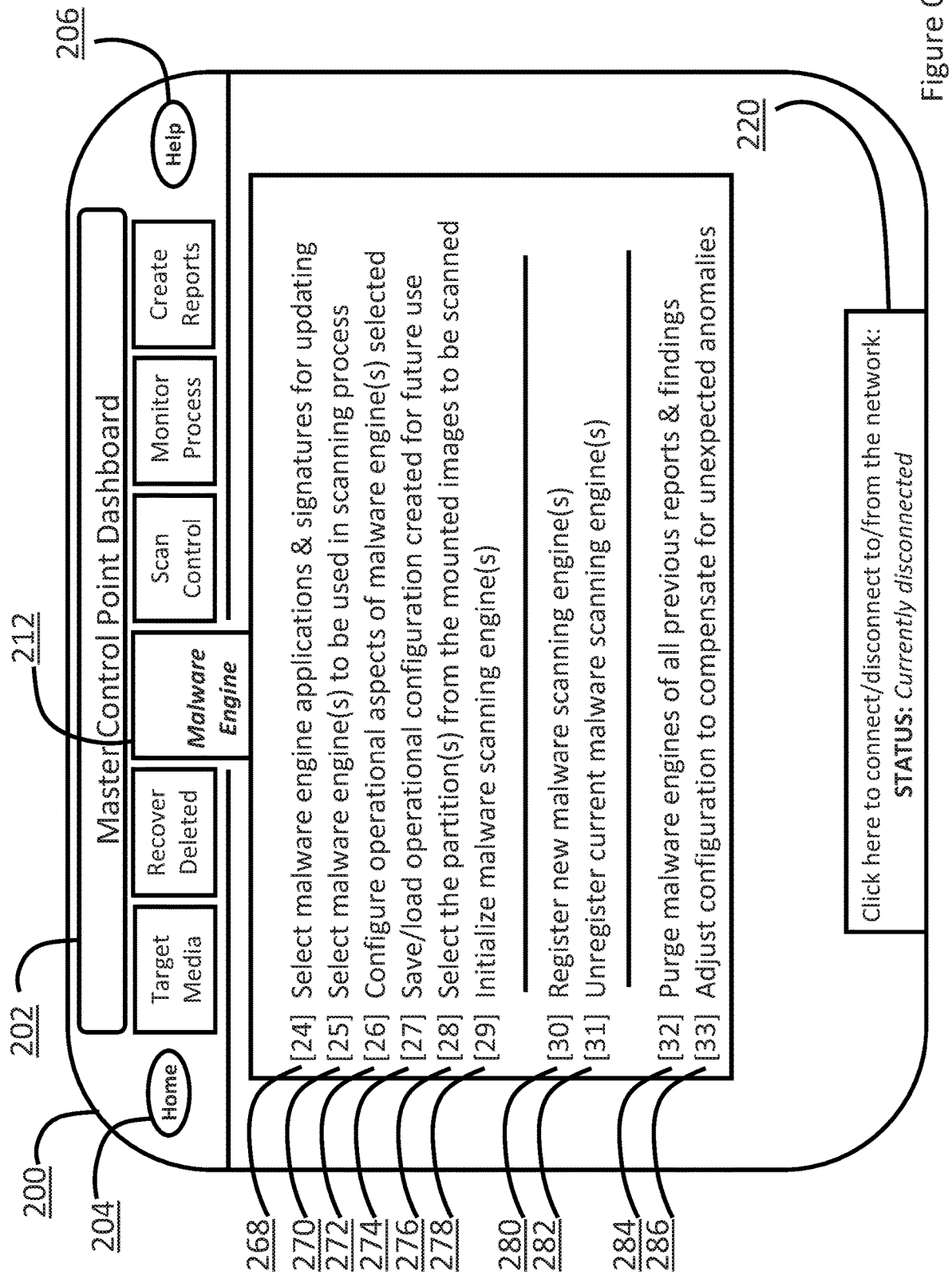
FIG. 09 is a simulated screen display interface to custom designed software application. It is titled "Master Control Point Dashboard: Malware Engine."

FIG. 09 is a representation of what the user would see when they clicked on either of the menu buttons labeled "Malware Engine" 212 as shown in FIG. 06.

[24] Select malware engine applications & signatures for updating 268

[25] Select malware engine(s) to be used in scanning process 270

[26] Configure operational aspects of malware engine(s) selected 272

[27] Save/load operational configuration created for future use 274

[28] Select the partition(s) from the mounted images to be scanned 276

[29] Initialize malware scanning engine(s) 278

[30] Register new malware scanning engine(s) 280

[31] Unregister current malware scanning engine(s) 282

[32] Purge malware engines of all previous reports & findings 284

[33] Adjust configuration to compensate for unexpected anomalies 286

"[0128] According to one arrangement, a function of the "Malware Engine" menu options in FIG. 09 (lines [24] through [33] 268 . . . 286) are for allowing the user to select and then configure one or more malware scanning engines to run against the previously created forensic image containing valid files 432 and the forensic image containing deleted items 436. Both of these forensic images 432, 436 are presented in the overview of the conceptual components that interact with the "Master Control Point Dashboard" module 402 in FIG. 13. Note that the forensic image of valid files 432 was created using the menu options in FIG. 07, while the forensic image of recovered deleted items 436 was created using the menu options in FIG. 08. All of the menu options detailed in FIG. 09 are unique with respect to the claims of the present invention."

The ten menu options identified above and in FIG. 09 are custom designed scripts and applications that are unique to the present invention. The function of each of these ten menu options is explained in detail below:

Menu Line: [24] Select malware engine applications & signatures for updating 268

Purpose: Selecting the menu option at line [24] 268 invokes a code segment compatible with the "Host Operating System" 400 that is a script or executable application programmed in such a manner that it permits the user to select one or more malware scanning engines for updating. Note that each malware scanning engine 712 . . . 714 is hosted by a different and independent virtual operating system 704 in a virtual support environment 702 as described in FIG. 16. The updating function can be as minimalistic as refreshing virus signatures to upgrading the entire malware application with a newly released version. This code segment is a sub-component of the larger "Master Control Point Dashboard Module" 402 application which hosts all of the custom designed menu functions presented in FIG. 06. The code segment for this menu line option 268 is unique in that it is designed to have the ability to communicate with every malware engine at the command line (CL) interface level, or if necessary, directly with the graphical user interface (GUI) 426 . . . 430 of the respective malware engines 712, 714.

Details on how this task can be accomplished, given that each malware engine will be different, will be stored in the "Database Module" 410 as a specific table of data. When this menu option is selected and the user identifies which malware engine(s) need to be updated, the code segment associated with this menu option will query the respective "Database Module" 410 table for instructions on how to communicate with each respective engine 712, 714 via the "Malware Engine Selection Module" 418. The code segment will then execute those instructions with the assistance of the "Configuration Control Module" 424 and launch the processes necessary to perform the updating and ensure that it is completed without error. Any problems encountered in this process will be reported to the user via the "Alerts Module" 404. In each case, the source of the data applied as updates will be Internet downloads from the malware engine's respective support web site.

Figure 13:
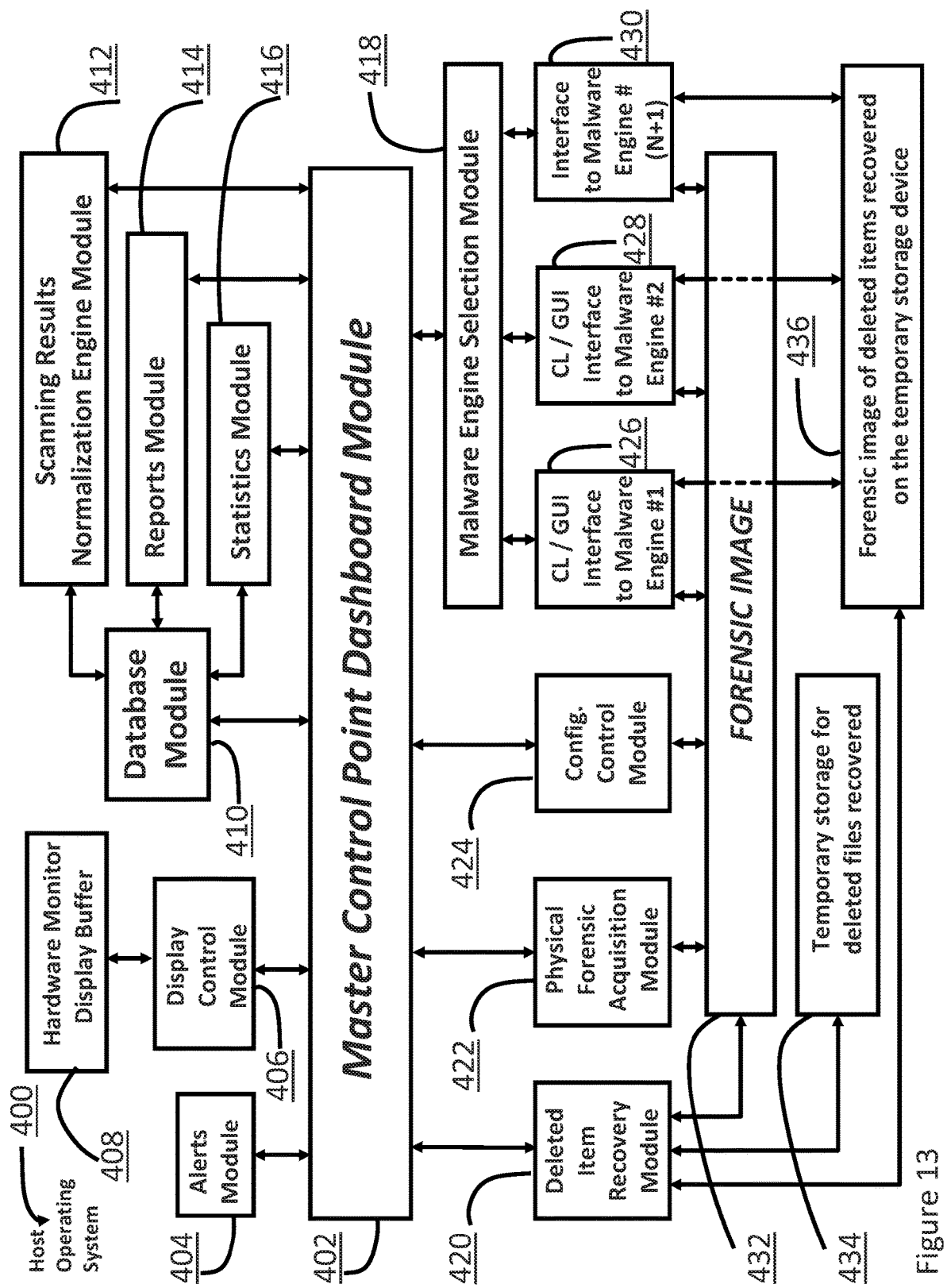
FIG. 13 is a simulated screen display interface to a custom designed software application. It is titled "Master Control Point Dashboard Module."
Figure 16:
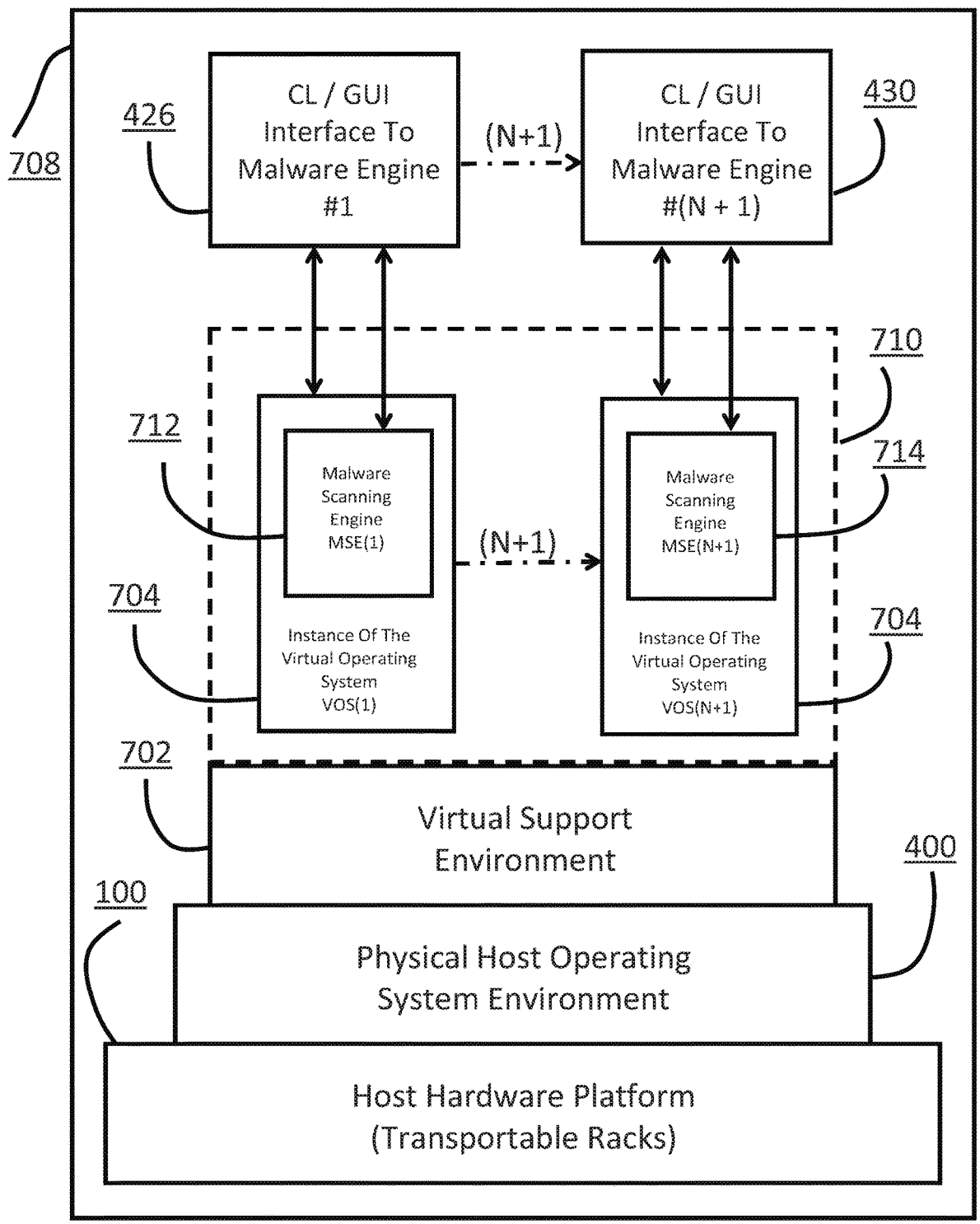
FIG. 16 is a block diagram titled "Malware Scanning Engine Platform Module" that schematically illustrates the hardware/software components required to interface with and control administrator initiated actions directed at multiple malware scanning engines for the specific purpose of simultaneously scanning a forensic image for malicious infections using multiple commercial and open source malicious code detection engines.

When the function associated with menu option [24] 268 is invoked data in the form of command and control signals will flow between/among the following operational modules as presented in FIG. 13 and FIG. 16:

(a) Host Operating System 400
(b) Master Control Point Dashboard Module 402
(c) Database Module 410
(d) Malware Engine Selection Module 418
(e) CL/GUI Interface to Malware Engine #X 426 . . . 430
(f) Malware Engine(s) 712, 714
(g) Alerts Module 404
(h) Configuration Control Module 424

Menu Line: [25] Select malware engine(s) to be used in scanning process 270

Purpose: Selecting the menu option at line [25] 270 invokes a code segment compatible with the "Host Operating System" 400 that is a script or executable application programmed in such a manner that it permits the user to select one or more malware scanning engines for use in a pending malware scanning process that will be launched against the forensic image(s) 432, 436. Note that each malware scanning engine 712, 714 is hosted by a different and independent virtual operating system 704 in a virtual support environment 702 as described in FIG. 16. The selection function performed is therefore a process that identifies which of the respective malware engines will be enabled or disabled as required based on the user's actions. This code segment is a sub-component of the larger "Master Control Point Dashboard Module" 402 application which hosts all of the custom designed menu functions presented in FIG. 06. The code segment for "Menu Option [25]" 270 is unique in that it is designed to have the ability to communicate with every malware engine at the command line (CL) interface level, or if necessary, directly with the graphical user interface (GUI) 426 . . . 430 of the respective malware engine interface 712, 714. This activity is supported by the custom designed functions built into the "Configuration Control Module" 424, the "Malware Engine Selection Module" 418 and the "Database Module" 410 which permit the user's selections to be saved in the database and then executed via the code segment associated with "Menu Option [24]" 270. Any problems encountered in this process will be reported to the user via the "Alerts Module" 404.

When the function associated with Menu Line Option [25] 270 is invoked data in the form of command and control signals will flow between/among the following operational modules as presented in FIG. 13 and FIG. 16:

(a) Host Operating System 400
(b) Master Control Point Dashboard Module 402
(c) Alerts Module 404
(d) Database Module 410
(e) Malware Engine Selection Module 418
(f) Configuration Control Module 424
(g) Command Line/Graphical User Interface to Malware Engine #X 426 . . . 428
(h) Malware Engine(s) 712, 714

Menu Line: [26] Configure operational aspects of malware engine(s) selected 272

Purpose: Selecting the menu option at line [26] 272 invokes a code segment compatible with the "Host Operating System" 400 that is a script or executable application programmed in such a manner that it permits the user to modify the operational configuration of any malware engine selected for use (by Menu Option [25-NEW] 270 above), for the purposes of enabling or disabling, specific features of each malware engine 712, 714 selected as depicted in FIG. 16. This function permits the user to directly communicate with each independent malware engine 712, 714 as hosted in its respective instance of a virtual operating system 704 via the "Malware Engine Selection Module" 418 and the respective "CL/GUI Interface to Malware Engine #X 426 . . . 430. Changes made by invoking this menu option are temporary and are lost when the "Master Control Point Dashboard Module" 402 is shut down and are not automatically saved in the "Database Module" 410 by the "Configuration Control" Module 424. Any problems encountered in this process will be reported to the user via the "Alerts Module" 404.

When the function associated with menu option [26] 272 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Malware Engine Selection Module 418
 (e) Configuration Control Module 424
 (f) Command Line/Graphical User Interface to Malware Engine #X 426 . . . 430
 (g) Malware Engine(s) 712, 714

Menu Line: [27] Save/load operational configuration created for future use 274

Purpose: Selecting the menu option at line [27] 274 invokes a code segment compatible with the "Host Operating System" 400 that is a script or executable application programmed in such a manner that it permits the user to save or restore the operational configurations of any malware engine 712, 714 enabled for use. During configuration (per Menu Option [26] 272 above) any features selected by the user are automatically recorded in a table in the Database Module 410 by the "Configuration Control Module" 424 which is hosted by the "Master Control Point Dashboard Module" 402. The configuration of each independent malware engine is then stored for future use in reports created via the "Reports Module" 414, as well as the creation of the last known good malware engine configuration which is stored in the "Database Module" 410 by the "Configuration Control Module" 424. The storage of the last known good malware engine configuration allows this data to be restored where necessary to one or more malware engines 712, 714. Any problems encountered in this process will be reported to the user via the "Alerts Module" 404.

When the function associated with menu option [27] 274 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Reports Module 414
 (f) Configuration Control Module 424
 (g) Command Line/Graphical User Interface to Malware Engine #X 426 . . . 430
 (h) Malware Engine(s) 712, 714

Menu Line: [28] Select the partition(s) from the mounted images to be scanned 276

Purpose: Selecting the menu option at line [28] 276 invokes a code segment compatible with the "Host Operating System" 400 that is a script or executable application programmed in such a manner that it permits the user to select which partitions (logical or physical) that have been discovered in the "Forensic Image" 432 will be scanned for malicious code infections. Access to the "Forensic Image" 432 is provided through the "Master Control Point Dashboard Module" 402 and the associated code segments related to the functions of the "Malware Engine Selection Module" 418 and the "CL/GUI Interface to Malware Engines #X 426 . . . 430 and the malware engines themselves 712, 714. Physical partitions are selected for mounting using "Menu Option [04]" 228 and logical partitions are selected for mounting using "Menu Option [06]" 232. Logical identifiers for mounted partitions/volumes are selected using "Menu Option [05]" 230. "Menu Option [28]" 276 requires that the user has per-selected at least one physical or logical partition/volume for mounting using menu options [04] 228, [05] 230 or [06] 232. As noted previously code segments for these three menu options are in the public domain. Once invoked "Menu Option [28]" 276 will present the user with a check list of available partitions, logical devices and storage volumes. Checked items that reflect the user's selection are saved by the "Configuration Control Module" 424 in a scan-table in the "Database Module 410." Any problems encountered in this process will be reported to the user via the "Alerts Module" 404.

When the function associated with menu option [28] 276 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Malware Engine Selection Module 418
 (f) Configuration Control Module 424
 (g) Command Line/Graphical User Interface to Malware Engine #X 426 . . . 430
 (h) Malware Engine(s) 712, 714
 (i) Forensic Image 432

Menu Line: [29] Initialize malware scanning engine(s) 278

Purpose: Selecting the menu option at line [29] 278 invokes a code segment compatible with the "Host Operating System" 400 that is a script or executable application programmed in such a manner that it performs system pre-checks designed to verify that the operational environment supported by the "Host Operating System" 400 is properly configured with the appropriate resources necessary to run the malware scanning engine(s) on the partitions selected using "Menu Option [28] 276. For example, the "Virtual Support Environment" 702 and the "Instances of Virtual Operating Systems" 704 that host the "Malware Scanning Engine(s)" 712, 714 as described in FIG. 16 are sensitive to the amount of disk space and RAM memory allocated to each from the parent "Host Operating System" 400. The code segment associated with "Menu Option [29]" 278 is a custom designed analysis program that evaluates the resources committed to the various components of the virtual environment and makes recommendations for possible configuration changes to the user in the form of reports generated by the "Alerts Module". During this evaluation process the "Configuration Control Module" 424 queries the "Database Module" 410 in response to the commands originating from the code segment for "Menu Option [29] 278 to determine which malware engines are presently selected 712, 714. Once that is established the "Master Control Point Dashboard Module" 402 contacts the "Malware Engine Selection Module" 418 and queries the respective "CL/GUI Interface to Malware Engine #X" 426 . . . 430 so that the current configuration of the virtual operating system 704 can be reviewed. In addition, the current operational parameters of the "Host Operating System" 400 and the "Virtual Support Environment" 702 are also examined. Using custom designed algorithms the code segment for "Menu Option [29] 278 analyses all operational parameters and makes recommendations to the user on the best means possible to initialize the malware engines 712, 714 and their environment so maximum productivity is realized. The user is advised of these recommended findings via the "Alerts Module" 404.

When the function associated with menu option [29] 278 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Database Module 410
  (e) Malware Engine Selection Module 418
  (f) Configuration Control Module 424
  (g) Command Line/Graphical User Interface to Malware Engine #1 426 . . . 430
  (h) Malware Engine(s) 712, 714

Menu Line: [30] Register new malware scanning engine(s) 280

Purpose: Selecting the menu option at line [30] 280 invokes a code segment compatible with the "Host Operating System" 400 that is a script or executable application programmed in such a manner that it permits the user to register new scanning engines for future use. This action is basically an inventory update to data maintained in the "Database Module" 410 concerning the type of malware scanning engine available for use and its operational features. In addition, the registration process allows the users to annotate specific details concerning the capabilities of each malware engine so that these features can be enabled/disabled by the user as a default operational configuration. The code segment from "Menu Option [30]" 280 is designed to accomplish this registration process by interacting with the "Configuration Control Module" 424, which in turns populates the "Database Module" 410 with operational details that are obtained from the user, as well as operational feedback obtained from launching the malware engines 712, 714 in a test environment. The test environment is facilitated by code segments associated with "Menu Option [30]" 280 that communicates with the "Master Control Point Dashboard 402, which in turn instructs the "Malware Engine Selection Module" 418 to select the appropriate combination of "CL/GUI Interface to Malware Engine #X" 426 . . . 430 and malware engine 712 714 modules for testing. The user is advised of the results obtained as well as any problems encountered via the "Alerts Module" 404.

When the function associated with "Menu Option [30]" 280 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Database Module 410
  (e) Malware Engine Selection Module 418
  (f) Malware Engine(s) 712, 714
  (g) Configuration Control Module 424
  (h) Command Line/Graphical User Interface to Malware Engine #1 426 . . . 430

Menu Line: [31] Unregister current malware scanning engine(s) 282

Purpose: Selecting the menu option at line [31] 282 invokes a code segment compatible with the "Host Operating System" 400 that is a script or executable application programmed in such a manner that it permits the user to select and remove all operational data concerning a malware engine 712, 714 that has been previously registered. This menu option is specifically designed to reverse the malware engine registration process detailed above in the description of "Menu Option [30]" 280. In this case, the code segment associated with "Menu Option [31]" 282 communicates to the "Master Control Point Dashboard" 402, which in turn communicates to the "Configuration Control Module" 424 instructions that result in queries being sent to the "Database Module" 410 that result in the purging of all data related to the malware engine selected for elimination. The user is advised of the purging results as well as any problems encountered via the "Alerts Module" 404.

When the function associated with "Menu Option [31]" 282 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Database Module 410
  (f) Malware Engine(s) 712, 714
  (g) Configuration Control Module 424

Menu Line: [32] Purge malware engines of all previous reports & findings 284

Purpose: Selecting the menu option at line [32] 284 invokes a code segment compatible with the "Host Operating System" 400 that is a script or executable application programmed in such a manner that it permits the user to selectively delete log files and internal reports produced by the malware engines 712, 714 registered for use (per "Menu Option [30]" 280). The logs and reports in question are pre-programmed by the malware engine vendors as either default reports or specialized reports. Regardless of the type of report, those logs or reports that can be individually selected are controllable thru the use of "Menu Option [30]" 280, the registration process. At issue here is that these malware engines 712 714 are used and reused numerous times on a daily basis, scanning different forensics images 432 436. To prevent the possibility that a log or report from a previous scan can be mistakenly included as a report or log generated by a pending scheduled scan there needs to be a function capable of wiping all former reports generated by the malware engines 712, 714 prior to starting a new malware scan. The code segment associated with "Menu Option [32]" 284 is designed to access each malware engine 712, 714 independently and configure the malware engine itself 712, 714, as well as its "Instance Of A Virtual Operating System" 704 so that existing logs and reports in designated folders, as well as internal configuration parameters can be reset so that all previous logs and reports are wiped from the system. To accomplish this goal the code segment associated with "Menu Option [32] 284 communicates to the "Master Control Point Dashboard" 402, which in turn requests the "Configuration Control Module" 424 to query the "Database Module" 410 for default-table data on what internal reports and logs exist on this specific malware engine. This data would have been created when the user selected and executed "Menu Option [26]" 272 and "Menu Option [30]" 280. With the operational parameters of the respective malware engine in hand the code segment would then use the "Malware Engine Selection Module" 418 to select the appropriate "CI/GUI Interface to Malware Engine #X" 426 . . . 430 and malware engine 712, 714 so that it could be communicated to directly via command line (CL) options or the Graphical User Interface (GUI). Once the communication channel was established commands would be issued by the code segment associated with "Menu Option [34]" 284 directly to the malware engine to wipe all reports and logs. The user is advised of the purging results as well as any problems encountered via the "Alerts Module" 404. Note that the logs and reports wiped are not part of the "Database Module" 410, but rather are found in specific folders in the logical storage devices allocated to the "Malware Scanning Engines" 712, 714 in their respective instances of the "Virtual Operating System" 704 as supported by the "Virtual Support Environment" 702 per FIG. 16.

When the function associated with menu option [32] 284 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Database Module 410
  (e) Malware Engine Selection Module 418
  (f) Configuration Control Module 424
  (g) Command Line/Graphical User Interface to Malware Engine #1 426 . . . 430
  (h) Malware Engine(s) 712, 714

Menu Line: [33] Adjust configuration to compensate for unexpected anomalies 286

Purpose: Selecting the menu option at line [33] 286 invokes a code segment compatible with the "Host Operating System" 400 that is a script or executable application programmed in such a manner that it permits the user to control, at a very granular level, the execution of all code segments launched thru, from or by the "Master Control Point Dashboard Module" 402. This menu option function is basically a troubleshooting capability that supports code debugging so that unanticipated errors can be resolved. All of the code segments associated with all of the modules presented in FIG. 13 are compiled with a "DEBUG" flag that by default is turned off. The code segment associated with "Menu Option [33]" 286 turns this "DEBUG" flag on for all modules, allowing the user to single step through the code or to set arbitrary breakpoints at locations throughout the code for the purposes of troubleshooting errors. These trigger points can be logical points associated with the process itself, or specific module functions, or both. Options in this process are presented to the user via the "Alerts Module" 404. It is assumed that insights gained from this troubleshooting effort will allow the user to adjust the operational configuration of the scanning process to compensate for unexpected problems.

When the function associated with "Menu Option [33]" 286 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404

The purpose of such a menu option would be to return to prior menu options to adjust for unexpected results.

Figure 10:
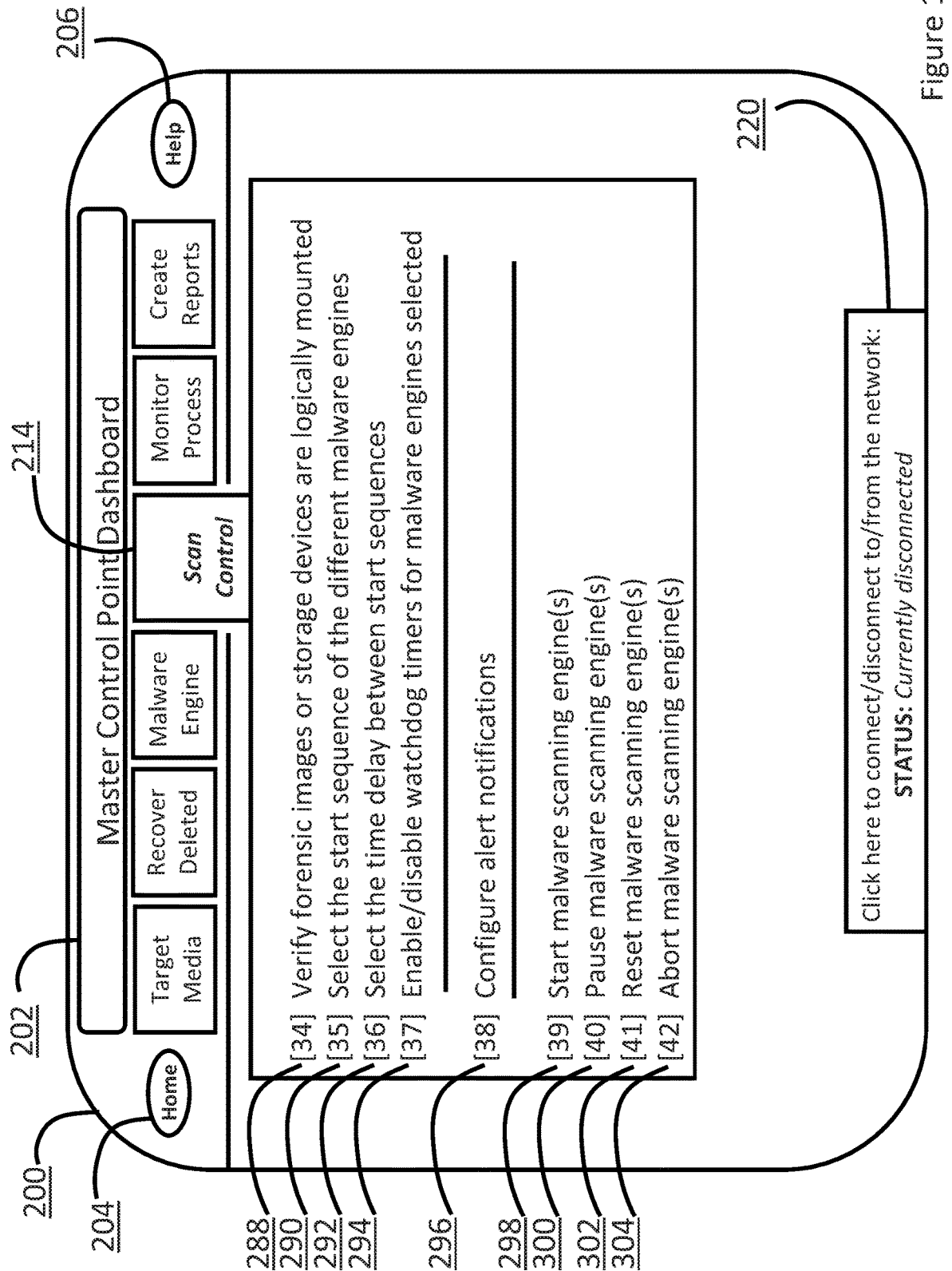
FIG. 10 is a simulated screen display interface to custom designed software application. It is titled "Master Control Point Dashboard: Scan Control."

FIG. 10 is a representation of what the user would see when they clicked on either of the menu buttons labeled "Scan Control" 214 as shown in FIG. 06:
  [34] Verify forensic images or storage devices are logically mounted 288
  [35] Select the start sequence of the different malware engines 290
  [36] Select the time delay between start sequences 292
  [37] Enable/disable watchdog timers for malware engines selected 294
  [38] Configure alert notifications 296
  [39] Start malware scanning engine(s) 298
  [40] Pause malware scanning engine(s) 300
  [41] Reset malware scanning engine(s) 302
  [42] Stop malware scanning engine(s) 304

According to one arrangement, a function of the "Scan Control" menu options in FIG. 10 includes nine menu options (lines [34] through [42] 288 . . . 304) that allow the user to control, at a granular level, all activity related to the running of the multiple malware scanning engines in parallel as well as confirming the integrity of the forensic object(s) they will be scanning. The "Scan Control" 214 functions are dependent on the default functions of the "Configuration Control Module" 424 and the "Malware Engine Selection Module" 418 presented in the overview of the "Master Control Point Dashboard" module 402 in FIG. 13. All of the menu options, and their related functions, detailed in FIG. 10 are unique with respect to the claims of the present invention.

The nine menu options identified above and in FIG. 10 are custom designed scripts and applications that are unique to the present invention.

Menu Line: [34] Verify forensic images or storage devices are logically mounted 288

Purpose: Selecting the menu option at line [34] 288 invokes a code segment compatible with the "Host Operating System" 400 that is a script or executable application programmed in such a manner that it permits the user to select and then verify that the logical storage devices, as found in the forensic images 432, 436, that need to be scanned, are mounted correctly within the Windows environment as operational logical devices. Note: This is the last configuration check prior to starting the scanning process. The code segment associated with "Menu Option [34]" 288 is designed to communicate independently with the respective "Instance Of The Virtual Operating System" 704 to ensure that previous actions executed by "Menu Option [06]" 232 have been successful and the digital storage device(s) previously selected is/are ready to be scanned. To accomplish this task the code segment associated with "Menu Option [34]" 288 establishes a communication channel with the "Master Control Point Dashboard Module" 402, which in turn communicates with the "Configuration Control Module" 424, which queries the "Database Module" 410 to determine which partitions in the forensic image(s) 432, 436 have been previously mounted as logical devices through the execution of "Menu Option [06]" 232. This list is then compared to the user's logical selections made previously with respect to "Menu Option [34]" 288, such that matches that occur are tested to confirm their operational status. This test is accomplished by first enabling "Malware Engine Selection Module" 418 to provide a communications path through the "CL/GUI Interface to Malware Engine #X" 426 . . . 430 to the "Instance Of The Virtual Operating System" 704 that is currently supporting one of the "Malware Scanning Engines" 712 714. Once connected to the appropriate "Instance Of The Virtual Operating System" 704 the code segment associated with "Menu Option [34]" 288 confirms that command line utilities and functions compatible with the "Host Operating System" 400 can communicate with the logical device. The user is advised of the testing results as well as any other problems encountered via the "Alerts Module" 404.

When the function associated with "Menu Option [34]" 288 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Malware Engine Selection Module 418
 (f) Malware Engine(s) 712, 714
 (g) Configuration Control Module 424
 (h) Command Line/Graphical User Interface to Malware Engine #1 426 . . . 430
 (i) Forensic Image 432
 (j) Forensic image of deleted items recovered on the temp. storage device 436

Menu Line: [35] Select the start sequence of the different malware engines 290

Purpose: Selecting the menu option at line [35] 290 invokes a code segment compatible with the "Host Operating System" 400 that is a script or executable application programmed in such a manner that it permits the user to select the starting sequence for all the enabled "Malware Scanning Engines" 712, 714. The selection and enabling of the respective malware engines would have occurred when the user previously executed "Menu Options [25]" 270 and "Menu Options [29]" 278. This menu option addresses the problem where launching multiple "Malware Scanning Engines" 712, 714 at the same time results in system hangs and crashes due to the allocation of limited resources (hard disk space and RAM memory). This problem is resolved by configuring the "Virtual Support Environment" 702 to only start the next "Instance Of The Virtual Operating System" 704 after the previous instance has become fully operational. This scheduling task is facilitated by the code segment associated with "Menu Option [35]" 290 such that it communicates with the "Master Control Point Dashboard Module" 402 in such a manner that the "Configuration Control Module" 424 updates the startup-a specific table in the "Database Module 410 that is used to control the startup sequence of the virtual operating system instances. By default, this startup-table is configured to start all "Instances Of The Virtual Operating System" 704 at the same time. "Menu Option [35]" 290 allows that default status to be changed as required by the user. The user is advised of the start-up scheduling reconfiguration results as well as any other problems encountered via the "Alerts Module" 404.

When the function associated with "Menu Option [35]" 290 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Configuration Control Module 424
 (f) Malware Engine(s) 712, 714

Menu Line: [36] Select the time delay between start sequences 292

Purpose: Selecting the menu option at line [36] 292 invokes a code segment compatible with the "Host Operating System" 400 that is a script or executable application programmed in such a manner that it permits the user to select the time delays imposed between the starting sequence for all the enabled "Malware Scanning Engines" 712, 714. The selection and enabling of the respective malware engines would have occurred when the user previously executed "Menu Options [25]" 270 and "Menu Options [29]" 278. This particular menu option addresses the problem of launching multiple "Malware Scanning Engines" 712, 714 at the same time which can result in system hangs and crashes due to the allocation of limited resources (hard disk space and RAM memory). This problem is resolved by configuring the "Virtual Support Environment" 702 to only start the next "Instance Of The Virtual Operating System" 704 after a specific time period has elapsed as selected by the user. This scheduling task is facilitated by the code segment associated with "Menu Option [36]" 292 such that it communicates with the "Master Control Point Dashboard Module" 402 in such a manner that the "Configuration Control Module" 424 updates the startup-table in the "Database Module 410 that is used to control the time delay between the startup sequences of the virtual operating system instances 704. By default, the startup-table is configured to start all "Instances Of The Virtual Operating System" 704 at the same time. "Menu Option [36]" 292 allows that default status to be changed as required by the user. The user is advised of the time delay scheduling reconfiguration results as well as any other problems encountered via the "Alerts Module" 404.

When the function associated with "Menu Option [36]" 292 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Configuration Control Module 424
 (f) Malware Engine(s) 712, 714

Menu Line: [37] Enable/disable watchdog timers for malware engines selected 294.

It is noted that a watchdog timer is an electronic timer that is used to detect and recover from computer malfunctions. During normal operation, the computer regularly restarts the watchdog timer to prevent it from elapsing, or "timing out". If, due to a hardware fault or program error, the computer fails to restart the watchdog, the timer will elapse and generate a timeout signal. The timeout signal is used to initiate corrective action or actions. The corrective actions typically include placing the computer system in a safe state and restoring normal system operation. Watchdog timers are commonly found in computer-controlled equipment where humans cannot easily access the equipment or would be unable to react to faults in a timely manner. Source: http://en.wikipedia.org/wiki/Watchdog_timer Purpose: Selecting the menu option at line [37] 294 invokes a code segment compatible with the "Host Operating System" 400 that is a script or executable application programmed in such a manner that it permits the user to enable or disable watchdog timers for each "Malware Scanning Engine" 712, 714 previously selected for use by the user via "Menu Option [25]" 270. By default, watchdog timers are annotated as "disabled" in the watchdog-table in the "Database Module" 410. During the initialization phase of the "Malware Scanning Engines" 712, 714, as initiated by the user's execution of "Menu Option [29] 278, the "Master Control Point Dashboard Module" 402 communicates with the Configuration Control Module 424, which then queries the aforementioned watchdog-control table in the "Database Module" 410 to determine if the watchdog timers should be enabled for the respective malware engines currently being initialized. The code segment associated with this specific menu option is the only means by which the default "disabled" status can be changed to "enabled." "Menu Option [37]'s" 294 purpose is to toggle the status of the watchdog timer at the request of the user. If a watchdog timer is enabled for one or more malware engines, by the user, this watchdog function is made operational prior to the starting of the respective "Malware Scanning Engines" 712, 714 as facilitated by "Menu Option [39] 298. Should a watchdog timer be enabled and then found to have "timed out" due to operational issues, the user would be notified of this event via the Alerts Module 404.

When the function associated with "Menu Option [37]" 294 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Database Module 410
(e) Configuration Control Module 424
(f) Malware Engine(s) 712, 714

Menu Line: [38] Configure alert notifications 296

Purpose: Selecting the menu option at line [38] 296 invokes a code segment compatible with the "Host Operating System" 400 that is a script or executable application programmed in such a manner that it permits the user to select how he or she should be notified of events related to the operation and execution of all menu options. By default, a notification-table exists in the "Database Module" 410. During the installation of the software that is the embodiment of the present invention, this table is set to "console mode." Console mode is limited to communications to and from the primary screen display and the keyboard. The code segment associated with "Menu Option [38]" 296 allows the user to repopulate this notification-table with notification parameters that are applicable to the operation of all "Malware Scanning Engines" 712, 714 enabled, or it can be configured at a much more granular level such that different notification techniques are associated with specific malware engines. For example, the notification-table entry associated with Malware Scanning Engine #1 can be configured to only use the console for notifications, while Malware Scanning Engine #2 can be configured to use a specific e-mail address for all notifications. In another case, Malware Scanning Engine #3 can be configured to use both console and e-mail notification techniques. Regardless of the selections made, the user's choices are communicated by this code segment to the "Master Control Point Dashboard Module" 402 which in turn communicates to the "Configuration Control Module" 424 advising it to query the "Database Module" 410 and modify the notification-table parameters as required based on the user's modification requests. During the startup of the "Master Control Point Dashboard" 200 by the Host Operating System 400 this notification-table is queried to determine past advisements and put those choices are put in place as default values for each of the respective malware engines.

When the function associated with "Menu Option [38]" 296 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Database Module 410
(e) Configuration Control Module 424
(f) Malware Engine(s) 712, 714

Menu Line: [39] Start malware scanning engine(s) 298

Purpose: Selecting the menu option at line [39] 298 invokes a code segment compatible with the "Host Operating System" 400 that is a script or executable application programmed in such a manner that it verifies that all required pre-processing for malware scanning has been completed by the user and the process is ready to be started. The code segment associated with "Menu Option [39]" 298 is basically a dynamic check list of six items that is designed to verify that the following major tasks have been initialized and configured in such a manner that the malware scanning process can be initiated without encountering any errors.

Those major tasks are:

{01} That a forensic image 432 of the digital storage device suspected of being infected has been acquired and has been mounted as a logical device and at least one logical partition has been selected for scanning (FIG. 07).

{02} That if required, the forensic image 432 has been analyzed for the existence of deleted items and those items recovered so that they can be converted to a forensic image of deleted items 436 for later analysis (FIG. 08).

{03} That the malware scanning engines 712, 714 have been registered and configured for proper operation. Proper operation includes verification that all malware scanning engines have the most recent signature updates as well as application versions. Proper configuration also includes the purging of all previous reports internally generated by the malware engines. In addition, the process verifies that the selected operational parameters have been saved for future reference. Lastly, this step re-confirms that at least one of the partitions found within the forensic images 432 436 has been selected for malware scanning (FIG. 09).

{04} That the watchdog timers 294 have been properly configured (if required) and that the startup sequence of the malware scanning engines, along with startup time delays have been properly configured for use. In addition, this check list step verifies that the parameters associated with the alert notifications are capable of communicating to the user as envisioned (FIG. 10).

Figure 11:
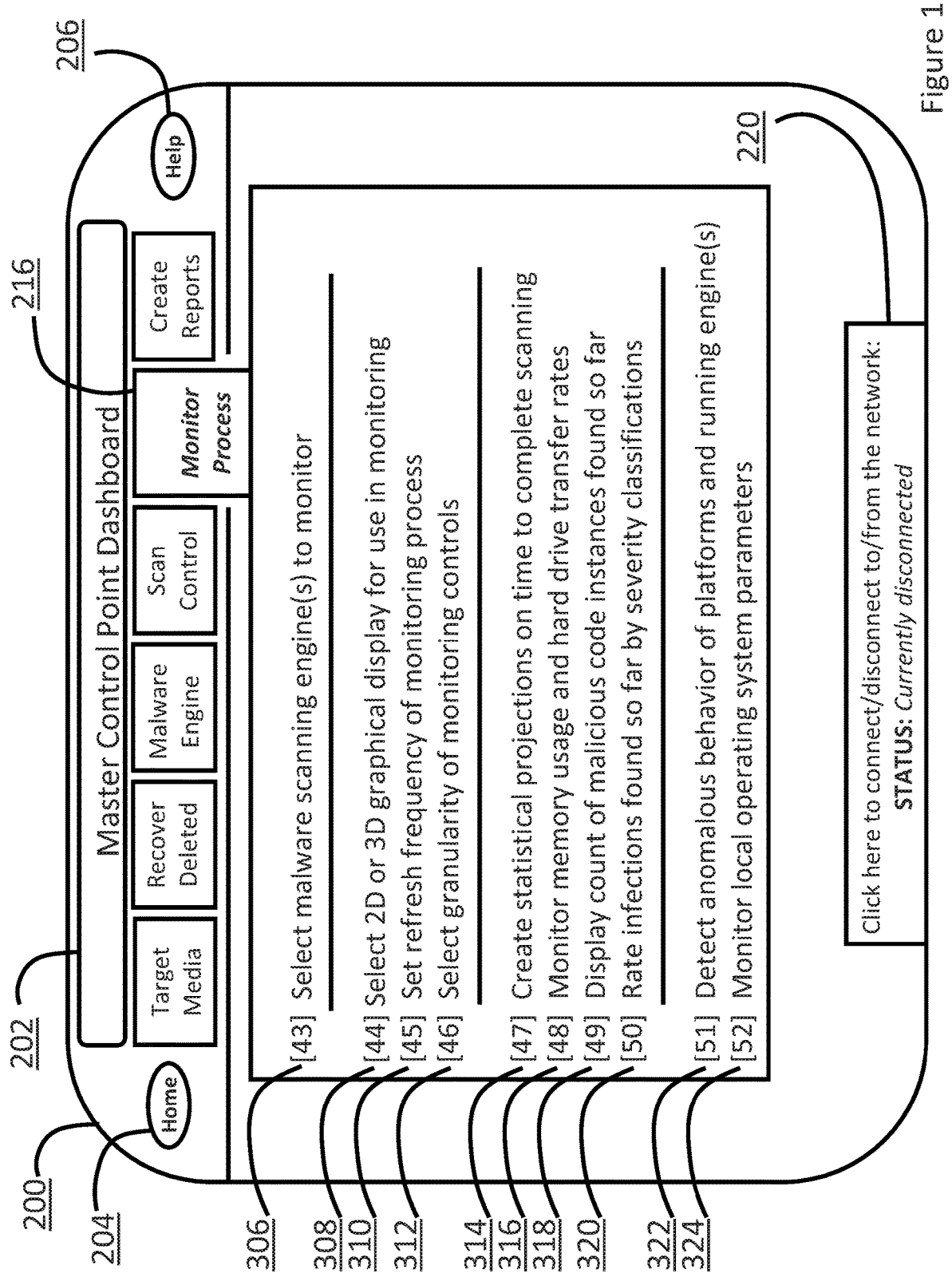
FIG. 11 is a simulated screen display interface to custom designed software application. It is titled "Master Control Point Dashboard: Monitor Process."

{05} That the real time monitor process has been properly configured so that the user can monitor the entirety of the malware scanning process or specific engines from different perspectives without generating any errors. In addition, this check list step also tracks that alerts of an urgent nature, if requested by the user, have been identified as having priority status with respect to the alerts notification system (FIG. 11).

Figure 12:
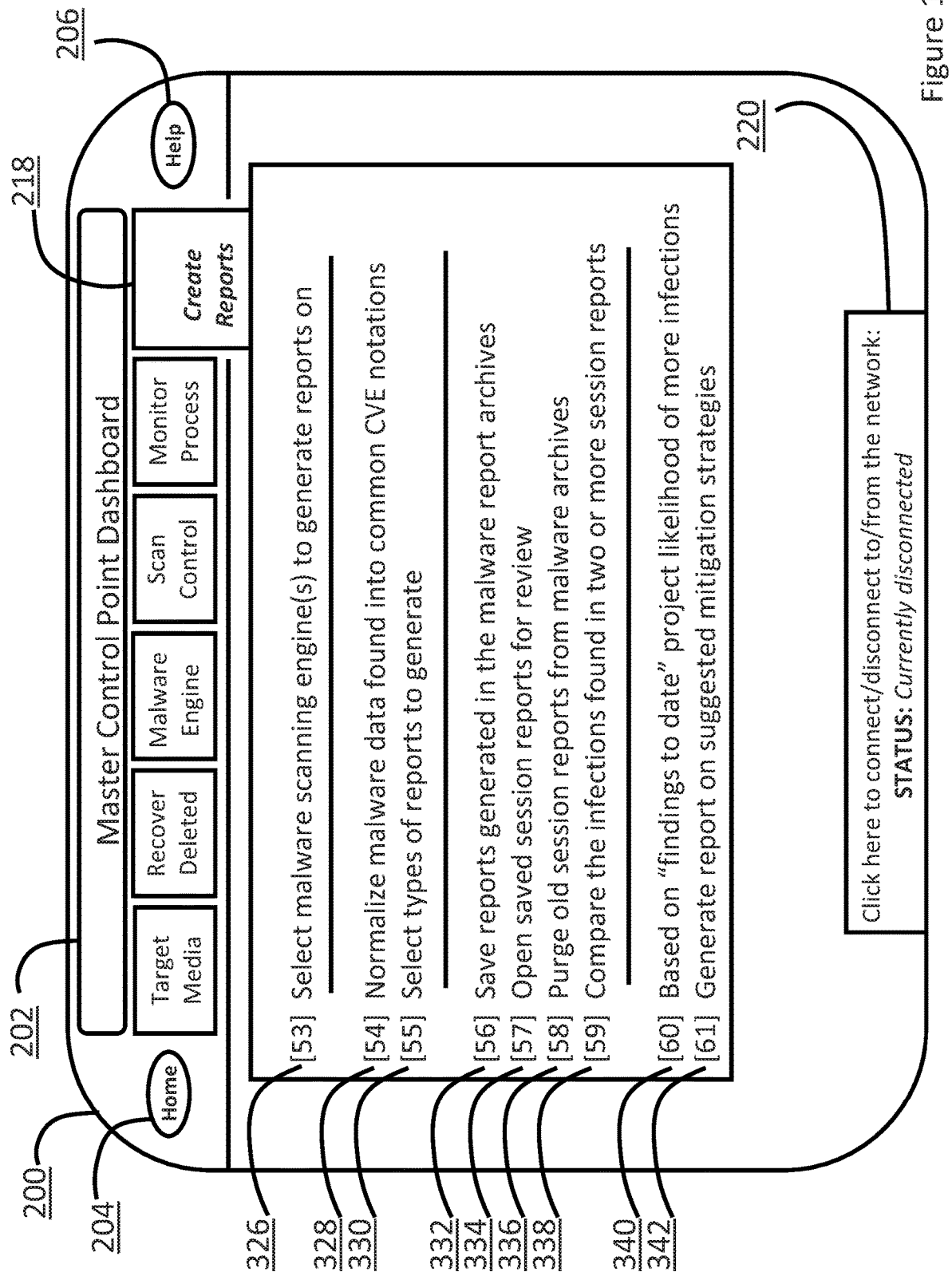
FIG. 12 is a simulated screen display interface to custom designed software application. It is titled "Master Control Point Dashboard: Create Reports."

{06} That the system has to ability to communicate to the proper ports and devices for the purpose of producing formal and informal reports. In addition, this check list system also verifies that test reports can be saved and deleted as well as normalized (when required) with respect to naming conventions for known viruses and malicious code infections. Also verified is that keyword searches can be run against historical test reports that are in the database archive, producing results as anticipated. Lastly, using test data the check list process verifies that statistical projections can be made within acceptable parameters (FIG. 12).

These operational items are verified by the code segment associated with "Menu Option [39]" 298 by making queries to the "Database Module" 410 through the "Master Control Point Dashboard Module" 402 and the "Configuration Control Module 424. All of the above check list items are tables in the "Database Module 410. As the check list items in each table are satisfied and confirmed to be operational, a "good-to-go" ranking is established for all malware scanning engines selected. Once all malware scanning engines selected for use have achieved this status a single "GO" command is generated by this code segment using the following signal path: "Master Control Point Dashboard Module 402" to "Malware Engine Selection Module" 418 to each respective (user selected) "Command Line/Graphical User Interface to Malware Engine #X" 426 . . . 430 and "Malware Scanning Engine" 712, 714. When the "GO" signal command is received each malware scanning engine executes per its respective configuration. The user is advised of any problems encountered via the "Alerts Module" 404.

When the function associated with "Menu Option [39]" 298 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Malware Engine Selection Module 418
 (f) Malware Engine(s) 712, 714
 (g) Configuration Control Module 424
 (h) Command Line/Graphical User Interface to Malware Engine #1 426 . . . 430
 (i) Forensic Image 432
 (j) Forensic image of deleted items recovered on the temp. storage device 436

Menu Line: [40] Pause malware scanning engine(s) 300

Purpose: Selecting the menu option at line [40] 300 invokes a code segment compatible with the "Host Operating System" 400 that is a script or executable application programmed in such a manner that a signal can be sent to one or more "Malware Scanning Engines" 712, 714 for the purpose of pausing the scanning process. When the code segment associated with "Menu Option [40]" 300 is executed by the user the following sequence of events occurs. The "Master Control Point Dashboard Module" 402 is communicated with and advised that a pause signal needs to be sent to one or more malware scanning engines. The "Master Control Point Dashboard Module" 402 queries the "Configuration Control Module" 424 which in turns sends a query to the "Database Module" 410 requesting details on all malware engines currently running scans. The data returned to the "Configuration Control Module" 424, in the form of the running-table, quantifies which engines are running and therefore are capable of being paused. The "Configuration Control Module" 424 then advises the "Master Control Point Dashboard Module" 402 that it needs to send one or more pause signals to the respective malware scanning engines. The "Master Control Point Dashboard Module" 402 then uses the "Malware Engine Selection Module" 418 to select the appropriate "Command Line/Graphical User Interface to Malware Engine #X" 426 . . . 430 which in turn, accesses the appropriate "Malware Scanning Engine" 712, 714 and issues a pause signal. Upon receipt of the pause signal the "Malware Scanning Engine" 712, 714 enters a "paused state" awaiting further instructions. The user is advised of any problems encountered via the "Alerts Module" 404.

When the function associated with "Menu Option [40]" 300 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Malware Engine Selection Module 418
 (f) Malware Engine(s) 712, 714
 (g) Configuration Control Module 424
 (h) Command Line/Graphical User Interface to Malware Engine #1 426 . . . 430

Menu Line: [41] Reset malware scanning engine(s) 302

Purpose: Selecting the menu option at line [40] 300 invokes a code segment compatible with the "Host Operating System" 400 that is a script or executable application programmed in such a manner that a signal can be sent to one or more "Malware Scanning Engines" 712, 714 for the purpose of resetting the scanning process to a known operational state. Typically, the reset status takes each of the malware scanning engines to a state equivalent to a new install. When the code segment associated with "Menu Option [41]" 302 is executed by the user the following sequence of events occurs. The "Master Control Point Dashboard Module" 402 is communicated with and advised that a reset signal needs to be sent to one or more malware scanning engines. The "Master Control Point Dashboard Module" 402 queries the "Configuration Control Module" 424 which in turns sends a query to the "Database Module" 410 requesting details on all malware engines currently running scans. The data returned to the "Configuration Control Module" 424, in the form of the running-table, quantifies which engines are running and therefore are capable of being reset. The "Configuration Control Module" 424 then advises the "Master Control Point Dashboard Module" 402 that it needs to send one or more reset signals to the respective malware scanning engines. The "Master Control Point Dashboard Module" 402 then uses the "Malware Engine Selection Module" 418 to select the appropriate "Command Line/Graphical User Interface to Malware Engine #X" 426 . . . 430 which in turn, accesses the appropriate "Malware Scanning Engine" 712, 714 and issues a reset signal. Upon receipt of the reset signal the "Malware Scanning Engine" 712, 714 enters a "reset state" awaiting further instructions. The user is advised of any problems encountered via the "Alerts Module" 404.

When the function associated with "Menu Option [41]" 302 is invoked data in the form of command and control signals will flow between/among the following operational modules as presented in FIG. 13 and FIG. 16:
 (a) Host Operating System 400
 (b) Master Control Point Dashboard Module 402
 (c) Alerts Module 404
 (d) Database Module 410
 (e) Malware Engine Selection Module 418
 (f) Malware Engine(s) 712, 714
 (g) Configuration Control Module 424
 (h) Command Line/Graphical User Interface to Malware Engine #1 426 . . . 430

Menu Line: [42] Abort malware scanning engine(s) 304

Purpose: Selecting the menu option at line [40] 300 invokes a code segment compatible with the "Host Operating System" 400 that is a script or executable application programmed in such a manner that a signal can be sent to one or more "Malware Scanning Engines" 712, 714 for the purpose of stopping the scanning process. When the code segment associated with "Menu Option [42]" 304 is executed by the user the following sequence of events occurs. The "Master Control Point Dashboard Module" 402 is communicated with and advised that a stop signal needs to be sent to one or more malware scanning engines. The "Master Control Point Dashboard Module" 402 queries the "Configuration Control Module" 424 which in turns sends a query to the "Database Module" 410 requesting details on all malware engines currently running scans. The data returned to the "Configuration Control Module" 424, in the form of the running-table, quantifies which engines are running and therefore are capable of being stopped. The "Configuration Control Module" 424 then advises the "Master Control Point Dashboard Module" 402 that it needs to send one or more stop signals to the respective malware scanning engines. The "Master Control Point Dashboard Module" 402 then uses the "Malware Engine Selection Module" 418 to select the appropriate "Command Line/ Graphical User Interface to Malware Engine #X" 426 . . . 430 which in turn, accesses the appropriate "Malware Scanning Engine" 712, 714 and issues a stop signal. Upon receipt of the stop signal the "Malware Scanning Engine" 712, 714 enters a "stopped state" awaiting further instructions. The user is advised of any problems encountered via the "Alerts Module" 404.

When the function associated with "Menu Option [42]" 304 is invoked data in the form of command and control signals will flow between/among the following operational modules as presented in FIG. 13 and FIG. 16:

(a) Host Operating System 400
(b) Master Control Point Dashboard Module 402
(c) Alerts Module 404
(d) Database Module 410
(e) Malware Engine Selection Module 418
(f) Malware Engine(s) 712, 714
(g) Configuration Control Module 424
(h) Command Line/Graphical User Interface to Malware Engine #1 426 . . . 430

FIG. 11 is a representation of what the user would see when they clicked on either of the menu buttons labeled "Monitor Process" 216 as shown in FIG. 06.

[43] Select malware scanning engine(s) to monitor 306
[44] Select 2D or 3D graphical display for use in monitoring 308
[45] Set refresh frequency of monitoring process 310
[46] Select granularity of monitoring controls 312
[47] Create statistical projections on time to complete scanning 314
[48] Monitor memory usage and hard drive transfer rates 316
[49] Display count of malicious code instances found so far 318
[50] Rate infections found so far by severity classifications 320
[51] Detect anomalous behavior of running platforms and engine(s) 322
[52] Monitor local operating system parameters 324

According to one arrangement, a function of the "Monitor Process" menu options in FIG. 11 (lines [43] through [52] 306 . . . 324) are for allowing the user to receive operational updates on the status of all malicious code scanning related processes presently underway. The updates requested by the user can be in real time, or they can be at set time or event specific intervals. Updates generated can be for one or more malware scanning engines identified as single entities or groups that are defined by the user based on some scanning characteristic. The "Monitor Process" 216 functions are dependent on the operational capabilities of the "Malware Engine Selection Module" 418 and the "Command Line/ Graphical Interface to Malware Engine #X" 426 . . . 430 presented in the overview of the "Master Control Point Dashboard" module 402 in FIG. 13. All of the menu options, and their related functions, detailed in FIG. 11 are unique with respect to the claims of the present invention.

The ten menu options identified above and in FIG. 11 are custom designed scripts and applications that are unique to the present invention.

Menu Line: [43] Select malware scanning engine(s) to monitor 306

Purpose: Selecting the menu option at line [43] 306 invokes a code segment compatible with the "Host Operating System" 400 that is a script or executable application programmed in such a manner that it permits the user to select different malware scanning engines 712, 714 for monitoring during the scanning process. The updates requested can be sent to the default console display associated with the "Master Control Point Dashboard Module" 402 or they can also be routed to a buffer for a large high-definition (HDMI) "Hardware Monitor Display Buffer" 408 that is directly controlled by the "Display Controls Module" 406 module. When the user executes "Menu Option [43]" 306 the following internal sequence of events occurs: The code segment associated with "Menu Option [43]" 306 communicates with the "Master Control Point Dashboard Module" 402 and advises that the "Configuration Control Module" 424 needs to be updated to reflect the user's desire to monitor one of more malware scanning engines 712, 714. In turn, the "Configuration Control Module" 424 queries the "Database Module" 410 and requests a list of all malware scanning engines currently performing a scan. The "Configuration Control Module" 424 presents the user with this list and allows selections to be made with respect to the malware scanning engines that have the ability to be monitored. At this point, the user is offered the opportunity to create "groups" of malware scanning engines 712, 714 such that their individual status can be combined together such that their individual activities are reported as one entity. Once the selection process is completed the "Configuration Control Module" 424 updates the monitor-table in the "Database Module" 410 with the modified information. This update triggers the "Master Control Point Dashboard Module" 402 to enable a communications path between the malware scanning engines 712, 714 and the "Statistics Module" 416. This path flows from the malware scanning engines 712, 714 through the "Instance of The Virtual Operating System" 704 to the "Command Line/ Graphical User Interface to Malware Engine #X 426 . . . 430 to the "Malware Engine Selection Module" 418 which was previously configured by the "Master Control Point Dashboard Module" 402 when the trigger occurred. This path allows all respective data concerning the running malware engine(s) to be collected, analyzed and averaged for display purposes. The updated statistics on engine performance is routed through the "Master Control Point Dashboard Module" 402 by the "Statistics Module" 416 to the "Display Control Module" 406 for output to the "Hardware Monitor Display Buffer" 408. This monitoring status remains active until changed by the user. The user is advised of any problems encountered during this process via the "Alerts Module" 404.

When the function associated with menu option [43] 306 is invoked data in the form of command and control signals will flow between/among the following operational modules as presented in FIG. 13 and FIG. 16:

(a) Host Operating System 400
(b) Master Control Point Dashboard Module 402

(c) Alerts Module 404
(d) Display Control Module 406
(e) Hardware Monitor Display Buffer 408
(f) Database Module 410
(g) Statistics Module 416
(h) Malware Engine Selection Module 418
(i) Malware Engine(s) 712, 714
(j) Configuration Control Module 424
(k) Command Line/Graphical User Interface to Malware Engine #X 426 . . . 430

Menu Line: [44] Select 2D or 3D graphical display for use in monitoring 308

Purpose: Selecting the menu option at line [44] 308 invokes a code segment compatible with the "Host Operating System" 400 that is a script or executable application programmed in such a manner that it permits the user to select either the default two dimensional (2D) display or a three dimensional (3D) display for monitoring output. This option is provided as an enhancement as monitoring multiple malware scanning engines 712, 714 simultaneously in 2D can be very confusing at times. Utilizing the 3D option allows charts and graphs to be much more compelling and informative. The code segment associated with "Menu Option [44]" 308 is designed to allow the user to select either the 2D or 3D display option. If 3D is selected the raw data feed associated with standard 2D displays is converted into a 3D representation. Once the 3D option is enabled by the user the modified raw data feed is sent by the "Statistics Module" 416 to the "Display Control Module" 406 for output to the "Hardware Monitor Display Buffer" 408. The means by which the raw monitoring data is produced for display purposes is identical to the output produced when "Menu Option [43] 306 is executed and enabled. As a result, the specific details as to how the raw monitoring data is produced and routed among the various modules associated with the Master Control Point Dashboard Module 402 are not described here. As always, any problems encountered during this process are communicated to the user via the "Alerts Module" 404.

When the function associated with "Menu Option [44]" 308 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Display Control Module 406
(e) Hardware Monitor Display Buffer 408
(f) Database Module 410
(g) Statistics Module 416
(h) Malware Engine Selection Module 418
(i) Malware Engine(s) 712, 714
(j) Configuration Control Module 424
(k) Command Line/Graphical User Interface to Malware Engine #X 426 . . . 430

Menu Line: [45] Set refresh frequency of monitoring process 310

Purpose: Selecting the menu option at line [45] 310 invokes a code segment compatible with the "Host Operating System" 400 that is a script or executable application programmed in such a manner that it permits the user to select the refresh frequency of real-time updates concerning the running of the malware scanning engines 712, 714. By default, a refresh-table in the "Database Module" 410 is populated with a default refresh rate of 15 minutes. Under these parameters the "Hardware Monitor Display Buffer" 408 is updated by the "Display Control Module" 406, which is updated by the "Statistics Module" 416 which receives updates from the malware scanning engines four times an hour. This code segment allows the user to modify that 15 minute parameter to whatever time based value is required. This is accomplished by having this code segment notify the "Master Control Point Dashboard Module" 402 that the "Configuration Control Module" 424 needs to modify the appropriate refresh-table in the "Database Module" 410 of the user's modification to the default values. Once that refresh-table update is accomplished and saved the refresh rates are locked into place as a new default standard until modified by the user by executing "Menu Option [45]" 310. As always, any problems encountered during this process are communicated to the user via the "Alerts Module" 404.

When the function associated with "Menu Option [45]" 310 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Display Control Module 406
(e) Hardware Monitor Display Buffer 408
(f) Database Module 410
(g) Statistics Module 416
(h) Malware Engine Selection Module 418
(i) Malware Engine(s) 712, 714
(j) Configuration Control Module 424

Menu Line: [46] Select granularity of monitoring controls 312

Purpose: Selecting the menu option at line [46] 312 invokes a code segment compatible with the "Host Operating System" 400 that is a script or executable application programmed in such a manner that it permits the user to select the level of granular monitoring for the malware scanning engines 712, 714. During the initialization of the malware scanning engines ("Menu Option [29]" 278) and registration process ("Menu Option [30]" 280) the user has the opportunity to identify the various features of each malware scanning engine in a feature-table in the "Database Module" 410. The feature-table allows each reportable feature of the malware scanning engine 712, 714 to be rated by the user based on a five-point rating system. Where "1" equals a high level "50,000 foot perspective," and "5" equals a low level drill down perspective. If the user selects a rating of "1" then only those features ranked by the user as a "1" will be displayed via the "Display Control Module" 406 and "Hardware Monitor Display Buffer" 408. If the user selects "3" for example, then all feature rankings that include "1" through "3" (including "2") will be displayed. If "5" is selected, then all features initially identified in the registration and initialization process will be displayed by the monitoring controls as reportable monitoring events. This granularity selection process controls the amount of information that is reported to the user concerning the running statistics of each individual malware scanning engine. The user's selections are taken by the "Configuration Control Module" 424 and routed thru the "Master Control Point Dashboard Module" 402 so that the feature-table in the "Database Module" 410 is updated accordingly. As always, any problems encountered during this process are communicated to the user via the "Alerts Module" 404.

When the function associated with "Menu Option [46]" 312 is invoked data in the form of command and control signals will flow between/among the following operational modules as presented in FIG. 13 and FIG. 16:

(a) Host Operating System 400
(b) Master Control Point Dashboard Module 402
(c) Alerts Module 404
(d) Display Control Module 406
(e) Hardware Monitor Display Buffer 408
(f) Database Module 410
(g) Statistics Module 416
(h) Configuration Control Module 424
(i) Malware Engine(s) 712, 714

Menu Line: [47] Create statistical projections on time to complete scanning 314

Purpose: Selecting the menu option at line [47] 314 invokes a code segment compatible with the "Host Operating System" 400 that is a script or executable application programmed in such a manner that it permits the user to obtain projections on the time remaining to complete a malicious code scan on a forensic image 432 436 using multiple malware scanning engines 712, 714 simultaneously. This code segment is designed, in conjunction with other modules of the Master Control Point Dashboard Module 402, to monitor specific reporting mechanisms of each malware scanning engine, that report on the projected time required to complete the malicious code scan currently underway, and collect that information for analysis. During the initialization of the malware scanning engines ("Menu Option [29]" 278) and registration process ("Menu Option [30]" 280) one of the features identified and collected from each malware engine is the knowledge of what it takes to query the respective malware engine and have it report on the estimated time required to complete a malicious code scan. To enable this function the code segment associated with "Menu Option [47]" 314 notifies the Master Control Point Dashboard Module 402 that needs to access the "Statistics Module" 416 and have it provide a detailed, as well as summary report, on the estimated time to completion for the scanning process currently underway. By default, the code segment associated with the "Statistics Module" 416 has been designed to routinely collect estimated time to completion data from each malware engine. Once aware that this data has been requested the "Statistics Module" 416 updates the remaining-table with this data and passes it on to the "Database Module" 410 where it is saved and then sent to the "Display Control Module" 406 in the form of a displayable report consisting of charts and graphs on each individual malware scanning engine 712, 714 in operation. The charts and graphs associated with this report may be displayed in 3D if the user previously selected this mode via "Menu Option [44]" 308. As always, any problems encountered during this process are communicated to the user via the "Alerts Module" 404.

When the function associated with "Menu Option [47]" 314 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Display Control Module 406
(e) Hardware Monitor Display Buffer 408
(f) Database Module 410
(g) Statistics Module 416
(h) Malware Engine(s) 712, 714
(i) Forensic Image 432
(j) Forensic image of deleted items recovered on the temp. storage device 436

Menu Line: [48] Monitor memory usage and hard drive transfer rates 316

Purpose: Selecting the menu option at line [48] 316 invokes a code segment compatible with the "Host Operating System" 400 that is a script or executable application programmed in such a manner that it permits the user to get operating system level reports on the hardware resources required to support the scanning of forensic images 432 436 by multiple malware scanning engines 712, 714 simultaneously. The code segment associated with "Menu Option [48]" 316 is designed to have the ability to access the "Virtual Support Environment" 702 management consoles and the "Instances Of The Virtual Operating System" 704 management consoles directly for the purpose of querying these internal management resources about the state of their respective hardware resources. In both cases, low level scripts at the command line have been authored to collect this data. To clarify, one script is designed to have the ability to communicate with the VMWare or Hyper-V support environment 702 and collect data on each instance of every virtual operating system in place. The remaining script is designed to communicate with each "Instances Of The Virtual Operating System" 704 to collect data on the operating system being used to support the malware engine hosted by this virtual environment 704. In both cases the data that is collected is passed on to the hardware-table in the "Database Module" 410 by the "Master Control Point Dashboard Module" 402 and "Configuration Control Module" 424 for storage and future reference. The "Statistics Module" 416 is then put on notice by the code segment associated with "Menu Option [48]" 316 that there is data that needs to be analyzed. The "Statistics Module" 416 analyses the data in context as hardware related and passes the analysis results on to the user via the "Display Control Module" 406. As always, any problems encountered during this process are communicated to the user via the "Alerts Module" 404.

When the function associated with "Menu Option [48]" 316 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Display Control Module 406
(e) Database Module 410
(f) Statistics Module 416
(g) Configuration Control Module 424
(h) Malware Engine(s) 712, 714

Menu Line: [49] Display count of malicious code instances found so far 318

Purpose: Selecting the menu option at line [49] 318 invokes a code segment compatible with the "Host Operating System" 400 that is a script or executable application programmed in such a manner that it permits the user to obtain a running total of malicious code infections found to date by the malware scanning process currently underway. During the malware scanning process each of the individual malware scanning engines 712, 714 that have been selected by the user ("Menu Option [25]" 270) to actively scan the forensic images 432, 436 for infections are constantly queried by the "Statistics Module" 416 as to their findings to date. Updates obtained from the "Statistics Module" 416 from the individual malware scanning engines 712, 714 are stored in the findings-table located in the "Database Module" 410. The "Statistics Module" 416 summarizes all this data into a running report that is displayed to the user based on each malware engine's individual findings. For example, if the user had selected that 28 out of 32 malware engines were to be used for scanning purposes, a list of 28 engine names would be displayed along with the total number of malicious code segments discovered during the current malicious code scanning process. This overview of findings-to-date is obtained from the individual malware scanning engines 712, 714 in one of three ways. The first approach relies on the code segment associated with the "Command Line/Graphical User Interface to Malware Engine #X" 426 . . . 430 ability to issue command line instructions to the engine and have it respond with a current findings report. The second approach is to have the "Command Line/Graphical User Interface to Malware Engine #X" 426 . . . 430 communicate using the Graphical User Interface (GUI) associated with the malware engine and request the same information. Lastly, in cases where it is not feasible to use either of the above approaches, the "Command Line/Graphical User Interface to Malware Engine #X" 426 . . . 430 reverts to internal code segments specifically designed to "screen scrape" certain areas of the screen display produced by the malware engine itself for findings updates. Screen scraping is the process of collecting screen display data from one application and translating it so that another application can display it. This is normally done to capture data from a legacy application in order to display it using a more modern user interface. Screen scraping usually refers to a legitimate technique used to translate screen data from one application to another. (SOURCE: http://www.techopedia.com/definition/16597/screen-scraping) Once accumulated the overall results are sent by the "Statistics Module" 416 thru the "Master Control Point Dashboard Module" 402 to the "Display Control Module" 406 where using options previously selected by the user ("Menu Option [44]" 308, "Menu Option [45]" 310 and "Menu Option [46]" 312) the "Hardware Monitor Display Buffer" 408 uploaded with the appropriate raw data. As always, any problems encountered during this process are communicated to the user via the "Alerts Module" 404.

When the function associated with "Menu Option [49]" 318 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Display Control Module 406
  (e) Hardware Monitor Display Buffer 408
  (f) Database Module 410
  (g) Statistics Module 416
  (h) Command Line/Graphical User Interface to Malware Engine #X 426 . . . 430
  (i) Malware Engine(s) 712 714
Menu Line: [50] Rate infections found so far by severity classifications 320

Purpose: Selecting the menu option at line [50] 320 invokes a code segment compatible with the "Host Operating System" 400 that is a script or executable application programmed in such a manner to provide the user with a generalized report on the severity of malicious code infections discovered to date by the scanning process currently underway. During the malware scanning process each of the individual malware scanning engines 712, 714 that have been selected by the user ("Menu Option [25]" 270) to actively scan the forensic images 432, 436 for infections are constantly queried by the "Statistics Module" 416 as to the severity classifications assigned by the individual malware scanning engines 712, 714 to infections discovered to date. Updates obtained from the "Statistics Module" 416 from the individual malware scanning engines 712, 714 are stored in the severity-table located in the "Database Module" 410. These malware engine generated text based updates typically include a name for the infection(s) found as well as a severity ranking, usually a number between 1 and 5 where 5 is the most sever of the rankings. The "Statistics Module" 416 summarizes all this data into a generalized report that is displayed to the user based on each malware engine's individual rankings of severity. For example, the report might contain data on the following reportable items: "Vendor Name, Engine Name, Severity Ranking, Total Amount of Infections At This Severity Level." This summary data is obtained from the individual malware scanning engines 712, 714 in one of three ways. The first approach relies on the code segment associated with the "Command Line/Graphical User Interface to Malware Engine #X" 426 . . . 430 ability to issue command line instructions to the engine and have it respond with a current findings report. The second approach is to have the "Command Line/Graphical User Interface to Malware Engine #X" 426 . . . 430 communicate using the Graphical User Interface (GUI) associated with the malware engine and request the same information. Lastly, in cases where it is not feasible to use either of the above approaches, the "Command Line/Graphical User Interface to Malware Engine #X" 426 . . . 430 reverts to internal code segments specifically designed to "screen scrape" certain areas of the screen display produced by the malware engine itself for severity reports. Once accumulated the overall results are sent by the "Statistics Module" 416 thru the "Master Control Point Dashboard Module" 402 to the "Display Control Module" 406 where using options previously selected by the user ("Menu Option [44]" 308, "Menu Option [45]" 310 and "Menu Option [46]" 312) the "Hardware Monitor Display Buffer" 408 is uploaded with the appropriate raw data. The severity classification display report is meant to be a quick indicator of the extent to which the forensic image 432 436 being analyzed has been compromised by malicious code infections. As always, any problems encountered during this process are communicated to the user via the "Alerts Module" 404.

When the function associated with "Menu Option [50]" 320 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Display Control Module 406
  (e) Hardware Monitor Display Buffer 408
  (f) Database Module 410
  (g) Statistics Module 416
  (h) Command Line/Graphical User Interface to Malware Engine #X 426 . . . 430
  (i) Malware Engine(s) 712, 714
Menu Line: [51] Detect anomalous behavior of running platforms and engine(s) 322

Purpose: Selecting the menu option at line [51] 322 invokes a code segment compatible with the "Host Operating System" 400 that is a script or executable application programmed in such a manner that it advises the user of anomalous events in either the "Host Hardware Platform" 100, the "Host Operating System" 400, the "Virtual Support Environment" 702, and the individual "Instances Of The Virtual Operating System" 704 and the "Malware Scanning Engines" 712, 714. Operational data concerning the above items is constantly monitored by the "Configuration Control Module" 424 and stored in the operations-table in the "Database Module" 410 for future reference. Code segments in the "Configuration Control Module" 424 are designed to monitor the contents of the appropriate "Event Logs" in each of the monitored entities previously identified above. The event logs monitored by the "Configuration Control Module" 424 are analyzed for event log codes known to be an indicator of anomalous behaviors. This analysis occurs in real time but is not reported unless the user specifically requests this information by executing "Menu Option [51]" 322. Once selected, the code segment associated with "Menu Option [51]" 322 communicates with the "Configuration Control Module" 424 and requests that data in the operations-table as found in the "Database Module" 410 be analyzed for anomalous event code behavior. This request triggers the "Statistics Module" 416 which in turn performs the analysis and creates a report which it sends to the "Display Control Module" 406 for routing to the "Hardware Monitor Display Buffer" 408. As always, any problems encountered during this process are communicated to the user via the "Alerts Module" 404.

When the function associated with "Menu Option [51]" 322 is invoked data in the form of command and control signals will flow between/among the following operational modules as presented in FIG. 13 and FIG. 16:
(a) Host Operating System 400
(b) Alerts Module 404
(c) Display Control Module 406
(d) Hardware Monitor Display Buffer 408
(e) Database Module 410
(f) Statistics Module 416
(g) Malware Engine(s) 712, 714
(h) Configuration Control Module 424

Menu Line: [52] Monitor local operating system parameters 324

Purpose: Selecting the menu option at line [52] 324 invokes a code segment compatible with the "Host Operating System" 400 that is a script or executable application programmed in such a manner that it creates a technical report on the operational status of the "Host Operating System" 400. The code segment associated with "Menu Option [52]" 324 was designed to constantly keep track of the technical data produced by tools such as "TaskManager and Powershell" under Windows and "ps, Htop and pstree" under Linux. This constant monitoring is accomplished by code segments associated with the "Configuration Control Module" 424 which has the ability to directly communicate with the "Host Operating System" 400. The output of these tools is saved by the "Configuration Control Module: 424 in the host-table in the Database Module" 410 for future reference. The "Statistics Module" 416 is programmed to monitor the content of the host-table and create an ongoing report of key performance parameters. In addition, the "Statistics Module" 416 is also pre-programmed with upper and lower limits for each key performance function monitored. These limits are critical parameters as they have been researched extensively by the authors of the present invention as indicators of the most efficient and effective parameters for a "Host Operating System" 400 specifically configured to facilitate a "Virtual Support Environment" 702. If any of these functions are noted as being out of band the "Alerts Module" 404 triggers an alert notification to the user. These alerts continue until the performance issue has been resolved or the user changes the upper/lower bandwidth constraints. These alerts are in addition to the comprehensive technical report on the "Host Operating System" 400 that the user can generate on demand by selecting "Menu Option [52]" 324. If a comprehensive technical report is requested by the user the "Statistics Module" 416 is advised of same by the "Configuration Control Module" 424. The on-demand report is generated by the "Statistics Module" 416 after it analyzes the host-table maintained in the "Database Module" 410. The report created is communicated to the "Display Control Module" 406 which in turn passes the data onto the "Hardware Monitor Display Buffer" 408. Note this data may be in a 2D or 3D format depending on the type of display selected by the user with respect to "Menu Option [44]" 308. As always, any problems encountered during this process are communicated to the user via the "Alerts Module" 404.

When the function associated with "Menu Option [52]" 324 is invoked data in the form of command and control signals will flow between/among the following operational modules as presented in FIG. 13 and FIG. 16:
(a) Host Operating System 400
(b) Alerts Module 404
(c) Display Controls 406
(d) Hardware Monitor 408
(e) Database Module 410
(f) Statistics Module 416
(g) Configuration Control Module 424

FIG. 12 is a representation of what the user would see when they clicked on either of the menu buttons labeled "Create Reports" 218 as shown in FIG. 06.

[53] Select malware scanning engine(s) to generate reports on 326
[54] Normalize malware data found into common CVE notations 328
[55] Select types of reports to generate 330
[56] Save reports generated in the malware report archives 332
[57] Open saved session reports for review 334
[58] Purge old session reports from malware archives 336
[59] Compare the infections found in two or more session reports 338
[60] Based on "findings to date" project likelihood of more infections 340
[61] Generate report on suggested mitigation strategies 342

According to one arrangement, a function of the "Create Reports" menu options in FIG. 12 options (lines [53] through [61] 326 . . . 342) are for providing the user with formal and informal reports on the discoveries made to date concerning malicious code infections, as well as statistical and heuristic projections based on those findings. The "Create Reports" 218 functions are dependent on the operational capabilities of the "Reports Module" 414, the "Scanning Results Normalization Engine Module" 412, the "Statistics Module" 416 and the "Database Module" 410 presented in the overview of the "Master Control Point Dashboard" module 402 in FIG. 13. All of the menu options, and their related functions, detailed in FIG. 12 are unique with respect to the claims of the present invention.

The nine menu options identified above and in FIG. 12 are custom designed scripts and applications that are unique to the present invention.

Menu Line: [53] Select malware scanning engine(s) to generate reports on 326

Purpose: Selecting the menu option at line [53] 326 invokes a code segment compatible with the "Host Operating System" 400 that is a script or executable application programmed in such a manner that it allows the user to select one or more malware scanning engines 712, 714 to be the source of reports generated. "Menu Option [53]" 326 is similar in its scope to "Menu Option [43]" 306, "Select malware scanning engine(s) to monitor." They are alike in that they both modify a specific table in the "Database Module" 410 based on selections made by the user. They are different in that one enables the use of a malware scanning engine ([43]), while the other ([53]) enables the accumulation of data for the specific purpose of generating formal and informal reports. When the user executes the code segment associated with "Menu Option [53]" 326 two actions are initiated. The first sends trigger signals to subroutines in the following modules: "Master Control Point Dashboard Module" 402, "Physical Forensic Acquisition Module" 422, the "Deleted Item Recovery Module" 420, the "Database Module" 410, the "Scanning Results Normalization Engine Module" 412, the "Statistics Module" 416, "Configuration Control Module" 424, the "Malware Engine Selection Module" 418, and each one of the "Command Line/Graphical User Interface to Malware Engine #X" 426 . . . 430 modules, as well as each of the respective "Instances Of A Virtual Operating System" 704 and the respective "Malware Scanning Engines" 712, 714 they support. Each of these modules is put on notice that they may be directed to accumulate and distribute operational updates on technical issues germane to their specific function in supporting the operation of all the malware scanning engines 712, 714, as well as infections found. The items to be collected and tracked in each module are pre-programmed into the reports-table after extensive prior research concerning which items tend to impact the accuracy, efficiency, effectiveness and usefulness of the scanning process. The second action triggered is a request to the user, via the "Display Control Module" 406 and "Hardware Monitor Display Buffer" 408, asking for a selection to be made that identifies which malware engines will be the source of reports generated during this scanning session. The user's response is saved in a reports-table in the "Database Module" 410 for future reference. The user's selections at this point do not automatically generate any reports, rather the user's selections set the stage for the downstream collection and aggregation of data that may be relevant to requests made for future reports. A vast majority of the preparation work performed here pivots on the creation of temporary tables and keys in the "Database Module" 410 needed to save and analyze the data targeted for collected. As always, any problems encountered during this process are communicated to the user via the "Alerts Module" 404.

When the function associated with "Menu Option [53]" 326 is invoked data in the form of command and control signals will flow between/among the following operational modules as presented in FIG. 13 and FIG. 16:

(a) Host Operating System 400
(b) Master Control Point Dashboard Module 402
(c) Alerts Module 404
(d) Display Controls 406
(e) Hardware Monitor 408
(f) Database Module 410
(g) Scanning Results Normalization Engine Module 412
(h) Reports Module 414
(i) Statistics Module 416
(j) Malware Engine Selection Module 418
(k) Malware Engine(s) 712, 714
(l) Deleted Item Recovery Module 420
(m) Physical Forensic Acquisition Module 422
(n) Configuration Control Module 424
(o) Command Line/Graphical User Interface to Malware Engine #X 426 . . . 430

Menu Line: [54] Normalize malware data found into common CVE notations 328

Purpose: Selecting the menu option at line [54] 328 invokes a code segment compatible with the "Host Operating System" 400 that is a script or executable application programmed in such a manner that it assists the user in normalizing the different naming conventions that are used to identify malicious code segments among the various malware vendors in both the public and private sectors. One of the operational issues in using multiple malware scanning engines 712, 714 to scan the same forensic image 732, 736 of a computer system suspected of being infected is that each malware vendor uses their own proprietary naming convention to describe the infections found. As a result, it is not uncommon to discover that many different malware scanning engines find the exact same instance of a malicious code infection but call it something different. This differential then makes it appear, when reviewing the findings made, that there are more infections than there actually are. To resolve this issue the code segment associated with "Menu Option [54]" 328 is designed to recognize these discrepancies and append the original names provided with one that has a common notation, such as the "Common Vulnerabilities and Exposures" (CVE) naming convention (http://cve.mitre.org/index.html). Conversion of vendor created naming conventions to the CVE index is a detailed process that requires substantial discussion. As a result, a figure has been created to assist in that overview. Please see the written description associated with FIG. 18 for additional details on this function.

When the function associated with "Menu Option [54]" 328 is invoked data in the form of command and control signals will flow between/among the following operational modules as presented in FIG. 13 and FIG. 16:

(a) Data Flow List Not Applicable: See FIG. 18 for enhanced details.

Menu Line: [55] Select types of reports to generate 330

Purpose: Selecting the menu option at line [55] 330 invokes a code segment compatible with the "Host Operating System" 400 that is a script or executable application programmed in such a manner that it permits the user to select the type of reports to be generated for each malware scanning engine 712, 714 selected via "Menu Option [25]" 270 to be utilized in the scanning process. The user is presented with a checklist of different report types for each malware engine via data sent to the "Display Control Module" 406. The report types selected by the user are stored in the types-table in the "Database Module" 410 by the "Master Control Point Dashboard Module" 402. A few examples of the many different types of generalized and specific reports the user can select to be generated for each malware engine are: Malware Found, Viruses Found, Trojans Found, Spear Fishing Found, Harmful IP Addresses Found, Harmful URLs Found, Infected E-mails, Malware Engine Operational Parameters (total files scanned, total malware infections found, total running time, total size of files scanned, etc.), Malware Engine Revision Level, Malware Engine Signature Level, Severity Classifications, Files Currently In Quarantine, Time Since The Last Signature Update was performed and Ad Hoc Queries created by the user. The types of reports selected here are global to the present invention in that their selection, of lack thereof, determines if other modules with built-in report capability will produce and display reports where those reports have content that is similar to those described in the pre-programmed types-table. As always, any problems encountered during this process are communicated to the user via the "Alerts Module" 404.

When the function associated with "Menu Option [55]" 330 is invoked data in the form of command and control signals will flow between/among the following operational modules as presented in FIG. 13 and FIG. 16:
   (a) Host Operating System 400
   (b) Master Control Point Dashboard Module 402
   (c) Alerts Module 404
   (d) Display Controls 406
   (e) Hardware Monitor 408
   (f) Database Module 410
   (g) Malware Engine(s) 712, 714

Menu Line: [56] Save reports generated in the malware report archives 332

Purpose: Selecting the menu option at line [56] 332 invokes a code segment compatible with the "Host Operating System" 400 that is a script or executable application programmed in such a manner that it permits the user to save all reports generated during the current scanning session to the "Database Module" 410 in the session-table. The current scanning session is defined as started once the user invokes "Menu Option [39]" 298, "Start malware scanning engine(s)," and stopped when the user invokes "Menu Option [42]" 298, "Stop malware scanning engine(s)." Requests to save all generated reports are passed on to the "Reports Module" 414 which maintains a list of all recent reports generated during the current session. The "Reports Module" 414 is responsible for collecting all the details on these reports and informing the "Database Module" 410 that a session based archive will need to be created that includes "X" files with a total size of "Y." In cases were summary data needs to be created because one or more of the modules has not yet completed the entire scan the "Statistics Module" 416 is included in the process to generate the required summary data. Once the "Database Module" 410 advises the "Reports Module" 414 that it is ready to assimilate all the report data available the "Reports Module" 414 queries all other modules for the data and routes the appropriate data to the "Database Module" 410 session-table for archival storage. Keys in the session-tables have a unique naming convention that links the primary key to a specific date and time format along with detailed source information. These session based archives will be used in later menu options to compare malicious code findings and detail the operational parameters in place when they were found. This task is completed without any user interaction. As always, any problems encountered during this process are communicated to the user via the "Alerts Module" 404.

When the function associated with "Menu Option [39]" 332 is invoked data in the form of command and control signals will flow between/among the following operational modules as presented in FIG. 13 and FIG. 16:
   (a) Host Operating System 400
   (b) Alerts Module 404
   (c) Database Module 410
   (d) Reports Module 414
   (e) Statistics Module 416

Menu Line: [57] Open saved reports for review 334

Purpose: Selecting the menu option at line [57] 334 invokes a code segment compatible with the "Host Operating System" 400 that is a script or executable application programmed in such a manner that it permits the user to select archived session reports created using "Menu Option [39]" 332 (above) for review. The code segment associated with "Menu Option [57]" 334 is designed to be used in conjunction with the "Master Control Point Dashboard Module" 402 to access the "Database Module" 410 and review records in the session-table. The user is provided with multiple searching and display options that permit historical data in the session-table to be analyzed after the fact based on numerous differential criteria. The searching performed is assisted by code in the "Statistics Module" 416 if the user's search criteria requires that summary data be generated across multiple sessions. Informal reports are generated directly by the code segment associated with "Menu Option [57]" 334 and passed on to the "Display Control Module" 406 for presentation. Requests for formal session reports by the user are routed to the "Reports Module" 414 which uses pre-defined and ad hoc templates to present the data in meaningful graphical formats. In cases where the summary reports requested contain the names of malware discovered the "Scanning Results Normalization Engine Module" 412 may be accessed for the purpose of consolidating data concerning malware discovered. The "Reports Module" 414 routes the completed formal reports to the "Display Control Module" 406 for presentation. Reports pre-classified as "complex" are converted to 3D chart formats prior to being sent to the "Display Control Module" 406 if the user has enabled this capability using "Menu Option [55]" 330. As always, any problems encountered during this process are communicated to the user via the "Alerts Module" 404.

Menu Line: [57] Open saved session reports for review 334

When the function associated with "Menu Option [57]" 334 is invoked data in the form of command and control signals will flow between/among the following operational modules as presented in FIG. 13 and FIG. 16:
   (a) Host Operating System 400
   (b) Master Control Point Dashboard Module 402
   (c) Alerts Module 404
   (d) Display Controls 406
   (e) Hardware Monitor 408
   (f) Database Module 410
   (g) Scanning Results Normalization Engine Module 412
   (h) Reports Module 414
   (i) Statistics Module 416

Menu Line: [58] Purge old session reports from malware archives 336

Purpose: Selecting the menu option at line [58] 336 invokes a code segment compatible with the "Host Operating System" 400 that is a script or executable application programmed in such a manner that it permits the user to selectively purge existing session reports from the "Database Module" 410. The code segment associated with "Menu Option [58]" 336 presents the user with a series of check list options that allow session reports to be search based on type or date. The search criteria is passes on to the "Reports Module" 414, which in conjunction with the "Database Module" 410 attempts to identify all session reports that match the user's search criteria. This matching search criteria creates a block of responsive session reports that the user can select or deselect. Once selected the "Database Module" 410 is instructed by the "Reports Module" 414 to permanently delete the selected session reports as maintained in the session-table. As always, any problems encountered during this process are communicated to the user via the "Alerts Module" 404.

When the function associated with "Menu Option [58]" 336 is invoked data in the form of command and control signals will flow between/among the following operational modules as presented in FIG. 13 and FIG. 16:
   (a) Host Operating System 400
   (b) Alerts Module 404
   (c) Database Module 410

Menu Line: [59] Compare the infections found in two or more session reports 338

Purpose: Selecting the menu option at line [59] 338 invokes a code segment compatible with the "Host Operating System" 400 that is a script or executable application programmed in such a manner that it permits the user to compare two or more session reports archived in the "Database Module" 410 for similar content concerning infections found. The code segment associated with "Menu Option [59]" 338 presents the user with a series of check list options that allow session reports to be search based on type, date, or the name(s) of specific malware infections. The search criteria is passed on to the "Reports Module" 414, which in conjunction with the "Database Module" 410 attempts to identify all session reports that match the user's search criteria. This matching search criteria creates a block of responsive session reports specific to previously discovered infections that the user can select or deselect. Once selected, the "Database Module" 410 is instructed by the "Reports Module" 414 to compare the content of the selected session reports as maintained in the session-table through a series of specially crafted database queries. In situations where the sessions are a match, the content of the session-table records are sent to the "Reports Module" 414 for consolidation into a final summary report. Where necessary, the "Reports Module" 414 may engage the "Scanning Results Normalization Engine Module" 412 through the services available in the "Master Control Point Dashboard Module" 402 to convert malware vendor naming conventions of infections found into common verbiage specific to the CVE index. The final version of the report requested is sent to the "Display Control Module" 406 for presentation to the user. If the user has enabled 3D report capability using "Menu Option [55" 330, all reports are converted to 3D chart formats prior to being sent to the "Display Control Module" 406 and the "Hardware Monitor Display Buffer" 408. As always, any problems encountered during this process are communicated to the user via the "Alerts Module" 404.

When the function associated with "Menu Option [59]" 338 is invoked data in the form of command and control signals will flow between/among the following operational modules as presented in FIG. 13 and FIG. 16:
  (a) Host Operating System 400
  (b) Master Control Point Dashboard Module 402
  (c) Alerts Module 404
  (d) Display Control Module 406
  (e) Hardware Monitor Display Buffer 408
  (f) Database Module 410
  (g) Scanning Results Normalization Engine Module 412
  (h) Reports Module 414

Menu Line: [60] Based on "findings to date" project likelihood of more infections 340

Purpose: Selecting the menu option at line [60] 340 invokes a code segment compatible with the "Host Operating System" 400 that is a script or executable application programmed in such a manner that it permits projections to be made on the likelihood that additional infections will be found while examining subsequent forensic images 432 436 from the same client source. The services offered to the user in this context are the result of extensive research performed on each and every scanning session conducted. When the malware scanning engines 712, 714 discover a known malicious code segment, that information is passed on to the "Statistics Module" 416 which records the data in the hits-table in the "Database Module" 410 as normalized data per the use of services offered by the "Scanning Results Normalization Engine Module" 412. The normalized data available to the "Statistics Module" 416 is constantly re-analyzed using a series of public and proprietary regression algorithms to determine if there is any statistical signifance to the possibility that "Infection X" may be a predictor of "Infection Y" with respect to current or future sessions. In cases where there is a statistical signifance the user is advised of same via the "Display Control Module" 406. This statistical signifance is then used, based on the forensic images 432, 436 that still need to be scanned, to predict the likelihood of discovering additional malicious code infections. As always, any problems encountered during this process are communicated to the user via the "Alerts Module" 404.

When the function associated with "Menu Option [60]" 340 is invoked data in the form of command and control signals will flow between/among the following operational modules as presented in FIG. 13 and FIG. 16:
  (a) Host Operating System 400
  (b) Alerts Module 404
  (c) Malware Engine(s) 712, 714
  (d) Display Control Module 406
  (e) Database Module 410
  (f) Scanning Results Normalization Engine Module 412
  (a) Reports Module 414
  (g) Statistics Module 416
  (h) Forensic Image 432, 436

Menu Line: [61] Generate report on suggested mitigation strategies 342

Purpose: Selecting the menu option at line [61] 342 invokes a code segment compatible with the "Host Operating System" 400 that is a script or executable application programmed in such a manner that it generates a detailed report on suggested mitigation strategies based on the malicious code infections identified during the current scanning session. As malicious code infections are discovered they are stored in the hits-table in the "Database Module" 410 as normalized data per the use of services offered by the "Scanning Results Normalization Engine Module" 412. After conversion to normalized naming conventions (CVE Index) is completed the code segment associated with "Menu Option [61]" 342 queries the solution-table for suggested mitigation strategies for this specific infection. The solution-table is a pre-built archive that is maintained by the "Reports Module" 414 which has the ability, in conjunction with the "Master Control Point Dashboard Module" 402, to crawl the Internet Web sites of commercial and open source malware vendors and download/extract all mitigation strategies presently recommended for the malicious code segment under review (hits-table). Note that by default, the "Host Operating System" 400 is configured to block all Internet and network packets 220 from any form of connectivity as a cyber security measure. If "Menu Option [61]" 342 invoked with the Internet and network blocking enabled, the only suggested mitigation strategies available for review are those previously created during the installation of the present invention (when Internet connectivity is required) due to their ubiquitous "in the wild" malware presence. If "Menu Option [61]" 342 invoked by the user with the Internet and network blocking disabled, the code in this segment will crawl the Internet seeking out recommendations for mitigating the infection just discovered. Mitigation strategies discovered during this crawl are automatically updated to the solution-table. Regardless of the blocking situation at hand, the "Reports Module" 414 will create a suggested mitigation report concerning the malicious infection being evaluated by reviewing the content of the solution-table in the "Database Module" 410. The mitigation report created will be presented to the user via the "Display Module" 406. As always, any problems encountered during this process are communicated to the user via the "Alerts Module" 404.

When the function associated with "Menu Option [61]" 342 is invoked data in the form of command and control signals will flow between/among the following operational modules as presented in FIG. 13 and FIG. 16:
(a) Host Operating System 400
(b) Master Control Point Dashboard Module 402
(c) Alerts Module 404
(d) Display Control Module 406
(e) Database Module 410
(f) Scanning Results Normalization Engine Module 412
(g) Reports Module 414

Figure 14:
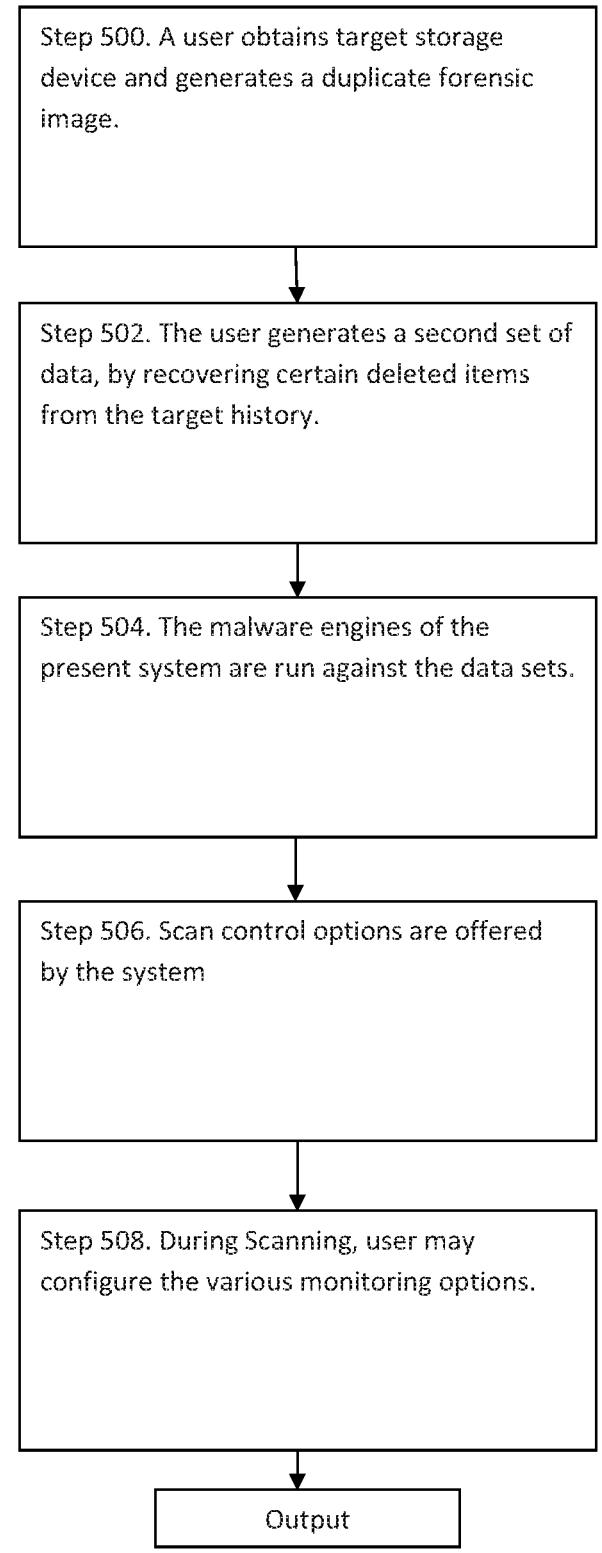
FIG. 14 is an exemplary flow chart that details the conceptual components required to scan one of more forensic images simultaneously with one or more malware detection engines.

Turning now to the organization diagram of the various modules supporting the menus/functions described above in FIGS. 6-12 as well as the modules supporting the flow diagram in FIG. 14 and modules and processes of FIGS. 17-21, FIG. 13 shows a primary functional block diagram that describes the organization of the various operational modules:
Host Operating System 400:
Master Control Point Dashboard Module 402:
Alerts Module 404:
Display Controls 406:
Hardware Monitor 408:
Database Module 410:
Scanning Results Normalization Engine Module 412:
Reports Module 414:
Statistics Module 416:
Malware Engine Selection Module 418:
Deleted Item Recovery Module 420:
Physical Forensic Acquisition Module 422:
Configuration Control Module 424:
Command Line/Graphical User Interface to Malware Engine #1 426:
Command Line/Graphical User Interface to Malware Engine #2 428:
Command Line/Graphical User Interface to Malware Engine #(N+1) 430:
Forensic Image 432:
Temporary storage for deleted items recovered 434:
Forensic image of deleted items recovered on the temporary storage device 436:

FIG. 13 is a block diagram that describes the functional aspects of the "Master Control Point Dashboard Module" (MCPDM) 402. At its core the MCPDM 402 constitutes a proprietary software program that has been designed to enable the use of the present invention in a manner that allows for the simultaneous scanning of a single forensic image 432 436 of a digital storage device by multiple malware scanning engines 712 714 from a single control point. In this case, the single control point is the MCPDM 402 software program. Each of the components identified in FIG. 13 are secondary subroutines that support the primary software program designated as the MCPDM 402. Within the primary MCPDM 402 software program are 61 user selectable menu options that have been previously described in detail in FIG. 06 through FIG. 12. When the user selects one of the 61 different menu options for execution a series of secondary subroutines are called that allows the menu option selected to be executed in a controlled manner. Overviews of the subroutines called for each respective menu option selected are described in detail in the previous pages. It should be noted that the existence of the various subroutines permits an economy of scale to be realized in code design as any action that may be repeated is compartmentalized into a secondary subroutine, increasing efficiencies and improving quality control. Each of the block diagram items identified in FIG. 13 are reviewed below based on their primary function. A practitioner well skilled in the art will realize that the overview provided is not a comprehensive examination of the code itself, but rather a generalized discussion of the functions inherent in each at the pseudo level.

(A) Host Operating System 400 in FIG. 13:

The primary function of the "Host Operating System" 400 is to support all of the modules identified in FIG. 13 at the operating system level. Each of the entities presented as a block diagram in FIG. 13 are software subroutines that need to communicate with each other and the host hardware platform 100 components (memory, disk storage, network connectivity, peripherals, etc.). The "Host Operating System" 400 is presented in this context to make it clear that the present invention is not restricted to usage under any one operating system (Windows, Apple OS, Unix and Linux as well as other proprietary operating systems), but rather is adaptable to any hardware/software system platform capable of being programmed in a manner that satisfies the operational needs the present invention.

(B) Master Control Point Dashboard Module 402 in FIG. 13:

The primary function of the "Master Control Point Dashboard Module" 402 (MCPDM), which is a software application, is to coordinate, where necessary, the activities of all the other modules and provide the user with a menu driven series of options that integrate all the operational steps into a single process capable of achieving the goals of the present invention. The MCPDM 402 is, at its core, a menu driven process that permits the user to sequentially select and apply pre-programmed steps in an interactive manner in such a way that the present invention is configured and executed properly. The menu driven process is detailed in FIG. 06 as a selection point for the "Multi-Engine Malware Scanning Options" array. When the user starts the software application that controls the execution of the present invention the first screen they see is FIG. 06. This screen allows the user to select from the following six menu options:
(1) [TARGET MEDIA] 208: Mount forensic images or devices for scanning (FIG. 07)
(2) [RECOVER DELETED] 210: Configure and initiate deleted file recovery (FIG. 08)
(3) [MALWARE ENGINE] 212: Select and configure malware engines (FIG. 09)
(4) [SCAN CONTROL] 214: Configure/start/stop the scanning process (FIG. 10)
(5) [MONITOR PROCESS] 216: Real time feedback on malware discovered (FIG. 11)
(6) [CREATE REPORTS] 218: Analysis options and detailed results (FIG. 12)

These six interactive menu options are under the exclusive control of the MCPDM 402. From a software perspective the MCPDM 402 should be considered as the "main" structure of the programming code segment which can be written in any GUI capable programming language that can pass variables in subroutine calls and be compiled, C++ for example. The remaining block diagrams of FIG. 13 should be considered as callable variable passing subroutines with unique features and functions. When the user selects a menu option using one of these six functional parameters the MCPDM 402 presents another level of menu options (FIG. 07 through FIG. 12) that are pre-programmed to satisfy all of the configuration and execution parameters necessary to scan the forensic image 432 of a digital storage device that is suspected of being contaminated with malicious code infections with multiple malware scanning engines 712 714 simultaneously from a master control point—in this case the master control point is the "Master Control Point Dashboard Module" 402. Any interaction the user has with the "scanning process" that is the present invention is facilitated by the MCPDM 402.

(C) Alerts Module 404 in FIG. 13:

The primary function of the "Alerts Module" 404 is to maintain a database table (notification-table) with the information concerning the user's preferred preferences concerning the manner in which they desire to be contacted by the "Master Control Point Dashboard Module" 402 and any other modules that need to directly communicate to the user. The "Alerts Module" 404 maintains information on preferred hardware resources (display types, max. screen resolutions, screen sizes, etc.) as well as preferred contact channels (local console, user accounts, e-mail addresses, identities of file shares, remote access, etc.). In addition the "Alerts Module" 404 is programmed to act as an emergency notification mechanism, alerting the user to the existence of errors and faults in the scanning process. Every module is pre-configured to communicate to the "Alerts Module" 404 by default when an error occurs in their respective code segment. The "Alerts Module" 404 is designed to override all other functions currently active and present this notification to the user directly using their preferred contact process. The errors sent to the "Alerts Module" 404 by other modules are also logged into a database table (alerts-table) in the "Database Module" 410 for future reference. The user can configure the data in the alerts-table by selecting "Menu Option: [38] Configure Alert Notifications" 296, FIG. 10.

(D) Display Control Module 406 in FIG. 13:

The primary function of the "Display Control Module" 406 is to modify raw data destine for delivery to the "Hardware Monitor Display Buffer" 408 in a manner that makes it compatible with the user's display preferences. "Menu Option: [44] Select 2D or 3D graphical display for use in monitoring" 308 provides the user with two options. By default, the 2D option is pre-programmed into the types-table in the "Database Module" 410. All data that is sent to the "Display Control Module" 406 by any module is done so in a 2D format. Data sent to the "Display Control Module" 406 is typically in the form of charts, graphs and text based data. If the user has selected 3D as the default then the original data needs to be modified to reflect a 3D display format before it can be displayed properly. The code segment that is the "Display Control Module" 406 is responsible for making this format modification in near real time. The original 2D data or the 3D data, depending on the user's selection is then sent to the "Hardware Monitor Display Buffer" 408 for display on an appropriate hardware monitor. The software that controls the "Display Control Module" 406 is not in the public domain, but rather is a custom designed code segment specific to the present invention.

(E) Hardware Monitor Display Buffer 408 in FIG. 13:

The primary function of the "Hardware Monitor Display Buffer" 408 is to act as a buffer between the data to be displayed and the hardware device selected to display it on. The "Hardware Monitor Display Buffer" 408 also has the ability to act as a compatibility interface between the "Host Hardware Platform" 100 and the "Physical Host Operating System Environment 400 in the form of a DLL driver so that new 3D displays not yet registered with the host operating system can be made to function with the present invention.

(F) Database Module 410 in FIG. 13:

The primary function of the "Database Module" 410 is to maintain a series of database tables that are created during the installation of the "Master Control Point Dashboard" 200, 202 software program. The "Database Module" 410 maintains 21 internal database tables with the following names: Default, Error, Feature, Findings, Hardware, Hits, Host, Monitor, Notification, Operations, Refresh, Remaining, Reports, Running, Scan, Session, Severity, Solution, Startup, Types, and Watchdog. Each of these tables is used to store details on current and historical events related of the malware scanning process. Initially, after installation a majority of these tables are blank. In other cases, some have been preloaded with operational parameters obtained during research concerning the best configuration to use when executing the present invention. Inherent in the software module that is the "Database Module" 410 are subroutine options that allow the user and other modules to update and modify the content of these tables as required by the malware scanning process. The "Database Module" 410 is the primary repository for any data that is later analyzed by the "Statistics Module" 416, the "Reports Module" 414 and the "Scanning Results Normalization Engine Module" 412. The design and implementation of the "Database Module" 410 is not restricted to any particular form of database construct, rather subroutine calls from other modules to the "Database Module" 410 in the form of SQL queries have been crafted at the design level to be compatible with any open source or commercial database product available at the time of this writing.

Figure 18:
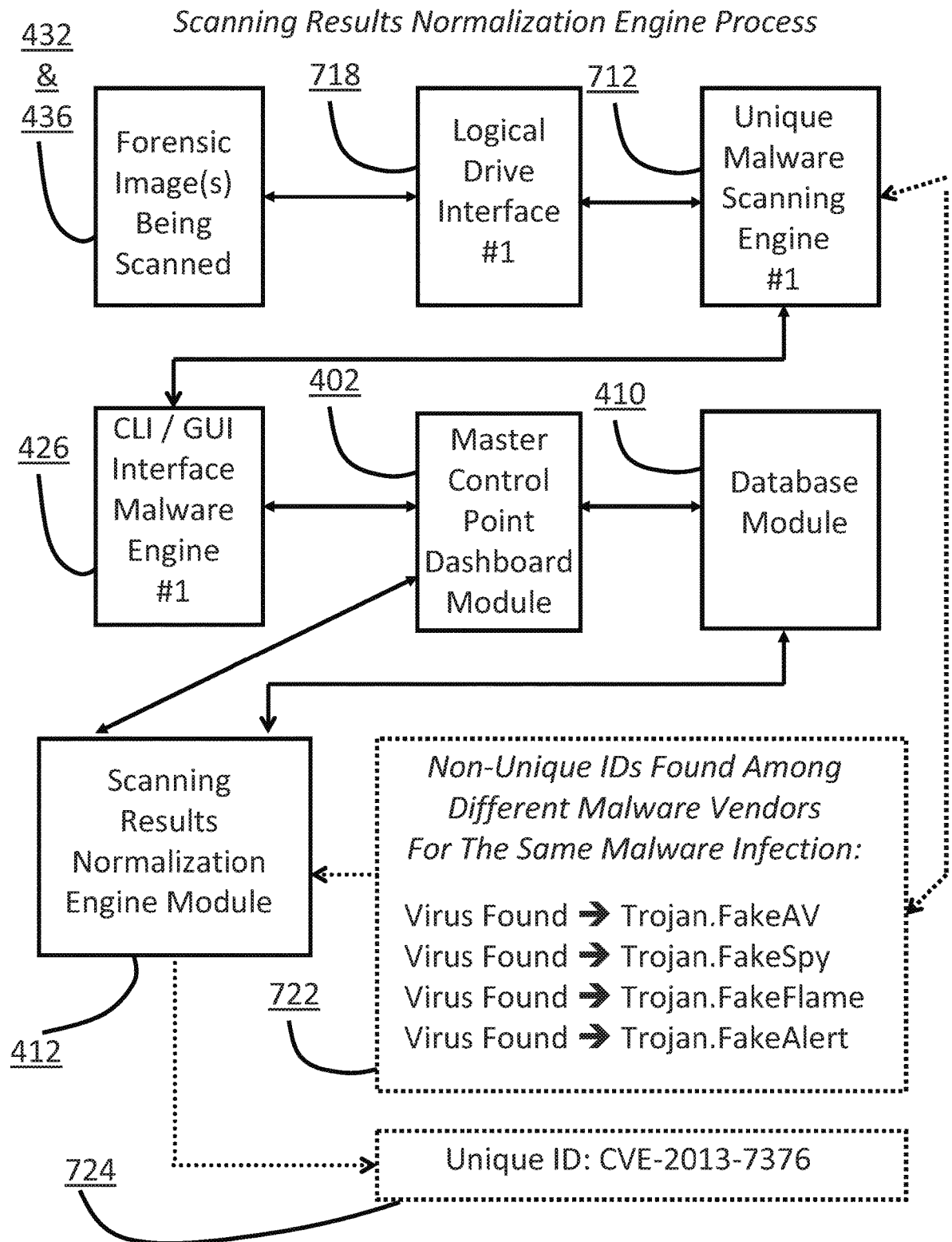
FIG. 18 is a functional block diagram titled "Normalization Engine Process" that schematically illustrates the operational components designed to take dissimilar descriptions from different malware vendors of the same malware infection and reduce it to a common reference description per the Common Vulnerabilities and Exposure (CVE) guidelines.

(G) Scanning Results Normalization Engine Module 412 in FIG. 13:

The primary function of the "Scanning Results Normalization Engine Module" 412 is described in detail in FIG. 18. The reader should consult that overview to its function and purpose. In summary, the "Scanning Results Normalization Engine Module" 412 is a software subroutine designed to normalize the naming convention used to identify malicious code infections. Typically it is used to query the "Database Module" 410 and analyze data in the hits-table to determine if malicious code infections that have been found are really a single infection with different Vendor provider names.

(H) Reports Module 414 in FIG. 13:

The primary function of the "Reports Module" 414 is to use pre-programmed templates and ad hoc queries to build reports based on the data in tables maintained by the "Database Module" 410. The pre-programmed templates are unique to the present invention in that they need to accommodate findings produce by multiple malware scanning engines 712, 714. The process of presenting the results from multiple scanning engines in a single report can be challenging from a logistical perspective due to the different parameters that need to be reported. The functionality of the "Reports Module" 414 can be called by any other module if pre-programmed logic or user intervention is invoked. The "Reports Module" 414 is also programmed with prior knowledge on the best techniques to use when creating reports that will be viewed in a 3D environment. The functionality of the "Reports Module" 414 is also closely linked to the ten menu options available for user selection in FIG. 12. All of these menu options ([53] . . . [61] 326 . . . 342) are facilitated in one way or the other by the "Reports Module" 414. This observation is especially true with respect to "Menu Option [55] Select types of reports to generate" 330.

(I) Statistics Module 416 in FIG. 13:

The primary function of the "Statistics Module" 416 is to use statistical algorithms from both the public domain as well as proprietary sources to analyze data maintained in the "Database Module" 410 in the form of tables and produce data that can be incorporated by the "Reports Module" 414 into different types of reports. In addition, the code behind the "Statistics Module" 416 is also capable of populating tables with summary data. An example of this is in "Menu Option: [47] Create statistical projections on time to complete scanning" 314, where the "Statistics Module" 416 is responsible for monitoring current scanning activities and creating an estimate time to completion for all scanning engines currently in use.

(J) Malware Engine Selection Module 418 in FIG. 13:

The primary function of the "Malware Engine Selection Module" 418 is to act as a gatekeeper between the "Master Control Point Dashboard Module" 402 and each occurrence of the "Command Line/Graphical User Interface to Malware Engine #X" 426 . . . 430 and its associated "Instances Of The Virtual Operating System" 704, which supports an individual instance of a unique malware scanning engine 712. Access to each individual malware scanning process is enabled or disabled based on the user's selections made via "Menu Option [25]: Select malware engine(s) to be used in scanning process" 270. The gateway function also exists as a mechanism that allows other modules, with the assistance of the "Master Control Point Dashboard Module" 402 to tap into the data flow originating from the "Malware Engine Selection Module" 418 as well as data flowing to it from other modules. For example, the "Statistics Module" 416 collects real time data from the malware scanning engine 712, analyzes it and updates a variety of tables in the "Database Module" 410. It does this by monitoring data flowing in and out of the "Malware Engine Selection Module" 418. As mentioned previously, modules such as the "Malware Engine Selection Module" 418 are really subroutines in a software program that are capable of passing variables among and between other subroutines/modules.

This variable passing is at the heart of the design goal of data sharing and collection.

(K) Deleted Item Recovery Module 420 in FIG. 13:

The primary function of the "Deleted Item Recovery Module" 420 is to analyze the content of the forensic image 432 provided for malware scanning and determine if there are any deleted items in "free space" that can be recovered for malicious code scanning. To be successful, this process needs to be implemented in a structured manner. To facilitate that understanding at a greater level a separate figure, FIG. 15 was created, along with a detailed description of this process. Further clarification on this process and how it communicates to other modules can be obtained by reviewing FIG. 15.

(L) Physical Forensic Acquisition Module 422 in FIG. 13:

The primary function of the "Physical Forensic Acquisition Module" 422 is to assist the user in forensically acquiring the entire content of a digital storage device suspected of being infected with a malicious code segment. FIG. 07 provides a list of the different steps that must be followed to ensure that the creation of a forensic image meets industry best practices. The acquisition and creation of a duplicate forensic image 432 is an extremely well documented process within the forensic community. Its functionality in FIG. 13 is provided solely as a reference to explain where the data to be scanned by the malware scanning engines came from. One skilled in the art of forensic acquisition will readily realize the process of image acquisition is in the public domain and not one the present invention could claim as a unique feature of the proposed embodiment. It should be noted here that the "Physical Forensic Acquisition Module" 422 and its initial process steps can be partially bypassed if the client provides the data to be scanned for infections in a forensic format such as E01 or raw DD, as opposed to raw binary data on a digital storage device.

(M) Configuration Control Module 424 in FIG. 13:

The primary function of the "Configuration Control Module" 424 pivots on maintaining operational data on current and past configurations in a manner that allows operational parameters to be applied and adjusted in the most efficient method possible. One of the unique characteristics of the present invention is its ability to select one or more malware scanning engines 712 714 to be active at the same time in a simultaneous scan. As more or less malware scanning engines 712 714 are added to the process the demands on hardware and software resources concerning the running of the "Virtual Support Environment" 702 and each "Instance Of The Virtual Operating System" 704 and the individual "Malware Scanning Engine" 714, 714 change significantly. In some cases these hardware and software resources can be adjusted on-the-fly to accommodate enhanced levels of performance. This is one of the goals of the "Configuration Control Module" 424. The "Configuration Control Module" 424 is designed to constantly query the "Database Module" 410 and examine the content of all tables that contain any form of performance data. For example, the startup-table, the hardware-table and the session-table offer insight into the performance of the process. The "Configuration Control Module" 424 is designed to compare existing performance factors with historical ratings based on the number of malware scanning engines in operation. When it finds evidence that increased performance factors may be possible by using historical settings it attempts to reconfigure the local environment to that configuration. All of this is done in the background without any input from the user. In addition, the "Configuration Control Module" 424 monitors the configuration parameters of the forensic image 432 to ensure that it is configured to be in the optimal read state. The forensic image being scanned for malicious code segments is by default a read-only file. As a result, it is beneficial to confirm that its folder location within the "Physical Host Operating System" 400 is configured for optimum read access as opposed to read/write access. The "Configuration Control Module" 424 takes on the responsibility of making sure this option is confirmed. The Configuration Control Module" 424 also plays a critical role in assisting other modules and menu options in their execution. For example, "Menu Option: [24] Select malware engine applications & signatures for updating" 268 is critical to the successful operation of the present invention. Without the assistance of the Configuration Control Module" 424 in being able to advise on the current version level of virus based signatures, this menu option would fail due to incomplete information.

(N) Command Line/Graphical User Interface to Malware Engine #1 426 in FIG. 13:

The primary function of the "Command Line/Graphical User Interface to Malware Engine #1" 426 is to play the role of middle-man in providing a communications channel between the "Master Control Point Dashboard Module" 402 and the "Instances Of The Virtual Operating System" 704, as well as the unique "Malware Scanning Engine" 712 supported by this virtual operating system environment. The purpose of this interface is to allow the "Master Control Point Dashboard Module" 402 to use command line based scripts to execute different functions in the "Instances Of The Virtual Operating System" 704 selected by the user or issue system calls to the Graphical User Interface associated with the "Instances Of The Virtual Operating System" 704.

In both cases the end result is that various forms of specific commands can originate from the "Master Control Point Dashboard Module" 402 and be received by either the "Instances Of The Virtual Operating System" 704 or the unique "Malware Scanning Engine" 712 previously selected by the user and executed as if the command/GUI call was executed locally. An example of this functionality is associated with "Menu Option [39]: Start malware scanning engine(s)" 298 where the user selects a menu item in FIG. 10 from a list of nine available options that when properly conveyed from the "Master Control Point Dashboard Module" 402 to the selected Malware Scanning Engine 712 will start the process that is the present invention by sending a "GO" command as previously discussed in the overview of "Menu Option [39]: Start malware scanning engine(s)" 298. It should be noted that FIG. 13 has redundant blocks that all serve the same function. Those redundant blocks, identified as 426, 428 and 430 have been provided to demonstrate the embodiment of the present invention, which is that multiple malware scanning engines 712, 714 can be enabled simultaneously for the purpose of scanning a single forensic image for malicious code segments. While these blocks are redundant in function they are unique in that each supports a dedicated communication channel to a unique malware scanning engine 712. As a result of this redundancy, the following two block diagram items are not described as their function and purpose is identical to this description.

(O) Command Line/Graphical User Interface to Malware Engine #2 428 in FIG. 13:

The "Command Line/Graphical User Interface to Malware Engine #2" 428 block item presented here is identical in function and purpose to block diagram item 426 above. As a result it is not detailed here.

(P) Command Line/Graphical User Interface to Malware Engine #(N+1) 430 in FIG. 13:

The "Command Line/Graphical User Interface to Malware Engine #(N+1)" 430 block item presented here is identical in function and purpose to block diagram item 426 above. As a result it is not detailed here.

(Q) Forensic Image 432 in FIG. 13:

The primary function of the "Forensic Image" 432 is to provide an E01 read-only image of a digital storage device for malware scanning. Forensic images are unique on two fronts. First, they can be a bit-by-bit, sector-by-sector duplicate image of all valid and deleted files on a digital storage device, or they can be file level copies of valid files only. Second, E01 images are created with embedded hash digest information and can be used to verify the integrity of the data at any later point in time. In addition, E01 images can be embedded with data concerning the date and time the image was created, who created it, who provided it for analysis as well as the name of the individual creating the forensic image. The concept of a forensic image is critical to the execution of the present invention in that its functionality is dependent upon the availability of an E01 forensic image to scan. This critical status is a function of the read-only parameters associated with the design of the E01 forensic image. Being read-only allows multiple malware scanning engines to scan its content without having the ability to modify its content. This is important in that every open source and commercial malware solution will attempt to automatically "clean" any malicious infections found. In doing so they attempt to modify the original data. If this was permitted then subsequent scans by different malware engines would not find this particular malicious code segment. The default, read-only status of the E01 image resolves this situation making its use a unique feature of the present invention. The interaction of the "Forensic Image" 432 with other components of the present invention is detailed in FIG. 17, the "Malicious Code Discovery Module 716. This figure should be reviewed as a means of getting a better understanding of the embodiment of the present invention.

(R) Temporary Storage for Deleted Items Recovered 434 in FIG. 13:

The primary function of the "Temporary storage for deleted items recovered" 434 is to facilitate the recovery of deleted items from the primary forensic image 432. The functionality of this public domain process is described in FIG. 15 in detail. This figure should be reviewed as a means of getting a better understanding of the embodiment of the present invention with respect to this function.

(S) Forensic Image of Deleted Items Recovered on the Temp. Storage Device 436

The primary function of the "Forensic image of deleted items recovered on temp. storage device" 436 is to provide a read-only forensic image version of the deleted items found on the forensic image 432. The functionality of this public domain process is described in FIG. 15 in detail. This figure should be reviewed as a means of getting a better understanding of the embodiment of the present invention with respect to this function.

FIG. 14 is a exemplary high level overview flowchart summarizing the above described functions for the operation of the present system, FIG. 14 where a user scans a forensic image using the multi-engine malware scanning of the present invention.

At step 500, a user obtains target storage device and generates a duplicate forensic image to be subject to multi-engine malware scanning. Such a process is described in detail above with respect to FIGS. 3-5 and 7 and the associated descriptions outlining the various user options regarding the forensic image creation. At step 502, the user then generates a second set of data, if applicable, to be subject to multi-engine malware scanning by recovering certain deleted items as outlined in detail above in FIG. 8 and the related descriptions.

At step 504, once the two data sets are ready (forensic image and recovered deleted items) the malware engines of the present system are run against those data sets as outlined in FIG. 9 and the related descriptions. At this stage the multi-engine malware scanning arrangements are initially configured according to the user's specifications. At step 506, various scan control options are offered by the system and/or utilized by the user as outlined above in FIG. 10 and the associated descriptions. It is at this stage that the multi-engine malware scanning is applied in parallel against the desired foreinsic data sets. During the scanning process, at step 508 the user may configure the various monitoring options as outlined in detail above in FIG. 11 and the related descriptions.

Finally, once the various multi-engine malware scanning is applied against the desired foreinsic data sets and completed, various reports from the difference malware scans are generated and complied as set forth in detail in FIG. 12 and the related description.

Having listed and described the various hardware, and software moduels of the present system as well as the overview and detailed flow descriptions of the operation of the multi-engine malware scanning process, the following descriptions, provide additional details regarding the various aspects of the invention.

Figure 15:
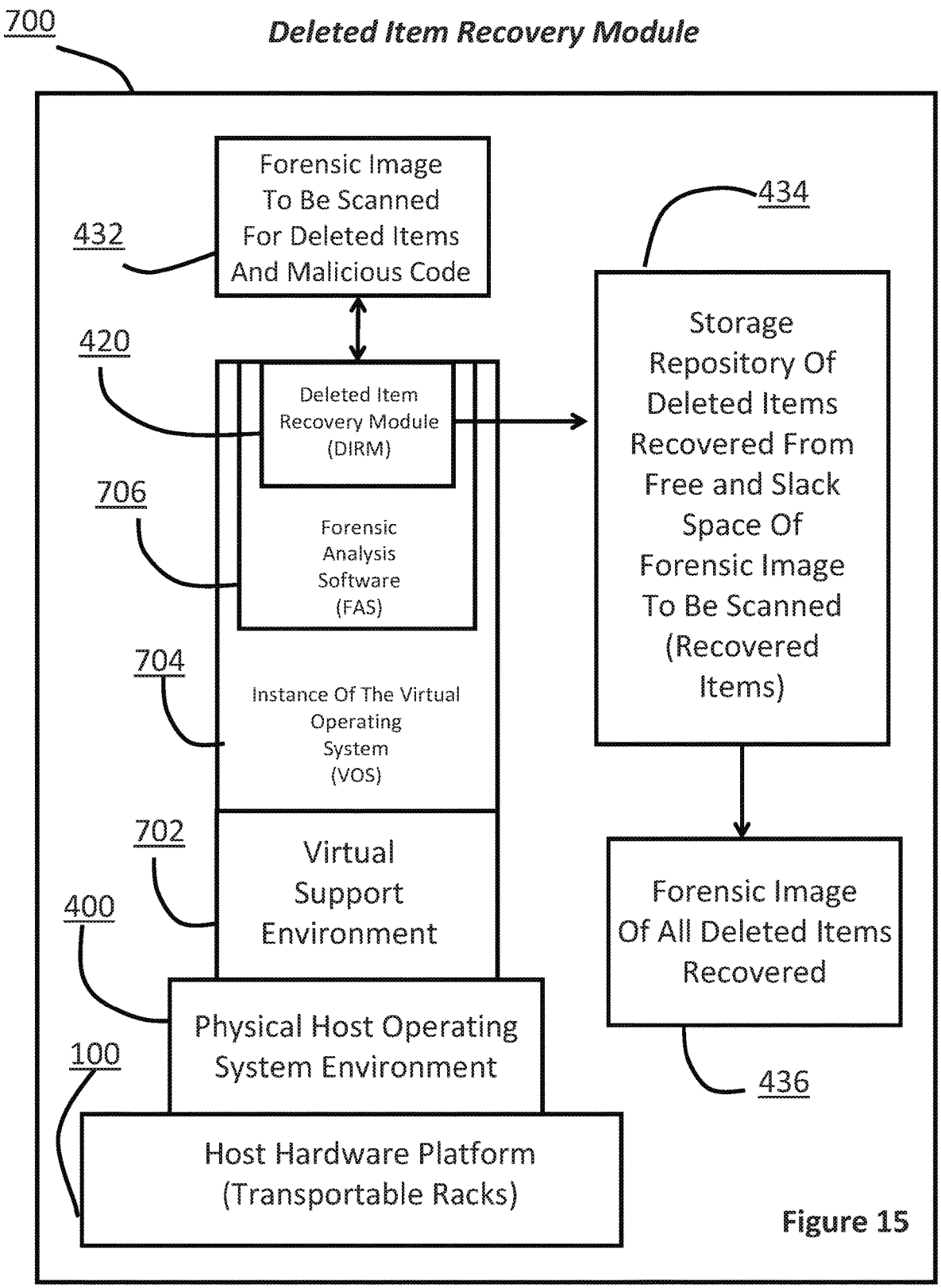
FIG. 15 is a block diagram titled "Deleted Item Recovery Module" that schematically illustrates the hardware/software environment required to support the recovery of deleted items from a duplicate forensic image.

For example, FIG. 15 is a detailed block diagram of the "Deleted Item Recovery Module" 700 (DIRM). This diagram illustrates the hardware and software components required to recover deleted files from a forensic image 432, 436 as outlined above for example in FIG. 8 and the related description. This function represents an additional feature of the present invention in that none of the prior art associated with virus and malware scanning attempts to examine deleted file space, often referred to as "free space," for evidence of malicious code infections that may have been deleted by hackers, directly or indirectly, in an effort to cover their tracks after compromising a computer system. Note: The actual recovery of deleted items from the duplicate forensic image 432 of a digital storage device is not a unique feature of the present invention as this technology driving this process is in the public domain (See previous discussion concerning FIG. 08, "Menu Option [20]" 260). Rather what is unique is the recovery of deleted items for the sole purpose of including their content in the scanning for malicious code infections.

The "Deleted Item Recovery Module" 700 detailed in FIG. 15 includes three basic hardware and software support components: a "Host Hardware Platform" 100, as described in FIGS. 01 and 02, a "Physical Host Operating System Environment" (Microsoft's Server 2012, Microsoft's Windows 7 Ultimate or 8.1 Pro) 400, and a "Virtual Support Environment" (VMWare or Hyper-V) 702. These three hardware and software components form the core structure that supports the embodiment of the present invention as it relates to deleted item recovery. For ease of illustration and because they are not relevant to an understanding of the present invention, FIG. 15 does not show the typical peripherals associated with a computing device 100 such as a hardware display, keyboard, mouse, printer, or other I/O devices. The "Virtual Support Environment" 702 supports multiple "Instance Of The Virtual Operating System" 704 (VOS) which with respect to the initial deployment of the present invention may be Windows 7 Professional or other comparable operating systems.

Applicants note that the "Instances Of The Virtual Operating Systems" 704 (VOS) depicted in FIG. 15 came into existence as a result of efforts to expand the efficiencies of previous investments made in computer hardware and software. Prior to VOS the rule was that a single computer system could only host a single operating system. In these situations, a single computer system was typically dedicated to a single function such as but not limited to: e-mail, file sharing, backup and security controls. This operational mandate created vast levels of inefficiencies as systems dedicated to single functions were vastly underutilized with respect to CPU processing cycles and hard drive storage utilization. Economies of scale were not being realized.

However, software developers skilled in designing operating systems realized that this wasted computing power could be harnessed and manipulated so that a single computer system could host multiple dedicated functions, as opposed to just one. This improvement in computer utilization resulted in an environment where a single underutilized computer system could be segmented into multiple "virtual" worlds. Each virtual world 704 was an instance of a single operating system co-existing with, but independent of all other virtual worlds. This segmented isolation resulted in a solution where a single physical computer system could be configured (using virtual software such as VMWare or Hyper-V) to have the functionality of multiple independent computer systems. The design philosophy of virtual technology resulted in economies of scale being realized.

The benefits of such VOS virtual technology are used in the present invention as it allows multiple instances of different malware scanning engines 712, 714 to co-exist on a single physical computer system 100, a feat that would have been impossible prior to the introduction of virtual technology. Having the ability to configure a single physical computer system as a Host Hardware Platform 100, as presented in FIG. 15, to support multiple versions of different virtual operating systems 704, each supporting their own unique combination of different software applications creates an environment where significant efficiencies are realized and costs contained. One such example of this capability is the use of an instance of a VOS 704 to host the forensic application software 706 that includes a "Deleted Item Recovery Module" 420 which is capable of recovering deleted items from the forensic image 432 of a storage device suspected of being compromised with malicious code infections.

In the present invention, the VOS 704 identified as shown in FIG. 15 hosts a "Forensic Analysis Software" 706 (FAS) application. Three examples of commercially available Forensic Analysis Software applications are: X-Ways Forensics (X-Ways Software Technology AG), EnCase (Guidance Software) and FTK Toolkit (AccessData Group). The FAS, which can be either a commercial or open source program, will have an internal "Deleted Item Recovery Module" 420 (DIRM) capable of recovering deleted items from the free space of a forensic image 432. Items recovered by the DIRM 420 are written to a "Recovered Items" 434 storage repository for additional processing. The additional processing includes converting the items recovered into a forensic image 436 so that these items can be scanned by the malware engines 712 714. The DIRM 420 utilizes a dedicated hard drive 434 with sufficient storage capacity to hold copies of all deleted items recovered from the forensic image 432. The hard drive 434 utilized by the DIRM 420 for temporary storage is replaced with a new blank hard drive as required or the drive is completely wiped to military specifications using commercial tools prior to reuse.

The "Deleted Item Recovery Environment" 700 outlined in FIG. 15 is one that can be launched using the "Master Control Point Dashboard Module" 200 using the "Recover Deleted" 210 menu options, specifically "Menu Option [20]" 260: "Start deleted item recovery process." In all cases, the methods used to launch this process and recover the deleted items to a storage repository 434 have been specifically created to support the present invention.

The present invention is unique with respect to two related functions. The first related function is the ability to scan one or more forensic images 432 with multiple malware scanning engines 712, 714 simultaneously from a master control point 402 for malicious code infections. The second related function, as described in FIG. 15, is the ability to examine the forensic image 432 for deleted items in "free space" and recover those items to a temporary storage device 434. For ease of illustration and because they are not relevant to an understanding of the present invention, specific technical details concerning the forensic software techniques used to recover deleted items from free space are not included in this application as they are in the public domain. Once the deleted item recovery process is completed, using the functionality of the "Deleted Item Recovery Module" 420, all items recovered 434 are converted into a forensic image 436 that can be examined by the malware scanning engines 712, 714 for malicious code infections.

The functions described in FIG. 15 along with the hardware and software required to support these functions represents the initial embodiment of the present invention with respect to one of the two primary inputs (deleted items and a forensic image) required by the process of the system. For ease of illustration and because they are not relevant to an understanding of the present invention, specific technical details concerning the forensic software techniques used to recover deleted items from free space are not included in this application.

FIG. 16, "Malware Scanning Engine Platform Module" 708, in furtherance of the descriptions above, is a more detailed block diagram that illustrates the process and arrangement whereby a single physical host hardware platform 100 can be configured to support multiple virtual operating system environments 704, each capable of scanning (simultaneously) a forensic image 432, 436 with a different malware engine 712, 714. "Malware Scanning Engine Platform Module" 708 as depicted in FIG. 16 is a full and complete embodiment of the virtual aspects of the present invention. The hardware and software environment detailed in FIG. 16, with respect to the "Host Hardware Platform" 100, the "Physical Host Operating System Environment" 400, and the Virtual Support Environment 702 are all located on the same physical computing device. These core components are described here for clarity purposes only and this description is not meant to infer that more than one physical computer system is required to support the system and method of the present invention. It should be noted that the core components themselves are not unique aspects of the present invention; rather they are support components that enable the present invention to function in a manner that makes it a unique method that is capable of scanning for every known malicious code infection.

Figure 17:
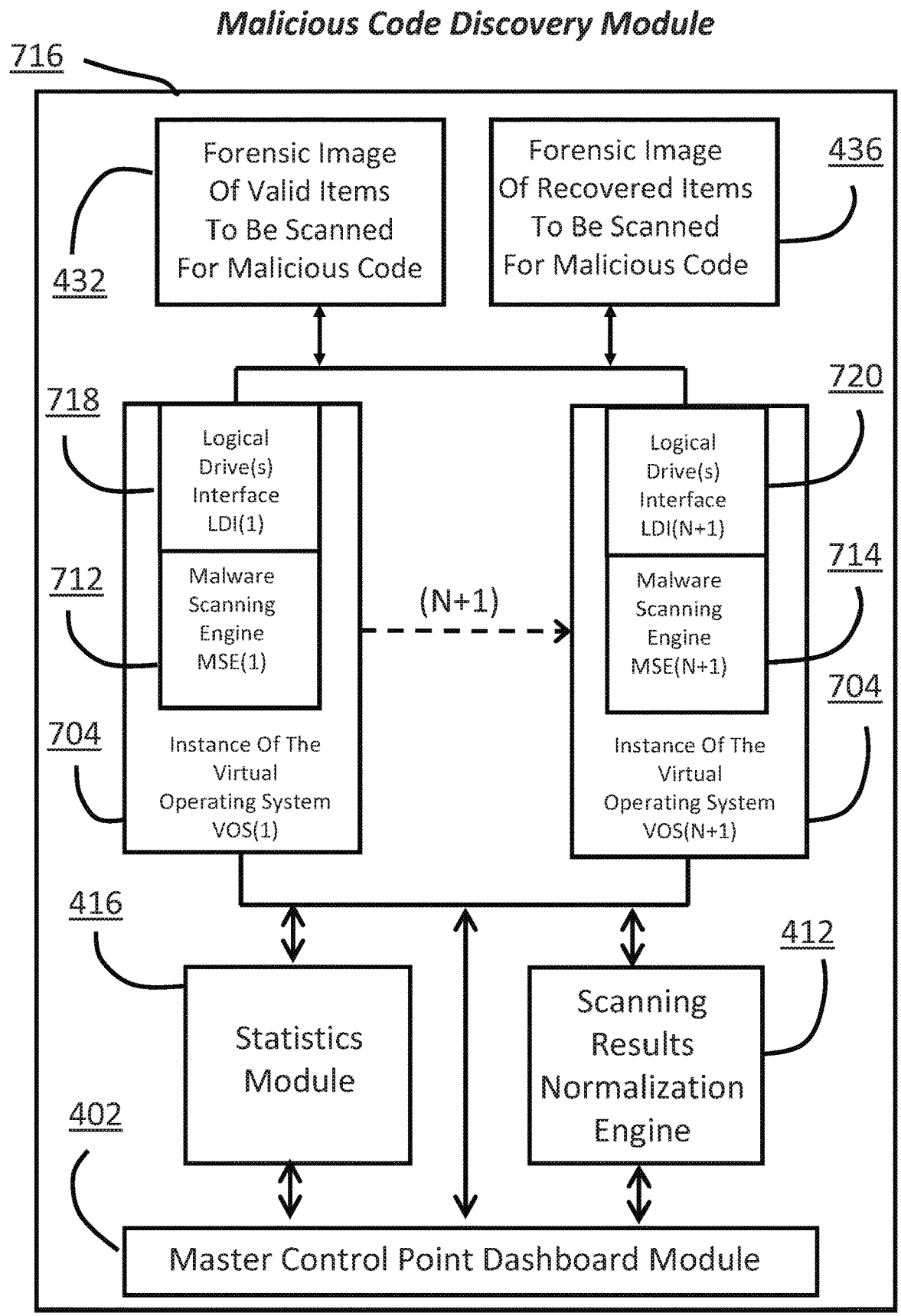
FIG. 17 is a functional block diagram titled "Malicious Code Discovery Module" that schematically illustrates the operational components required to support the use of multiple commercial and open source malware scanning solutions to simultaneously scan forensic images for malicious code infections and report on the findings made. This figure details the preferred embodiment of this invention at the functional level and is the essence of the present invention at its core.

FIG. 16 identifies a critical aspect of the present invention—that being the ability to stand-up repeated instances of the Windows operating system in multiple "Instance Of The Virtual Operating System" 704 shells on a single physical computer system 100 using a virtual support environment 702 that is designed to be capable of scanning a forensic image 432 436 FIG. 17 with multiple malware scanning engines 712 714 simultaneously.

Creating a working virtual environment 708 as depicted in FIG. 16 is not difficult and well within the capabilities of a typical user who has past experiences that involved formatting a hard drive and installing an operating system capable of booting the physical computer to a user prompt. One example (of many) in creating a "Virtual Support Environment" 702 capable of supporting multiple "Instances Of The Virtual Operating System" 704 that each have a different "Malware Scanning Engine" 712, 714 installed consists of the following steps:

(a) Purchase a high-end physical computer system running Windows 7 Ultimate 100.
(b) Purchase a licensed copy of the VMWare Workstation software. (See e.g. http://www.vmware.com/products/workstation/702.)
(c) Perform a standard install of the VMWare Workstation software. (See e.g. User Guide: http://www.vmware.com/support/pubs/ws_pubs.html 702.)
(d) Purchase an additional licensed copy of Windows 7 Professional 704.
(e) Purchase/obtain a licensed/free copy of a malware scanning engine 712.
(f) Execute and run the VMWare Workstation software 702.
(g) Create a virtual operating system shell using the VMWare Workstation software 704.
(h) Format the virtual operating system shell with the Microsoft NTFS file system 704.
(i) Install the copy of the Windows 7 Professional operating systems purchased in step (d) into the formatted virtual operating system shell 704.
(j) Finish the installation of the Windows 7 operating system by updating to the most current service packs and patches 704.
(k) Install additional software applications as required. With respect to the present invention this would at the minimum include but not be limited to:
  (1) An instance of a malware scanning engine 712, 714.
  (2) Commercial software capable of mounting a forensic (E01, dd, etc.) image 432 created from a hard drive suspected of being infected as a logical device. For example: FTK Imager (See e.g. User Guide: http://marketing.accessdata.com/acton/attachment/4390/f-000d/1/-/-/-/-/file.pdf 718)
  (3) Commercial software designed to perform complete or partial screen captures of data displayed on the desktop (for reports and affidavits where necessary).
  (4) Commercial forensic analysis and deleted file recovery software such as but not limited to: X-Ways Forensics, EnCase and the FTK Toolkit 420.
  (5) An open source or commercial text editor.
  (6) Commercial or open source software designed to control the actions of the instances of VMWare or Hyper-V created by this process in the form of internal or external scripts capable of communicating back to the "Master Control Point Dashboard Module" 402.

The above process, starting with step (d), can be repeated as many times as technically feasible given the operational limitations of the hardware purchased in step (a). As the process is repeated additional instances of a Windows operating system environment are created, each being capable of hosting a different malware scanning engine 712, 714. Each of these different instances are unique in that they co-exist independently of each other but as designed have two common external operational areas each can access simultaneously. The first common area is where the forensic images 432, 436 are stored. The second common area is an isolated folder on the host operating system 400 that is used by the "Master Control Point Dashboard Module" 402 to control the operations, via scripts and executable programs, of the software installed in each virtual instances created.

The first common area allows all of the virtual worlds created (step (a) through step (k) above) to have read-only access to the same forensic images suspected of being infected 432, 436. Having an environment where a single forensic image 432, 436 can be scanned simultaneously by multiple malware engines 712, 714 increases scanning efficiencies by factors. It is estimated that this increased efficiency could reduce scanning times from 200 sequential hours total, to just under five. This gain in efficiencies is one of the primary benefits of the present invention.

The second common area includes storage for the "Database Module" 410 which permits all the virtual worlds created, and the software installed in each, to be controlled by a script driven environment that is realized in the form of a dashboard display 402 on the desktop with operational controls designed to manipulate each and every instance of the virtual worlds created. This dashboard is a visual projection of the functions of a master control point detailed at the conceptual level in FIG. 06.

The master control point dashboard 402 and its corresponding display controls module 406 are a series of stand-alone executables designed by software developers at the request of the authors of this present invention. This executable application 402 is designed to be installed on the physical computer system hosting the virtual worlds created in the steps detailed above. The master control point is a collection of script driven functions designed to manage the entire process of scanning a forensic image with multiple instances of different malware engines simultaneously using virtual instances 702 of the Windows operating system. An example of some of the operational functions available under the umbrella of the master control point and its associated dashboard display are detail in FIG. 06. As previously described, the operational and management menu functions it provides the user as selections described in FIG. 13 reflect the core components that need to be controlled to ensure that all E01 forensic images are scanned in a manner that guarantees the discovery and identification of malicious code segments.

The functional aspects of the components in FIG. 16 establish that a "Malware Scanning Engine Platform Module" 710 can be configured and implemented multiple times over in the combined form of "Instances Of The Virtual Operating System" (VOS) 704 and a "Malware Scanning Engine" (MVSE) 712 714. Each VOS 704 is unique in that each hosts a different "Malware Scanning Engine" 712 714 capable of scanning a duplicate forensic image for malicious code. This exemplary embodiment can host at least 32 different malware scanning engines 712, 714 in this virtual environment 710.

The operational aspects of FIG. 16 are tied directly to the "Master Control Point Dashboard Module" 402 through the "Command Line/Graphical User Interface to Malware Engine #X" 426 . . . 430. As mentioned previously, the dashboard module 402 is a collection of programming subroutines designed to communicate with the other modules using embedded variables that are passed between and among the other modules depicted in FIG. 13. For example, the "Statistics Module" 416 in FIG. 13 can communicate with one of the malware scanning engines 412, 417 by sending it an embedded variable which contains a script, which when executed instructs the malware scanning engine to report the name of the last infection it found. This data is captured by the script and sent back to the "Statistics Module" 416 for additional analysis as an embedded data variable in a subroutine return.

As previously identified, the master control point is a collection of scripts and executable programs designed to communicate electronically with each instance of the virtual operating system worlds created. The user interface for the master control point is a dashboard display that acts as a front-end to the technical parameters that drive the operation of each operating system instance as detailed in FIG. 06. The interactive dashboard display permits the user to locally or remotely activate or deactivate explicit functions within each virtual operating system environment, especially with respect to the operation of the malware engines. In addition to controlling the key operational aspects of each virtual operating system 710 the master control point dashboard constantly monitors 216 the progress and status of all relevant functions both in real time as well as from historical logs maintained by each virtual operating system environment. The data exchanged between the master control point and all the instances of virtual operating systems running are normalized, per FIG. 18 described below, and presented in a form compatible with the default dashboard display 406 408. The interactive dashboard display 402 then becomes the primary interface between the administrator and the instances of multiple virtual operating systems created 704 and enabled by the use of the virtual environment's software management application.

While the "Master Control Point Dashboard Module" 402 is a primary component of the present invention it should be obvious to all experienced in the art that this approach is but one of many means by which the functions inherent in the "Master Control Point Dashboard Module" 402 can be controlled and monitored. It is understood that the present arrangement is intended to include any and all scenarios, regardless if they are hardware or software when describing a user interface that permits various operational functions to be controlled, either locally or remotely, with respect to the "Instances Of virtual operating systems 704 hosted under the Virtual Operating Systems" 704 and the "Malware Scanning Engines" 712, 714 they host.

The block diagrams presented in FIG. 17 represents certain operational capabilities created by the present invention. FIG. 17 helps illustrate the interplay of various unique aspects of this present invention. This figure, further described as the "Malicious Code Discovery Module" 716. This figure encompasses a vast majority of the unique aspects of the present invention. This figure outlines the two primary inputs required for scanning to occur, which include a forensic image 432 of valid files and a forensic image of deleted/recovered items 436. In addition to the forensic images, there are three other operational modules 412, 416, 402 which help create output for the system. These are the "Master Control Point Dashboard Module" 402, the "Statistics Module" 416 and the "Scanning Results Normalization Engine Module" 412. A key characteristic of the present invention is its ability to have different malware scanning engines 712, 714 installed in multiple "Instances Of The Virtual Operating Systems" 704 so that multiple malware scans can be launched simultaneously against the same duplicate forensic image 432 and its corresponding forensic image of deleted items 436. Access to the duplicate forensic image(s) is facilitated by a "Logical Drive Interface" 718, 720, a software program in the public domain that enables the Microsoft Operating System to access the duplicate forensic image as a physical or logically attached device.

An example of the "Logical Drive Interface" 718, 720 is the executable application "FTK Imager" by the AccessData Group. Its primary function, with respect to the present invention, is to transform the data found in a forensic image 432 so it appears to the Windows operating system environment as a mountable logical storage drive (e.g.; D:\, E:\, etc.). Once mounted in such a manner the storage drive is accessible to other software programs in read-only mode. In this case, the other software program would be a unique version of a commercial or open source malware scanning engine 712, 714 installed in a exclusive instance of the virtual shell 704. In normal operation, communications from the "Master Control Point Dashboard Module" 402, at the direction of an appropriate menu option selected by the user, for example "Menu Option [06]: Mount Selected Partition(s) as Logical Device(s)" 232 would instruct a specific virtual operating system instance 704 to enable the "Logical Drive(s) Interface" 718, 720 (in this example the local copy of FTK Imager) and launch it as a process within the virtual operating system selected. The virtual operating system instance 704 would then communicate back to the "Master Control Point Dashboard Module" 402 using text based protocols advising that the instructions had or had not been accomplished successfully. Once launched, the FTK Imager application, at the direction of user actions initiated via the menu options, would select and mount a forensic image and make it accessible as a logical drive (e.g.; D:\, E:\, etc.) under the Windows operating system. Such actions would originate from the user's selection of "Menu Option [05]: Assign logical identifiers to mounted partition(s) (E:\. F:\, etc.)" 230.

This process of initiated action, feedback and ongoing monitoring of the involved services and processes, using the "Master Control Point Dashboard Module" 402 and the behind the scene master control point scripts and database tables, would be continued for all the steps necessary to scan the selected forensic image for malicious code infections. As each step was initiated and completed those statuses would be updated on the dashboard display 406, 408 in real time by the "Alerts Module" 404 as data sent to the "Display Controls Module" 406.

FIG. 18 presents details on a custom designed process that is unique to the present invention and engines 412, 402, 416 associated with this system and the scanning method it proposes. The "Scanning Result Normalization Engine Module (SRNE)" 412, FIG. 13 is series of scripts, C++ code segments and database tables in the "Database Module" 410 that have been created to take vendor specific data 722 produced by the malware scanning engines 712, 714 concerning infections found and aggregate all the data into a single normalized data structure 724 in an accessible database table format. An example of the function available through the SRNE 412 is provided in FIG. 18.

The SRNE 412 process, as detailed in FIG. 18 is a custom built software analysis program designed to normalize the many different names a single virus may have 722 across all the malware detection vendors in this market space. For example, while two different commercial malware engines may be able to locate the same virus 722 (based on a common hex based signature string), both may identify it based on their own unique naming convention. The SNRE 412 was created as a management based utility to prevent a single virus from being identified as two separate and unique viruses. The SNRE 412 accomplishes this goal by reducing the naming variability, where possible, to a single known malware signature cataloged by the Common Vulnerabilities and Exposure (CVE) index or data bases with similar functions and purpose.

In normal operation, the SRNE 412 application, depicted in FIG. 18, would act as an access point for the "Database Module" 410 maintained by the "Master Control Point Dashboard Module" 402, which is a table driven repository of all of the infection reports generated (hits-table) by the individual "Malware Scanning Engines" 712, 714 install in each instance of the virtual operating systems 704 put in place. These reports would be obtained from each individual malware scanning engine. A custom script/program associated with the "Master Control Point Dashboard Module" 402 (for example, "Menu Option [49]: Display count of malicious code instances found so far" 318) would target the malware scanning engine of interest by setting up a text based communication channel between the "Master Control Point Dashboard Module" 402 and the respective "Instance Of The Virtual Operating System" 704. Once established, the custom script/program would initiate actions within the malware scanning engine 712, 714 for the purposes of having it generate a local text based report on any recent malicious code infections discovered. This local report would then be automatically forwarded to the SRNE 412 application for normalization. The raw un-normalized data, along with the normalized data, would be available for inspection and review by any user with access to the "Master Control Point Dashboard Module" 402. In cases where the individual malware scanning engine did not have the ability to produce a text based report of its findings, an additional custom script/program would be executed. This custom script/program would have the ability to perform a "screen scraping" of the graphic based report produced by the malware scanning engine 712, 714. The screen scraping function would convert the graphical based data into text based data and forward that data on to the SRNE 412 application for normalization.

While the process defined in FIG. 18 is detailed and involved, it is, at the conceptual level nothing more or less than a compilation of the actions a typical user would take who has multiple computers, each with a different malware scanning engine installed. Configuring each respective malware scanning engine 712, 714 to scan the digital storage devices attached to the computer systems, and then collecting the results produced in a database 410 for analysis is the core basis of the present invention. Except in the case of the present invention, the malware scanning is performed simultaneously, by 32+ malware scanning engines 712, 714, on a single forensic image 432,436 of a suspected hard drive deemed to be infected.

The block diagram presented in FIG. 18, along with the custom scripts and table queries the "Master Control Point Dashboard Module" 202 (MCPDM) detailed in FIG. 06 is series of scripts and programs created to provide functional control over all available malware applications enabled by this present invention. The MCPDM also has the ability to integrate with the SRNE 412 so that normalized data can be accessed for the purpose of providing operational updates, reports 414 and statistical projections 416 on the impact to the organization of any malicious code discovered. Examples of the functions available under the MCPDM can be found in FIG. 06.

In all cases, the custom scripts and programs developed to facilitate this and other control and monitoring functions are based on a simplistic text-based protocol where data in a "Database Module" 410 is exchanged and updated in "custom activity tables" unique to each instance of the "Virtual Operating System" 704 enabled under the "Virtual Support Environment" 702. These tables are updated in real-time by custom scripts/queries running under each individual "Virtual Operating System" 704 enabled. All tables associated with the "Database Module" 410 are located in a common area to which each respective "Virtual Operating System" 704 has access. This common area would typically be a folder on the hard drive of the "Physical Host Operating System Environment" 400 hosting the aforementioned environment. This common database area is designed to enable the individual virtual operating systems 704 to communicate with the MCPDM scripts/queries (and vice-versa) so that real-time data can be obtained for the purpose of refreshing the "Display Module" 406 with current data. In addition to real-time data updates provided by the applications and scripts running inside each virtual operating system 704, these communication channels can also be used to pass commands and instructions (as well as results/errors encountered) from the MCPDM to the individual instances of the virtual operating systems 704 and the services/processes they each host internally.

Lastly, with respect to "Statistical Projection Analysis Engine (SPAE) 416 (FIG. 13), the SPAE capitalizes on the fact that data gathered from multiple malware scanning engines offers a unique opportunity for extrapolation not currently offered by any commercial or open-source vendor security solution. The primary purpose of the SPAE is to allow research to be performed for the purpose of identifying unknown exploits based on the findings generated by the 32+ scanning engines the present invention is capable of launching against a set of forensic images.

Figure 19:
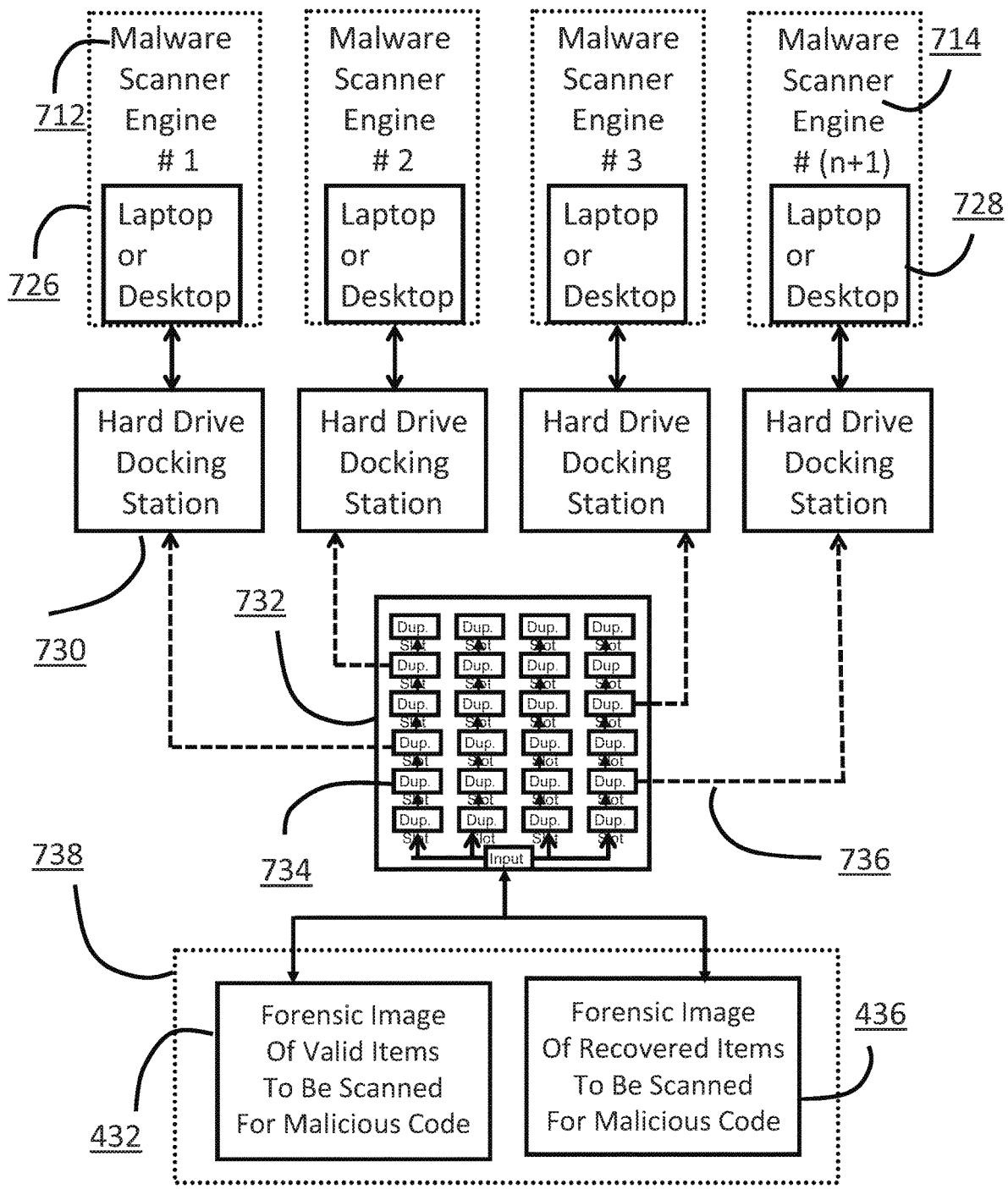
FIG. 19 is a block diagram titled "Example Of A Manual Processing Environment" that illustrates how the functions of the present invention could be reduced to an inefficient manual process that, despite its limitations, could accomplish the primary goal of scanning a single forensic image with multiple malware engines simultaneously.

FIG. 19 is a block diagram that further illustrates details regarding how certain functions of the present invention could be managed in an alternative manner that, despite limitations, could accomplish the primary goal of scanning a single forensic image 432, 436 with multiple malware engines simultaneously 712, 714. As with the preceding examples, a forensic image 432, 436 is created by a forensic technician of the hard drive that needs to be scanned for malware infections. That hard drive, containing the forensic image of the system to be scanned, is then manually configured for duplication by the forensic technician and replicated using a commercial one-to-many hard drive duplicator 732.

In FIG. 19, this device is shown to have 25 slots 734. One slot is for the source device to be duplicated and the remaining 24 slots are filled with blank hard drives. This configuration allows for a maximum of 24 separate duplicate images to be created simultaneously (in this case, quantities may vary based on the type of commercial hardware duplicator utilized). Once the duplicate hard drive images are created they are physically transported 736 by the forensic technician to a commercial hardware hard drive docking station 730 that is attached to a commercial laptop or desktop 726, 728. In this representation of the present invention each laptop or desktop 726, 728 has a different malware engine 712, 714 installed on the computer system 726, 728 as a functioning security control. The number of laptops/desktops 726, 728 in use at any one period in time is based on the number of different malware scanning engines 712, 714 required for the scanning task at hand. The results of each malware scan run are then either collected manually or written to a common database repository by a series of scripts or specialized applications authored specifically for this purpose.

Figure 20:
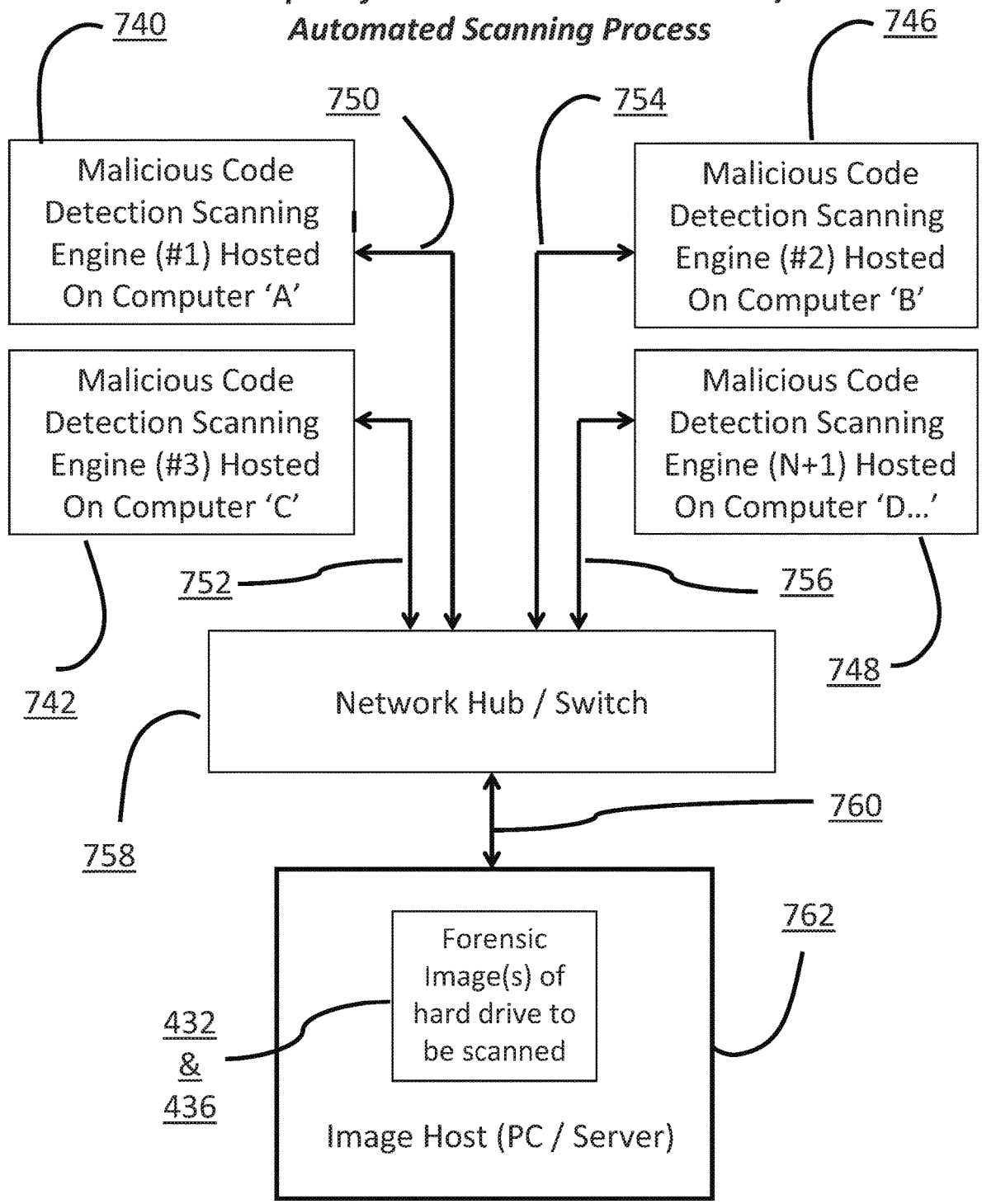
FIG. 20 Is a block diagram titled "Example Of A Network Hosted Manual/Automated Scanning Process" that details how the method that is embodied in the present invention can be configured to function in a internal network environment.

The block diagram in FIG. 20 details an alternative embodiment with the present invention's method implemented in a network environment. While the hardware delivery system detailed in this figure is different than previous figures discussed, the method is not. In this example, the present invention's method (scan one forensic image with multiple malicious code detection engines simultaneously) is duplicated such that manual or automated (script/program driven) functions can be applied to the hosted environment. In this situation, the forensic images of the hard drive 432, 434, 436 to be scanned for instances of malicious infections are made accessible by mounting same on a computer system 762 hosting the image in question. This computer system is connected to a network hub or switch 758 using either hardwired or wireless connectivity 760. Connected to the hub or switch are multiple computer systems 740, 742, 746 and 748 that are configured using hardwired or wireless techniques 750, 752, 754 and 756. Each of these computer systems 740, 742, 746 and 748 are individually configured to host a different malicious code detection scanning engine. The total number of computers (N+1) 748 running a different malicious code detection scanning engine are a function of local resources and internal network bandwidth. Each of the scanning engines/computers are controlled by either manual of automated processes from a master control point. In all cases the hosting network environment is configured so that permissions exist so that the scanning computer systems 740, 742, 746 and 748 have direct remote access to the forensic image 432, 436 that has been physically and logically mounted on the Image Host 762 computer system.

Figure 21:
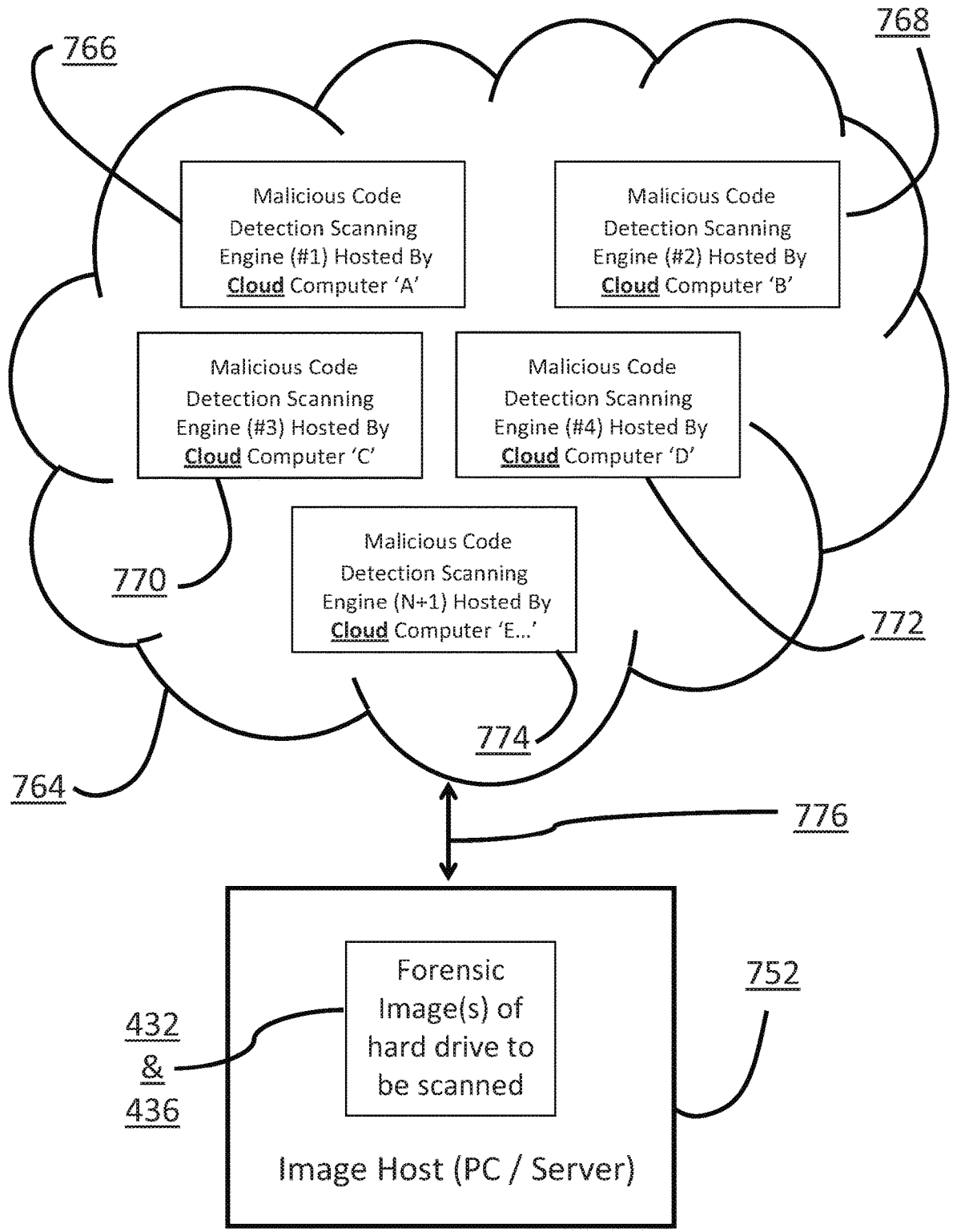
FIG. 21 Is a block diagram titled "Example Of A Cloud Hosted Manual/Automated Scanning Process" that details how the method that is embodied in the present invention can be configured to function in a public or private cloud environment.

The block diagram in FIG. 21 mimics the functionality of FIG. 20 with the difference being that either a private or public cloud environment is used as a replacement for the network environment described in FIG. 20. FIG. 21 illustrates how a public or private cloud 764 can be used to host multiple malicious code detection scanning engines 766, 768, 770 and 772 such that the cloud is enabled and configured to allow direct remote access to the forensic image 432, 436 of a hard drive to be scanned that is hosted by an Image Host computer 752. The Image Host computer 752 illustrated in FIG. 21 is shown as a local computer system. But those who have skills and experience in various forms of connectivity realize that the Image Host 752 could also be located in a cloud environment. The Image Host computer system 752, as detailed in FIG. 21, is shown as a local computer system due to security issues associated with privacy laws and regulations. The connectivity 776 between the cloud 764 and the Image Host 752 is not restricted to any specific form of technology as long as the selected technology allows the method of the present invention to be made operational in the environment described.

The specifications discussed in this application, as well as the previously filed provisional application have disclosed preferred embodiments of the present invention and, although specific descriptive terms are employed, they are used in a generic sense only and not for purposes of limitation. Obviously, many modifications and variation of the present invention are possible once the distinguishing characteristics of the present invention are understood. It is therefore to be understood that the present invention may be implemented otherwise than as specifically described in this provisional application without changing the focus and advantages derived.

Unless defined otherwise, all technical and scientific terms used herein have the same meaning as commonly understood by one of ordinary skill in the art in the field of this present invention. Although any compositions, methods, implementations, configurations and means for communicating information similar or equivalent to those described herein can be used to practice this present invention, the preferred compositions, methods, implementations, configurations and means for communicating information are described herein.

Although the present invention has been described in accordance with the embodiments shown, one of ordinary skill in the art will readily recognize that there could be variations made to the embodiments without departing from the scope of the present invention. Accordingly, it is intended that all matter contained in the above application and shown in the accompanying drawings shall be interpreted as illustrative and not a means of demonstrating the limits of technology.

What is claimed is:

1. A multi-engine malicious code scanning method for scanning data sets obtained from a storage device, said method comprising the steps of:
   hosting a plurality of independent operating systems in a virtual cloud environment;
   each of said plurality of independent operating systems in said cloud environment supporting one malware engine, each malware engine on each respective independent operating system being different from one another such that said virtual operating system is configured to support at least thirty two different malware engines each operating on its own independent operating system;

obtaining at least one data set from a storage device by duplicating the data set from the storage device to an image host and generating a single archive forensic image file of said data set, said single archive forensic image file separate from said storage device and stored at said image host;

also applying a recover data application to said data set to also generate a single archive recovered data set file said single archive recovered data set file also separate from said storage device and stored at said image host;

selecting from among said plurality of different malware engines supported by said virtual operating system in said cloud environment for analyzing said single archive forensic image file and said single archive recovered data set file, wherein said step includes displaying a master control point dashboard to a user for selection of one or more different maleware engines, among said plurality of available different malware engines, for scanning said archive forensic image;

initiating independent and simultaneous scannings of said single archive forensic image file and said single archive recovered data set file, without connection to said storage device from which said data set files were obtained, using said selected plurality of different malware engines from said master control point dashboard, wherein each of said different malware engines, supported by said cloud environment, may be run concurrently, based on a malware engine scanning sequence set from said master control point dashboard, on said single archive forensic image file and said single archive recovered data set file on said image host; and generating a combined report for each of said different malware engines reporting the results of said scans.

2. The method as claimed in claim 1, further comprising the step of initiating a scanning of said single archive forensic image file and said single archive recovered data set file using said selected plurality of malware engines using a master control point dashboard in said cloud environment.

3. The method as claimed in claim 2, further comprising the step of operating a sub-routine for acquiring and verifying selection of said data stored on a storage.

4. The method as claimed in claim 2, further comprising the step of operating a sub-routine for acquiring and verifying said single recovered data set via said master control point dashboard.

5. The method as claimed in claim 2, further comprising the step of operating a sub-routine for registering, unregistering and updating malware engines via said master control point dashboard.

6. The method as claimed in claim 2, further comprising the step of operating a sub-routine for selecting the sequency and timing of said malware engines scanning of said data stored on a storage device and said recovered data set via said master control point dashboard.

7. The method as claimed in claim 2, further comprising the step of operating a sub-routine for monitoring the progress of said malware engines scanning of said data stored on a storage device and said recovered data set via said master control point dashboard.

8. The method as claimed in claim 2, further comprising the step of operating a sub-routine for generating a combined report for each of said malware engines reporting the results of said scans, including normalizing reports between said malware engines.

9. The method as claimed in claim 8, wherein said combined report may include notification that any two of said malware engines uncovered a single malware, where said any two of said malware engines use different names for said single malware.

10. The method as claimed in claim 8, wherein said report also includes a compilation of detected malware identified by malware engine vendor name, malware engine name, severity ranking, and total amount of infections at the identified severity level.

11. The method as claimed in claim 1, wherein said virtual cloud environment supports a statistical module that can provide a user with an estimate time to complete said simultaneous scannings.

12. The method as claim in claim 1, wherein said report provides an alert that if a first malware is identified that there is a statistically significant risk for additional infection by a second related malware.

* * * * *